US008160273B2

(12) United States Patent
Visser et al.

(10) Patent No.: US 8,160,273 B2

(45) Date of Patent: Apr. 17, 2012

(54) SYSTEMS, METHODS, AND APPARATUS FOR SIGNAL SEPARATION USING DATA DRIVEN TECHNIQUES

(76) Inventors: Erik Visser, San Diego, CA (US); Kwokleung Chan, San Diego, CA (US); Hyun Jin Park, San Diego, CA (US)

( * ) Notice: Subject to any disclaimer, the term of this patent is extended or adjusted under 35 U.S.C. 154(b) by 864 days.

(21) Appl. No.: 12/197,924

(22) Filed: Aug. 25, 2008

(65) Prior Publication Data

US 2009/0022336 A1 Jan. 22, 2009

Related U.S. Application Data

(63) Continuation-in-part of application No. 12/037,928, filed on Feb. 26, 2008, now abandoned.

(60) Provisional application No. 60/891,677, filed on Feb. 26, 2007.

(51) Int. Cl.
*H04B 15/00* (2006.01)

(52) U.S. Cl. ...................................................... 381/94.7

(58) Field of Classification Search .............. 381/90-94, 381/94.7, 71

See application file for complete search history.

(56) References Cited

U.S. PATENT DOCUMENTS

| | | | |
|---|---|---|---|
| 4,649,505 | A | 3/1987 | Zinser, Jr. et al. |
| 4,912,767 | A | 3/1990 | Chang |
| 5,208,786 | A | 5/1993 | Weinstein et al. |
| 5,251,263 | A | 10/1993 | Andrea et al. |
| 5,327,178 | A | 7/1994 | McManigal |
| 5,375,174 | A | 12/1994 | Denenberg |
| 5,383,164 | A | 1/1995 | Sejnowski et al. |
| 5,471,538 | A | 11/1995 | Sasaki et al. |
| 5,675,659 | A | 10/1997 | Torkkola |
| 5,706,402 | A | 1/1998 | Bell |
| 5,770,841 | A | 6/1998 | Moed et al. |
| 5,999,567 | A | 12/1999 | Torkkola |
| 5,999,956 | A | 12/1999 | Deville |
| 6,002,776 | A | 12/1999 | Bhadkamkar et al. |
| 6,061,456 | A | 5/2000 | Andrea et al. |
| 6,108,415 | A | 8/2000 | Andrea |
| 6,130,949 | A | 10/2000 | Aoki et al. |
| 6,167,417 | A | 12/2000 | Parra et al. |
| 6,381,570 | B2 | 4/2002 | Li et al. |
| 6,385,323 | B1 | 5/2002 | Zoels |

(Continued)

FOREIGN PATENT DOCUMENTS

| | | |
|---|---|---|
| DE | 19849739 | 5/2000 |

(Continued)

OTHER PUBLICATIONS

Amari, S. et al. "A New Learning Algorithm for Blind Signal Separation." In: Advances in Neural Information Processing Systems 8 (pp. 757-763). Cambridge: MIT Press 1996.

(Continued)

*Primary Examiner* — Nathan Ha

(74) *Attorney, Agent, or Firm* — Espartaco Diaz Hidalgo

(57) ABSTRACT

Methods, apparatus, and systems for source separation include a converged plurality of coefficient values that is based on each of a plurality of M-channel signals. Each of the plurality of M-channel signals is based on signals produced by M transducers in response to at least one information source and at least one interference source. In some examples, the converged plurality of coefficient values is used to filter an M-channel signal to produce an information output signal and an interference output signal.

71 Claims, 27 Drawing Sheets

U.S. PATENT DOCUMENTS

| | | | | |
|---|---|---|---|---|
| 6,424,960 | B1 | 7/2002 | Lee et al. | |
| 6,526,148 | B1 | 2/2003 | Jourjine et al. | |
| 6,549,630 | B1 | 4/2003 | Bobisuthi | |
| 6,594,367 | B1 | 7/2003 | Marash et al. | |
| 6,606,506 | B1 | 8/2003 | Jones | |
| 7,027,607 | B2 | 4/2006 | Pedersen et al. | |
| 7,065,220 | B2 | 6/2006 | Warren et al. | |
| 7,076,069 | B2 | 7/2006 | Roeck | |
| 7,099,821 | B2 | 8/2006 | Visser et al. | |
| 7,113,604 | B2 | 9/2006 | Thompson | |
| 7,123,727 | B2 | 10/2006 | Elko et al. | |
| 7,155,019 | B2 | 12/2006 | Hou | |
| 7,203,323 | B2 | 4/2007 | Tashev | |
| 7,295,972 | B2 | 11/2007 | Choi | |
| 7,424,119 | B2 | 9/2008 | Reichel | |
| 7,471,798 | B2 | 12/2008 | Warren | |
| 7,474,755 | B2 | 1/2009 | Niederdrank | |
| 7,603,401 | B2 | 10/2009 | Parra et al. | |
| 2001/0037195 | A1 | 11/2001 | Acero et al. | |
| 2001/0038699 | A1 | 11/2001 | Hou | |
| 2002/0110256 | A1 | 8/2002 | Watson et al. | |
| 2002/0136328 | A1 | 9/2002 | Shimizu | |
| 2002/0193130 | A1 | 12/2002 | Yang et al. | |
| 2003/0055735 | A1 | 3/2003 | Cameron et al. | |
| 2003/0179888 | A1 | 9/2003 | Burnett et al. | |
| 2004/0039464 | A1 | 2/2004 | Virolainen et al. | |
| 2004/0120540 | A1 | 6/2004 | Mullenborn et al. | |
| 2004/0136543 | A1 | 7/2004 | White et al. | |
| 2004/0161121 | A1 | 8/2004 | Chol et al. | |
| 2004/0165735 | A1 | 8/2004 | Opitz | |
| 2005/0175190 | A1 | 8/2005 | Tashev et al. | |
| 2005/0195988 | A1 | 9/2005 | Tashev et al. | |
| 2005/0249359 | A1 | 11/2005 | Roeck | |
| 2005/0276423 | A1 | 12/2005 | Aubauer et al. | |
| 2006/0032357 | A1 | 2/2006 | Roovers et al. | |
| 2006/0053002 | A1 | 3/2006 | Visser et al. | |
| 2006/0083389 | A1 | 4/2006 | Oxford et al. | |
| 2006/0222184 | A1 | 10/2006 | Buck et al. | |
| 2007/0021958 | A1 | 1/2007 | Visser et al. | |
| 2007/0053455 | A1 | 3/2007 | Sugiyama | |
| 2007/0076900 | A1 | 4/2007 | Kellermann et al. | |
| 2007/0088544 | A1 | 4/2007 | Acero et al. | |
| 2007/0165879 | A1 | 7/2007 | Deng et al. | |
| 2007/0244698 | A1 | 10/2007 | Dugger et al. | |
| 2008/0175407 | A1 | 7/2008 | Zhang et al. | |
| 2008/0201138 | A1 | 8/2008 | Visser et al. | |
| 2008/0260175 | A1 | 10/2008 | Elko | |
| 2009/0164212 | A1 * | 6/2009 | Chan et al. | 704/226 |

FOREIGN PATENT DOCUMENTS

| | | |
|---|---|---|
| EP | 1006652 | 6/2000 |
| EP | 1796085 | 6/2007 |
| JP | 07131886 | 5/1995 |
| WO | WO0127874 | 4/2001 |
| WO | WO2004053839 | 6/2004 |
| WO | WO2005083706 | 9/2005 |
| WO | WO2006012578 | 2/2006 |
| WO | WO2006028587 | 3/2006 |
| WO | WO2006034499 | 3/2006 |
| WO | WO2007100330 | 9/2007 |
| WO | WO2007103037 | 9/2007 |

OTHER PUBLICATIONS

Amari, S.et al. "Stability Analysis of Learning Algorithms for Blind Source Separation," Neural Networks Letter, 10(8):1345-1351. 1997.

Bell, A. et al.: "An Information-Maximization Approach to Blind Separation and Blind Deconvolution," Howard Hughes Medical Institute, Computational Neurobiology Laboratory, The Salk Institute, La Jolla, CA USA and Department of Biology, University of California, San Diego, La Jolla, CA USA., pp. 1129-1159.

Cardosa, J-F., "Fourth-Order Cumulant Structure Forcing. Application to Blind Array Processing." Proc. IEEE SP Workshop on SSAP-92, pp. 136-139. 1992.

Cohen, I. et al., "Real-Time TF-GSC in Nonstationary Noise Environments", Israel Institute of Technology, pp. 1-4, Sep. 2003.

Cohen. I. et al. "Speech Enhancement Based on a Microphone Array and Log-Spectral Amplitude Estimation", Israel Institute of Technology, pp. 1-3. 2002.

Comon, P.: "Independent Component Analysis, A New Concept?," Thomson-Sintra, Valbonne Cedex, France, Signal Processing 36 (1994) 287-314, (Aug. 24, 1992).

First Examination Report dated Oct. 23, 2006 from Indian Application No. 1571/CHENP/2005.

Griffiths, L. et al. "An Alternative Approach to Linearly Constrained Adaptive Beamforming." IEEE Transactions on Antennas and Propagation, vol. AP-30(1):27-34. Jan. 1982.

Herault, J. et al., "Space or time adaptive signal processing by neural network models" Neural Networks for Computing, in J. S. Denker (Ed.). Proc. of the AIP Conference (pp. 206-211) New York: American Institute of Physics. 1986.

Hoshuyama, O. et al., "A robust adaptive beamformer for microphone arrays with a blocking matrix using constrained adaptive filters." IEEE Transcations on Signal Processing, 47(10):2677-2684. 1999.

Hoshuyama, O.et al., "Robust Adaptive Beamformer with a Blocking Matrix Using Coefficient-Constrained Adaptive Filters", IEICE Trans, Fundamentals, vol. E-82-A, No. 4, Apr. 1999, pp. 640-647.

Hua, T.P. et al., "A new self calibration-technique for adaptive microphne arrays," International workshop on Acoustic Echo and Noise Control Eindhoven, pp. 237-240, 2009.

Hyvarinen, A. et al. "A fast fixed-point algorithm for independent component analysis" Neural Computation, 9:1483-1492. 1997.

Hyvarinen, A. "Fast and robust fixed-point algorithms for independent component analysis." IEEE Trans. On Neural Networks, 10(3):626-634. 1999.

International Search Report—PCT/US2008/055050—International Search Authority, European Patent Office, May 23, 2008.

Jutten, C. et al.: "Blind Separation of Sources, Part I: An Adaptive Algorithm based on Neuromimetic Architecture," Elsevier Science Publishers B.V., Signal Processing 24 (1991) 1-10.

Lambert, R. H. "Multichannel blind deconvolution: FIR matrix algebra and seperation of multipath mixtures." Doctoral Dissertation, University of Southern California. May 1996.

Lee, Te-Won et al., "A contextual blind separation of delayed and convolved sources" Proceedings of the 1997 IEEE International Conference on Acoutsics, Speech, and Signal Processing (ICASSP' 97), 2:1199-1202. 1997.

Lee, Te-Won et. al. "A Unifying Information-Theoretic Framework for Independent Component Analysis" Computers and Mathematics with Applications 39 (2000) pp. 1-21.

Lee, Te-Won et. al.: "Combining Time-Delayed Decorrelation and ICA: Towards Solving The Cocktail Party Problem," p. 1249-1252, (1998).

Lee. T.-W. et al. "Independent Component Analysis for Mixed Sub-Gaussian and Super-Gaussian Sources." 4th Joint Symposium Neural Computation Proceedings, 1997, pp. 132-139.

Molgedey, L. et al., "Separation of a mixture of independent signals using time delayed correlations," Physical Review Letters, The American Physical Society, 72(23):3634-3637. 1994.

Mukai, R. et al., "Blind Source Separation and DOA Estimation Using Small 3-D Microphone Array," in Proc. of HSCMA 2005, pp. d-9-10, Piscataway, Mar. 2005.

Mukai, R., et al. "Frequency Domain Blind Source Separation of Many Speech Signals Using Near-field and Far-field Models," EURASIP Journal on Applied Signal Processing, vol. 2006, Article ID 83683, 13 pages, 2006. doi:10.1155/ASP/2006/83683.

Murata, N. et. al.:"An On-line Algorithm for Blind Source Separation on Speech Signals." Proc. of 1998 International Symposium on Nonlinear Theory and its Application (NOLTA98), pp. 923-926, LeRegent, Crans-Montana, Switzerland 1998.

Office Action dated Mar. 23, 2007 from co-pending US Appl. No. 11/463,376, filed Aug. 9, 2006.

Office Action dated Jul. 23, 2007 from co-pending U.S. Appl. No. 11/187,504, filed Jul. 22, 2005.

Parra, L. et al.. "An adaptive beamforming perspective on convolutive blind source separation" Chapter IV in Noise Reduction in Speech Applications, Ed. G. Davis, CRC Press: Princeton, NJ (2002).

Parra, L. et. al.: "Convolutive Blind Separation of Non-Stationary Sources," IEEE.
Platt, et al., "Networks for the separation of sources that are superimposed and delayed." In J. Moody, S. Hanson, R. Lippmann (Eds.), Advances in Neural Information Processing 4 (pp. 730-737). San Francisco: Morgan-Kaufmann. 1992.
Serviere, Ch. et al. "Permutation Correction in the Frequency Domain in Blind Separation of Speech Mixtures." EURASIP Journal on Applied Signal Processing, vol. 2006. article ID 75206, pp. 1-16, DOI: 10.1155/ASP/75206.
Taesu, K. et al: "Independent Vector Analysis: An Extension of ICA to Multivariate Components" Independent Component Analysis and Blind Signal Separation Lecture Notes in Computer Sciene; LNCS 3889, Springer-Verlag Berlin Heidelberg, Jan. 1, 2006, pp. 165-172, XP019028810.
Taesu Kim et al., 'Independent Vector Analysis: Definition and Algorithms,' ACSSC'06, pp. 1393-1396, Oct. 2006.
Tong, L. et al., "A Necessary and Sufficient Condition for the Blind Identification of Memoryless Systems." Circuits and Systems, IEEE International Symposium, 1:1-4. 1991.
Torkkola K., "Blind separation of convolved sources based on information maximization," IEEE workshop on Neural Networks for Signal Processing, Kyoto, Japan, Sep. 1996, pp. 423-432.
Torkkola, Kari. "Blind deconvolution, information maximization and recursive filters." IEEE International Conference on Acoustics, Speech, and Signal Processing (ICASSP'97), 4:3301-3304. 1997.
Van Compernolle, D. et al., "Signal Separation in a Symmetric Adaptive Noise Canceler by Output Decorrelation." Acoustics, Speech and Signal Processing, 1992, ICASSP-92., 1992 IEEE International Conference, 4:221-224.
Visser, E. et al. "A Spatio-temporal speech enhancement for robust speech recognition in noisy environments." University of California, San Diego. Institute for Neural Computation. White Paper. pp. 1-4, doi:10.1016/S0167-6393(03)00010-4 (Oct. 2003).
Visser, E. et al. "Speech enhancement using blind source separation and two-channel energy based speaker detection" Acoustics, Speech, and Signal Processing, 2003. Proceedings ICASSP'03 2003 IEEE International Conference on, vol. 1, Apr. 6-10, 2003, p. I.
Visser, E. et. al.: "Blind Source Separation in Mobile Environments Using A Priori Knowledge" Acoustics, Speech, and Signal Processing, 2004 Proceedings. (ICASSP '04).
Written Opinion—PCT/US2008/055050, International Search Authority, European Patent Office, May 23, 2008.
Yellin, D. et al. "Multichannel signal separation: Methods and analysis." IEEE Transactions on Signal Processing. 44(1):106-118, Jan. 1996.
Yermeche, Z. et al. A Constrained Subband Beamforming Algorithm for Speech Enhancement. Blekinge Institute of Technology. Department of Signal Processing, Dissertaion ( 2004). pp. 1-135.
Yermeche. Zohra. "Subband Beamforming for Speech Enhancement in Hands-Free Communication." Blekinge Institute of Technology, Department of Signal Processing, Research Report (Dec. 2004). pp. 1-74.
Araki S et al: "A Robust and Precise Method for Solving the Permutation Problem of Frequency-Domain Blind Source Separation" IEEE Transactions on Speech and Audio Processing, IEEE Service Center, New York, NY, US, vol. 12, No. 5, Sep. 1, 2004, pp. 530-538, XP011116331, ISSN: 1063-6676, DOI: DO1 : 10.1109/TSA. 2004. 832994 * paragraph [II. B] * * paragraphs [ III. A ], [ III. B ]* * figure 5 *.
Tatsuma, Junji et al., "A Study on Replacement Problem in Blind Signal Separation." Collection of Research Papers Reported in the General Meeting of the Institute of Electronics, Information and Communication Engineers, Japan, The Institute of Electronics, Information and Communication Engineers (IEICE), Mar. 8, 2004.

* cited by examiner

SYSTEMS, METHODS, AND APPARATUS FOR SIGNAL SEPARATION USING DATA DRIVEN TECHNIQUES

CLAIM OF PRIORITY UNDER 35 U.S.C. §119

The present Application for patent claims priority to Provisional Application No. 60/077,140, entitled "SYSTEMS, METHODS, AND APPARATUS FOR SIGNAL SEPARATION", filed Jun. 30, 2008, and assigned to the assignee hereof and hereby expressly incorporated by reference herein.

CLAIM OF PRIORITY UNDER 35 U.S.C. §120

The present Application for patent is a continuation-in-part of patent application Ser. No. 12/037,928 entitled "SYSTEMS, METHODS, AND APPARATUS FOR SIGNAL SEPARATION", filed Feb. 26, 2008, pending, and assigned to the assignee hereof, which claims priority to Provisional Application No. 60/891,677 entitled "SYSTEM AND METHOD FOR SEPARATION OF ACOUSTIC SIGNALS", filed Feb. 26, 2007 and assigned to the assignee hereof.

REFERENCE TO CO-PENDING APPLICATIONS FOR PATENT

The present Application for patent is related to the following co-pending patent applications:

U.S. patent application Ser. No. 10/537,985 by Visser et al., entitled "SYSTEM AND METHOD FOR SPEECH PROCESSING USING INDEPENDENT COMPONENT ANALYSIS UNDER STABILITY RESTRAINTS", filed Jun. 9, 2005; and International Pat. Appl. No. PCT/US2007/004966 by Chan et al., entitled "SYSTEM AND METHOD FOR GENERATING A SEPARATED SIGNAL", filed Feb. 27, 2007.

BACKGROUND

1. Field

This disclosure relates to signal processing.

2. Background

An information signal may be captured in an environment that is unavoidably noisy. Consequently, it may be desirable to distinguish an information signal from among superpositions and linear combinations of several source signals, including the signal from the information source and signals from one or more interference sources. Such a problem may arise in various different applications such as acoustic, electromagnetic (e.g., radio-frequency), seismic, and imaging applications.

One approach to separating a signal from such a mixture is to formulate an unmixing matrix that approximates an inverse of the mixing environment. However, realistic capturing environments often include effects such as time delays, multipaths, reflection, phase differences, echoes, and/or reverberation. Such effects produce convolutive mixtures of source signals that may cause problems with traditional linear modeling methods and may also be frequency-dependent. It is desirable to develop signal processing methods for separating one or more desired signals from such mixtures.

SUMMARY

A method of signal processing according to one configuration includes training a plurality of coefficient values of a source separation filter structure, based on a plurality of M-channel training signals, to obtain a converged source separation filter structure, where M is an integer greater than one; and deciding whether the converged source separation filter structure sufficiently separates each of the plurality of M-channel training signals into at least an information output signal and an interference output signal. In this method, at least one of the plurality of M-channel training signals is based on signals produced by M transducers in response to at least one information source and at least one interference source while the transducers and sources are arranged in a first spatial configuration, and another of the plurality of M-channel training signals is based on signals produced by M transducers in response to at least one information source and at least one interference source while the transducers and sources are arranged in a second spatial configuration different than the first spatial configuration.

An apparatus for signal processing according to another configuration includes an array of M transducers, where M is an integer greater than one; and a source separation filter structure having a trained plurality of coefficient values. In this apparatus, the source separation filter structure is configured to receive an M-channel signal that is based on signals produced by the array of M transducers and to filter the M-channel signal in real time to obtain a real-time information output signal, and the trained plurality of coefficient values is based on a plurality of M-channel training signals, and one of the plurality of M-channel training signals is based on signals produced by M transducers in response to at least one information source and at least one interference source while the transducers and sources are arranged in a first spatial configuration, and another of the plurality of M-channel training signals is based on signals produced by M transducers in response to at least one information source and at least one interference source while the transducers and sources are arranged in a second spatial configuration different than the first spatial configuration.

A computer-readable medium according to a configuration includes instructions which when executed by a processor cause the processor to train a plurality of coefficient values of a source separation filter structure, based on a plurality of M-channel training signals, to obtain a converged source separation filter structure, where M is an integer greater than one; and decide whether the converged source separation filter structure sufficiently separates each of the plurality of M-channel training signals into at least an information output signal and an interference output signal. In this medium, at least one of the plurality of M-channel training signals is based on signals produced by M transducers in response to at least one information source and at least one interference source while the transducers and sources are arranged in a first spatial configuration, and another of the plurality of M-channel training signals is based on signals produced by M transducers in response to at least one information source and at least one interference source while the transducers and sources are arranged in a second spatial configuration different than the first spatial configuration.

An apparatus for signal processing according to a configuration includes an array of M transducers, where M is an integer greater than one; and means for performing a source separation filtering operation according to a trained plurality of coefficient values. In this apparatus, the means for performing a source separation filtering operation is configured to receive an M-channel signal that is based on signals produced by the array of M transducers and to filter the M-channel signal in real time to obtain a real-time information output signal, and the trained plurality of coefficient values is based on a plurality of M-channel training signals, and one of the plurality of M-channel training signals is based on signals produced by M transducers in response to at least one information source and at least one interference source while the transducers and sources are arranged in a first spatial configuration, and another of the plurality of M-channel training signals is based on signals produced by M transducers in response to at least one information source and at least one interference source while the transducers and sources are arranged in a second spatial configuration different than the first spatial configuration.

A method of signal processing according to one configuration includes training a plurality of coefficient values of a source separation filter structure, based on a plurality of M-channel training signals, to obtain a converged source separation filter structure, where M is an integer greater than one; and deciding whether the converged source separation filter structure sufficiently separates each of the plurality of M-channel training signals into at least an information output signal and an interference output signal. In this method, each of the plurality of M-channel training signals is based on signals produced by M transducers in response to at least one information source and at least one interference source, and at least two of the plurality of M-channel training signals differ with respect to at least one of (A) a spatial feature of the at least one information source, (B) a spatial feature of the at least one interference source, (C) a spectral feature of the at least one information source, and (D) a spectral feature of the at least one interference source, and said training a plurality of coefficient values of a source separation filter structure includes updating the plurality of coefficient values according to at least one among an independent vector analysis algorithm and a constrained independent vector analysis algorithm.

An apparatus for signal processing according to another configuration includes an array of M transducers, where M is an integer greater than one; and a source separation filter structure having a trained plurality of coefficient values. In this apparatus, the source separation filter structure is configured to receive an M-channel signal that is based on signals produced by the array of M transducers and to filter the M-channel signal in real time to obtain a real-time information output signal, and the trained plurality of coefficient values is based on a plurality of M-channel training signals, and each of the plurality of M-channel training signals is based on signals produced by M transducers in response to at least one information source and at least one interference source, and at least two of the plurality of M-channel training signals differ with respect to at least one of (A) a spatial feature of the at least one information source, (B) a spatial feature of the at least one interference source, (C) a spectral feature of the at least one information source, and (D) a spectral feature of the at least one interference source, and the trained plurality of coefficient values is based on updating a plurality of coefficient values according to at least one among an independent vector analysis algorithm and a constrained independent vector analysis algorithm.

DETAILED DESCRIPTION

Systems, methods, and apparatus disclosed herein may be adapted for processing signals of many different types, including acoustic signals (e.g., speech, sound, ultrasound, sonar), physiological or other medical signals (e.g., electrocardiographic, electroencephalographic, magnetoencephalographic), and imaging and/or ranging signals (e.g., magnetic resonance, radar, seismic). Applications for such systems, methods, and apparatus include uses in speech feature extraction, speech recognition, and speech processing.

In the following description, the symbol i is used in two different ways. When used as a factor, the symbol i denotes the imaginary square root of −1. The symbol i is also used to indicate an index, such as a column of a matrix or element of a vector. Both usages are common in the art, and one of skill will recognize which one of the two is intended from the context in which each instance of the symbol i appears. In the following description, the notation diag(X) as applied to a matrix X indicates the matrix whose diagonal is equal to the diagonal of X and whose other values are zero.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, and/or selecting from a set of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B").

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa).

Figure 1A:
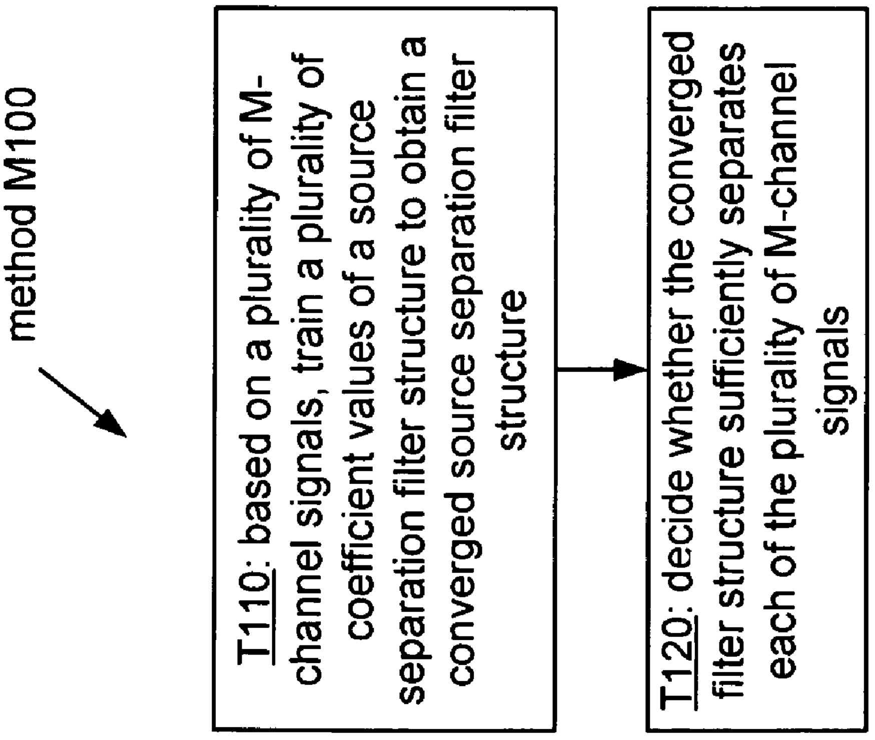
FIG. 1A shows a flowchart of a method M100 to produce a converged filter structure according to a general disclosed configuration.

FIG. 1A shows a flowchart of a method M100 to produce a converged filter structure according to a general disclosed configuration. Based on a plurality (e.g., a series) of M-channel signals (where M is greater than one), task T110 trains a plurality of filter coefficient values of a source separation filter structure to obtain a converged source separation filter structure. Task T120 decides whether the converged filter structure sufficiently separates each of the plurality of M-channel signals into at least an information output signal and an interference output signal.

A person having ordinary skill in the art will recognize that task T110 may include updating the plurality of filter coefficient values based on an adaptive algorithm. A source separation algorithm is an example of an adaptive algorithm. As described below, a series of P M-channel signals may be captured and used to train the plurality of filter coefficient values. Other terms such as "update", "learn", "adapt", or "converge" may also be used herein as synonyms for "train". The updating may continue or terminate according to a decision in task T120. In a typical application, tasks T110 and T120 (and possibly one or more similar tasks) are executed serially offline to obtain the converged plurality of coefficient values, and task T130 as described below may be performed offline (or online, or both offline and online) to filter a signal based on the converged plurality of coefficient values.

In method M100, the M-channel training signals are each based on signals produced by at least M transducers in response to at least one information source and at least one interference source. The transducer signals are typically sampled, may be pre-processed (e.g., filtered for echo cancellation, noise reduction, spectrum shaping, etc.), and may even be pre-separated (e.g., by another source separator or adaptive filter as described herein). For acoustic applications such as speech, typical sampling rates range from 8 kHz to 16 kHz.

Each of the M channels is based on the output of a corresponding one of the M transducers. Depending on the particular application, the M transducers may be designed to sense acoustic signals, electromagnetic signals, vibration, or another phenomenon. For example, antennas may be used to sense electromagnetic waves, and microphones may be used to sense acoustic waves. A transducer may have a response that is omnidirectional, bidirectional, or unidirectional (e.g., cardioid). For acoustic applications, the various types of transducers that may be used include piezoelectric microphones, dynamic microphones, and electret microphones.

Each one of the plurality P of M-channel training signals is based on input data captured (e.g., recorded) under a different corresponding one of P scenarios, where P may be equal to two but is generally an integer greater than one. As described below, each of the P scenarios may comprise a different spatial feature (e.g., a different handset or headset orientation) and/or a different spectral feature (e.g., the capturing of sound sources which may have different properties).

As described in more detail below, the P scenarios may relate to different orientations of a portable communications device, such as a handset or headset having at least M transducers (e.g., microphones), relative to an information source such as a user's mouth.

Figure 1B:
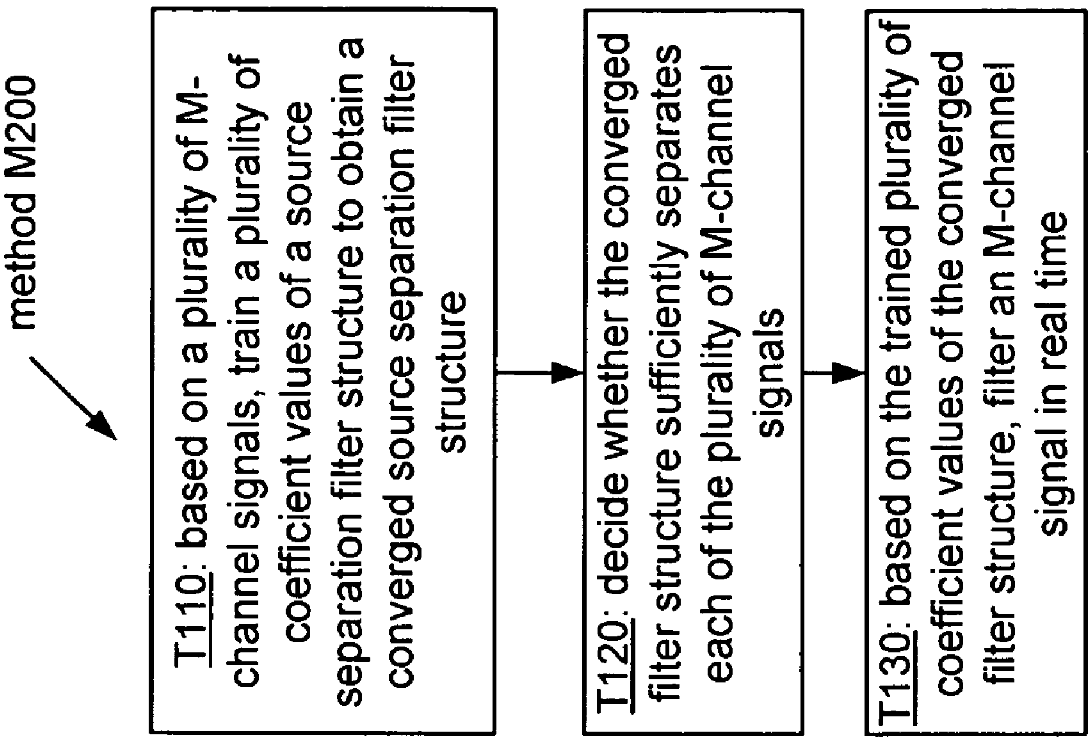
FIG. 1B shows a flowchart of an implementation M200 of method M100.

FIG. 1B shows a flowchart of an implementation M200 of method M100. Method M200 includes a task T130 that filters an M-channel signal in real time, based on the trained plurality of coefficient values of the converged filter structure.

Even in the case of normal speech in a relatively quiet environment, an M-channel signal may be considered to be a mixture signal. For such a case in which an information source is relatively strong (e.g., a person is talking) and the interference source is weak (e.g., there is little ambient noise), the partial mixture may be said to be very low.

The same M transducers may be used to capture the signals upon which all of the M-channel signals in the series are based. Alternatively, it may be desirable for the set of M transducers used to capture the signal upon which one signal of the series is based to differ (in one or more of the transducers) from the set of M transducers used to capture the signal upon which another signal of the series is based. For example, it may be desirable to use different sets of transducers in order to produce a plurality of filter coefficient values that is robust to some degree of variation among the transducers.

Each of the P scenarios includes at least one information source and at least one interference source. Typically each of these sources is a transducer, such that each information source is a transducer reproducing a signal appropriate for the particular application, and each interference source is a transducer reproducing a type of interference that may be expected in the particular application. In an acoustic application, for example, each information source may be a loudspeaker reproducing a speech signal or a music signal, and each interference source may be a loudspeaker reproducing an interfering acoustic signal, such as another speech signal or ambient background sound from a typical expected environment, or a noise signal. The various types of loudspeaker that may be used include electrodynamic (e.g., voice coil) speakers, piezoelectric speakers, electrostatic speakers, ribbon speakers, planar magnetic speakers, etc. A source that serves as an information source in one scenario or application may serve as an interference source in a different scenario or application. It will be understood by a person having ordinary skill in the art that the term "sound source" may also indicate a source of reflected sound. For example, a sound produced by a driver sound source, such as a loudspeaker, may be reflected by a wall or other object to produce a different sound. For acoustic applications, recording or capturing of the input data from the M transducers in each of the P scenarios may be performed using an M-channel tape recorder, a computer with M-channel sound recording or capturing capability, or another device capable of recording or capturing the output of the M transducers simultaneously (e.g., to within the order of a sampling resolution).

Figure 2:
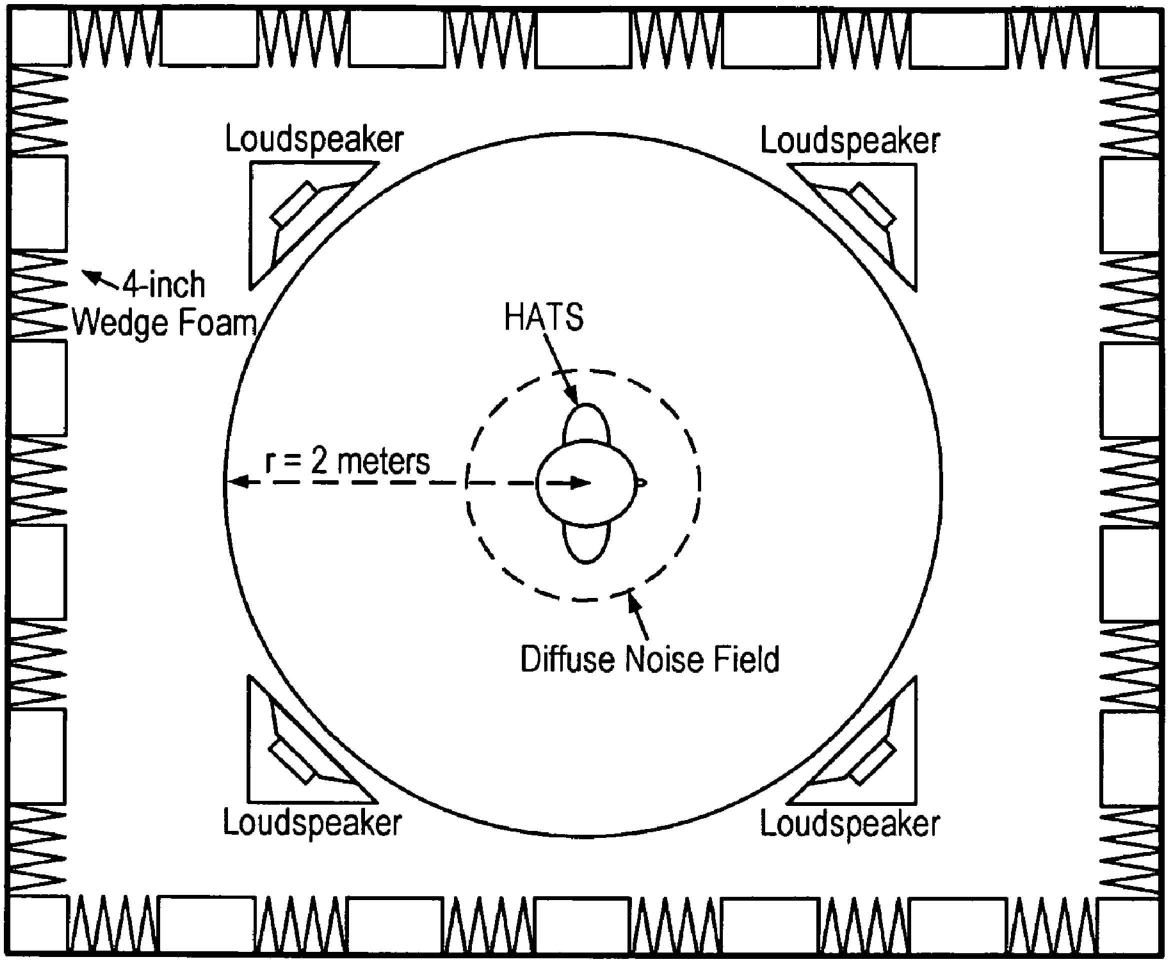
FIG. 2 shows an example of an acoustic anechoic chamber configured for recording of training data.

An acoustic anechoic chamber may be used for capturing signals used for training upon which the series of M-channel signals are based. FIG. 2 shows an example of an acoustic anechoic chamber configured for recording of training data. In this example, a Head and Torso Simulator (HATS, as manufactured by Bruel & Kjaer, Naerum, Denmark) is positioned within an inward-focused array of interference sources (i.e., the four loudspeakers). In such case, the array of interference sources may be driven to create a diffuse noise field that encloses the HATS as shown. In other cases, one or more such interference sources may be driven to create a noise field having a different spatial distribution (e.g., a directional noise field).

Types of noise signals that may be used include white noise, pink noise, grey noise, and Hoth noise (e.g., as described in IEEE Standard 269-2001, "Draft Standard Methods for Measuring Transmission Performance of Analog and Digital Telephone Sets, Handsets and Headsets", as promulgated by the Institute of Electrical and Electronics Engineers (IEEE), Piscataway, N.J.). Other types of noise signals that may be used, especially for non-acoustic applications, include brown noise, blue noise, and purple noise.

The P scenarios differ from one another in terms of at least one spatial and/or spectral feature. The spatial configuration of sources and recording transducers may vary from one scenario to another in any one or more of the following ways: placement and/or orientation of a source relative to the other source or sources, placement and/or orientation of a recording transducer relative to the other recording transducer or transducers, placement and/or orientation of the sources relative to the recording transducers, and placement and/or orientation of the recording transducers relative to the sources. For example, at least two among the P scenarios may correspond to a set of transducers and sources arranged in different spatial configurations, such that at least one of the transducers or sources among the set has a position or orientation in one scenario that is different from its position or orientation in the other scenario.

Spectral features that may vary from one scenario to another include the following: spectral content of at least one source signal (e.g., speech from different voices, noise of different colors), and frequency response of one or more of the recording transducers. In one particular example as mentioned above, at least two of the scenarios differ with respect to at least one of the recording transducers (in other words, at least one of the recording transducers used in one scenario is replaced with another transducer or is not used at all in the other scenario). Such a variation may be desirable to support a solution that is robust over an expected range of changes in transducer frequency and/or phase response and/or is robust to failure of a transducer.

In another particular example, at least two of the scenarios include background noise and differ with respect to the signature of the background noise (i.e., the statistics of the noise over frequency and/or time). In such case, the interference sources may be configured to emit noise of one color (e.g., white, pink, or Hoth) or type (e.g., a reproduction of street noise, babble noise, or car noise) in one of the P scenarios and to emit noise of another color or type in another of the P scenarios (for example, babble noise in one scenario, and street and/or car noise in another scenario).

At least two of the P scenarios may include information sources producing signals having substantially different spectral content. In a speech application, for example, the information signals in two different scenarios may be different voices, such as two voices that have average pitches (i.e., over the length of the scenario) which differ from each other by not less than ten percent, twenty percent, thirty percent, or even fifty percent. Another feature that may vary from one scenario to another is the output amplitude of a source relative to that of the other source or sources. Another feature that may vary from one scenario to another is the gain sensitivity of a recording transducer relative to that of the other recording transducer or transducers.

As described below, the P M-channel training signals are used to obtain a converged plurality of filter coefficient values. The duration of each of the P training signals may be selected based on an expected convergence rate of the training operation. For example, it may be desirable to select a duration for each training signal that is long enough to permit significant progress toward convergence but short enough to allow other M-channel training signals to also contribute substantially to the converged solution. In a typical acoustic application, each of the P M-channel training signals lasts from about one-half or one to about five or ten seconds. For a typical training operation, copies of the P M-channel training signals are concatenated in a random order to obtain a sound file to be used for training. Typical lengths for a training file include 10, 30, 45, 60, 75, 90, 100, and 120 seconds.

Figure 3A:
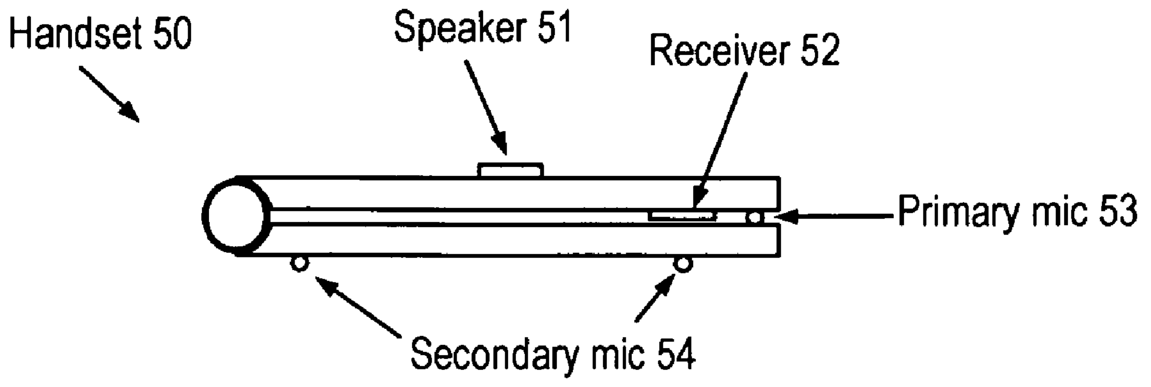
FIGS. 3A and 3B show an example of a mobile user terminal 50 in two different operating configurations.
Figure 3B:
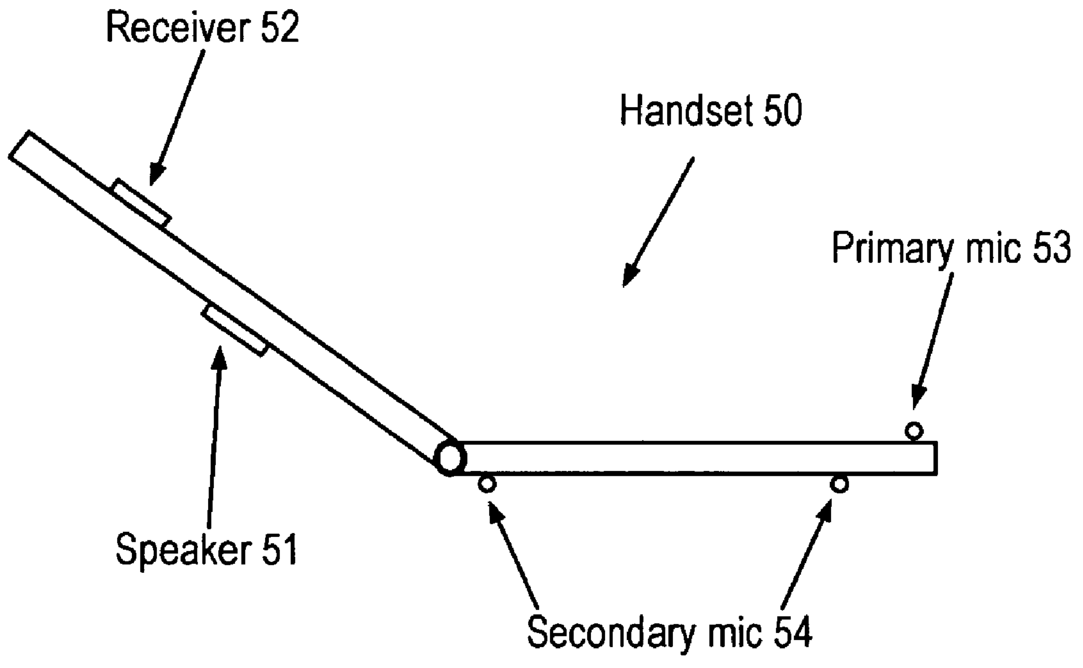
Figure 4A:
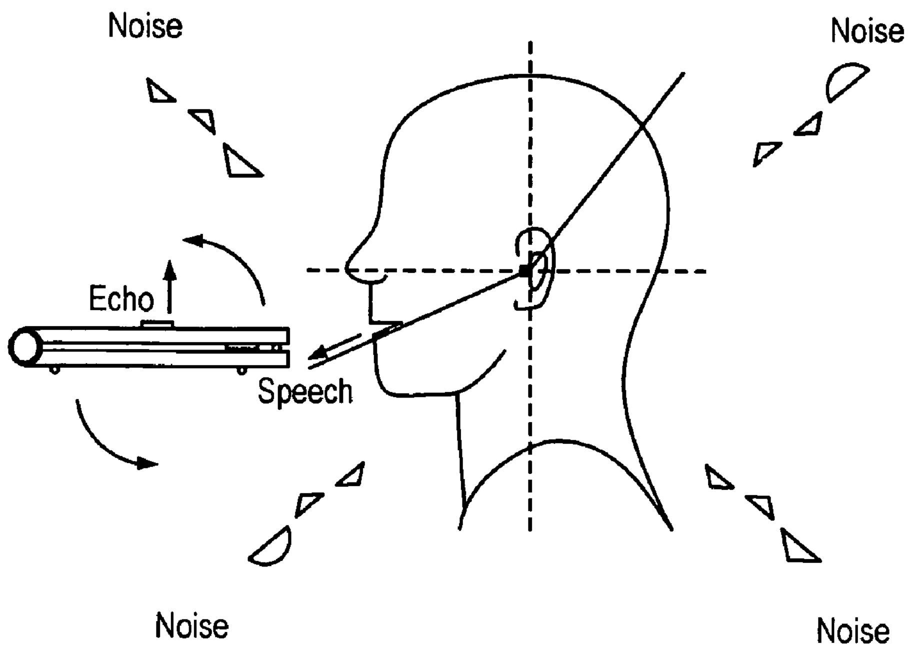
FIGS. 4A and 4B show the mobile user terminal of FIGS. 3A-B in two different training scenarios.
Figure 4B:
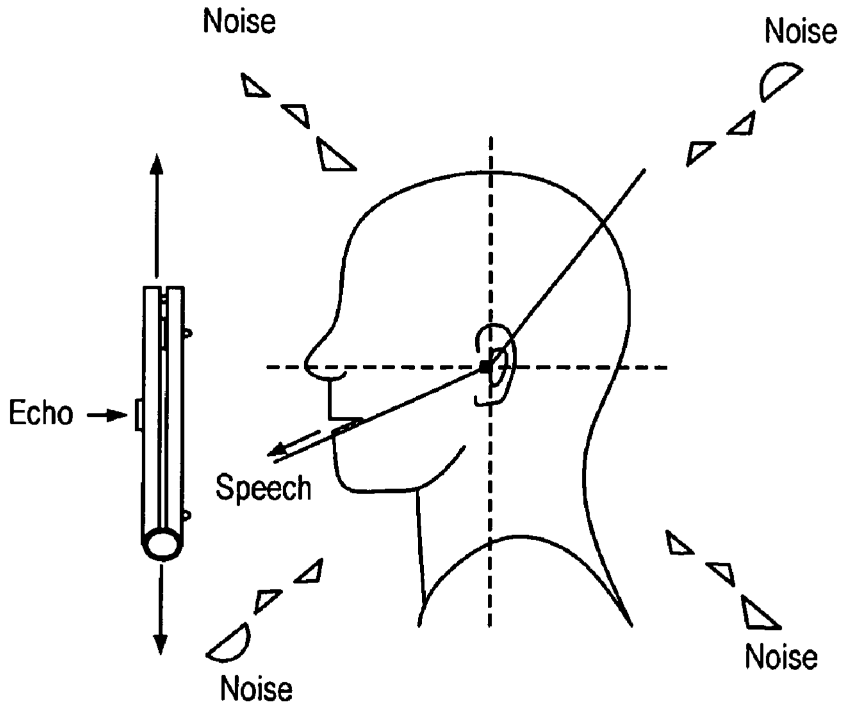

In one particular set of applications, the M transducers are microphones of a portable device for wireless communications such as a cellular telephone handset. FIGS. 3A and 3B show two different operating configurations of one such device 50. In this particular example, M is equal to three (the primary microphone 53 and two secondary microphones 54). For the hands-free operating configuration shown in FIG. 3A, the far-end signal is reproduced by speaker 51, and FIGS. 4A and 4B show two different possible orientations of the device with respect to a user's mouth. These two orientations may be used in different ones of the P scenarios. For example, it may be desirable for one of the M-channel training signals to be based on signals produced by the microphones in one of these two orientations and for another of the M-channel training signals to be based on signals produced by the microphones in the other of these two orientations.

Figure 5A:
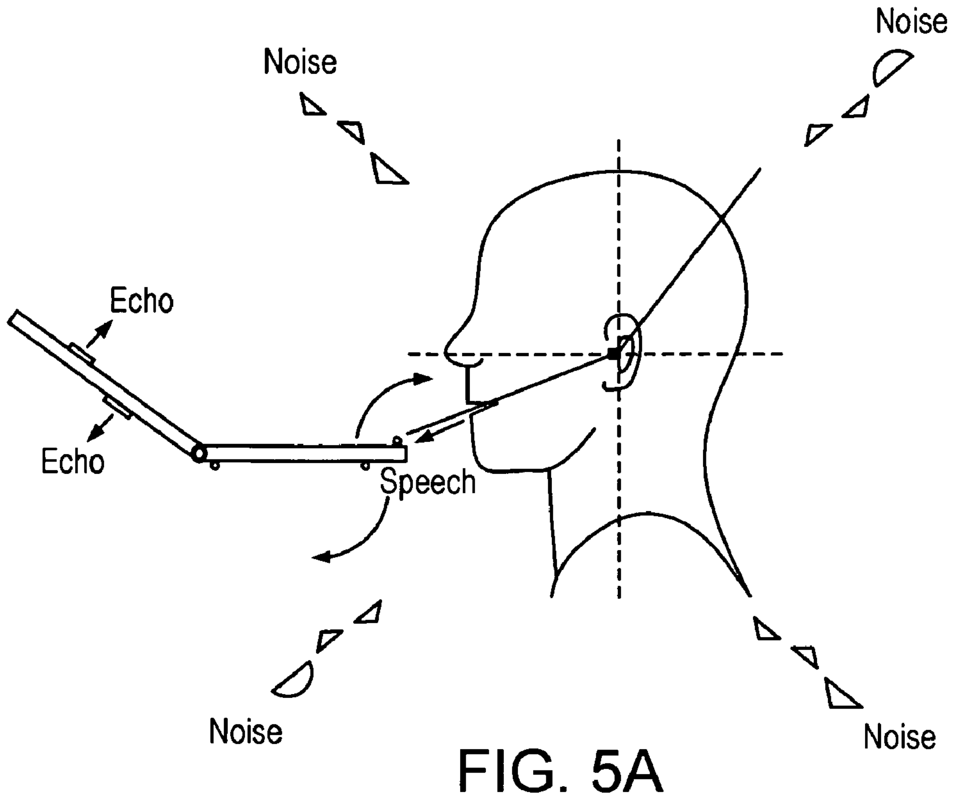
FIGS. 5A and 5B show the mobile user terminal of FIGS. 3A-B in two more different training scenarios.
Figure 5B:
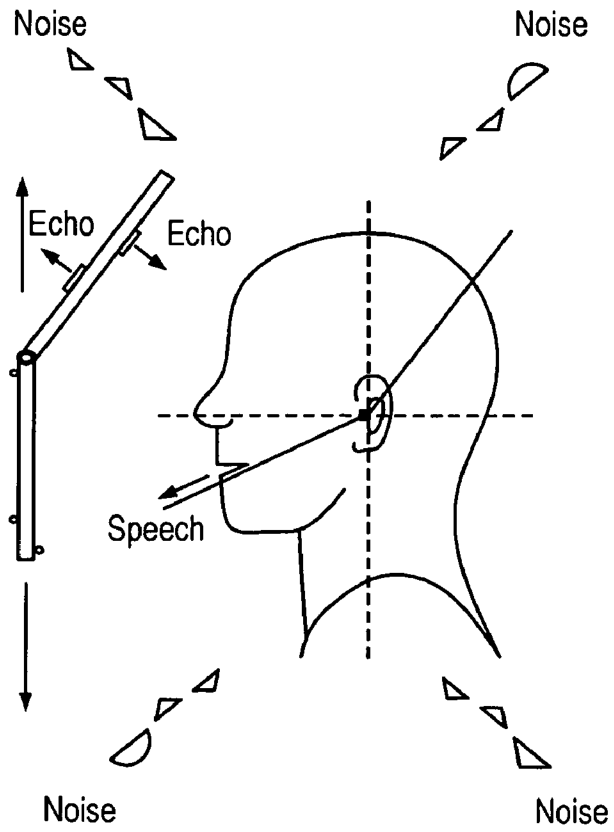

For the normal operating configuration shown in FIG. 3B, the far-end signal is reproduced by receiver 52, and FIGS. 5A and 5B show two different possible orientations of the device with respect to a user's mouth. These two orientations may be used in different ones of the P scenarios. For example, it may be desirable for one of the M-channel training signals to be based on signals produced by the microphones in one of these two orientations and for another of the M-channel training signals to be based on signals produced by the microphones in the other of these two orientations. Of course, it is possible for a portable device, such as a handset, to have more than two operating configurations. In some of these configurations, the device may be limited to a single orientation, while in other configurations, two or more orientations may be possible.

In one example, method M100 is implemented to produce a trained plurality of coefficient values for the hands-free operating configuration of FIG. 3A, and a different trained plurality of coefficient values for the normal operating configuration of FIG. 3B. Such an implementation of method M100 may be configured to execute one instance of task T110 to produce one of the trained pluralities of coefficient values, and to execute another instance of task T110 to produce the other trained plurality of coefficient values. In such case, task T130 of method M200 may be configured to select among the two trained pluralities of coefficient values at runtime (e.g., according to the state of a switch that indicates whether the device is open or closed). Alternatively, method M100 may be implemented to produce a single trained plurality of coefficient values by serially updating a plurality of coefficient values according to each of the four orientations shown in FIGS. 4A, 4B, 5A, and 5B.

For each of the P training scenarios in this speech application, the information signal may be provided to the M transducers by reproducing from the user's mouth artificial speech (as described in ITU-T Recommendation P.50, International Telecommunication Union, Geneva, CH, Mar. 1993) and/or a voice uttering standardized vocabulary such as one or more of the Harvard Sentences (as described in IEEE Recommended Practices for Speech Quality Measurements in IEEE Transactions on Audio and Electroacoustics, vol. 17, pp. 227-46, 1969). In one such example, the speech is reproduced from the mouth loudspeaker of a HATS at a sound pressure level of 89 dB. At least two of the P training scenarios may differ from one another with respect to this information signal. For example, different scenarios may use voices having substantially different pitches. Additionally or in the alternative, at least two of the P training scenarios may use different instances of the handset device (e.g., to support a converged solution that is robust to variations in response of the different microphones).

A scenario may include driving the speaker of the handset (e.g., by artificial speech and/or a voice uttering standardized vocabulary) to provide a directional interference source. For the hands-free operating configuration of FIG. 3A, such a scenario may include driving speaker 51, while for the normal operating configuration of FIG. 3B, such a scenario may include driving receiver 52. A scenario may include such an interference source in addition to, or in the alternative to, a diffuse noise field created, for example, by an array of interference sources as shown in FIG. 2. In one such example, the array of loudspeakers is configured to play back noise signals at a sound pressure level of 75 to 78 dB at the HATS ear reference point or mouth reference point.

Figure 6:
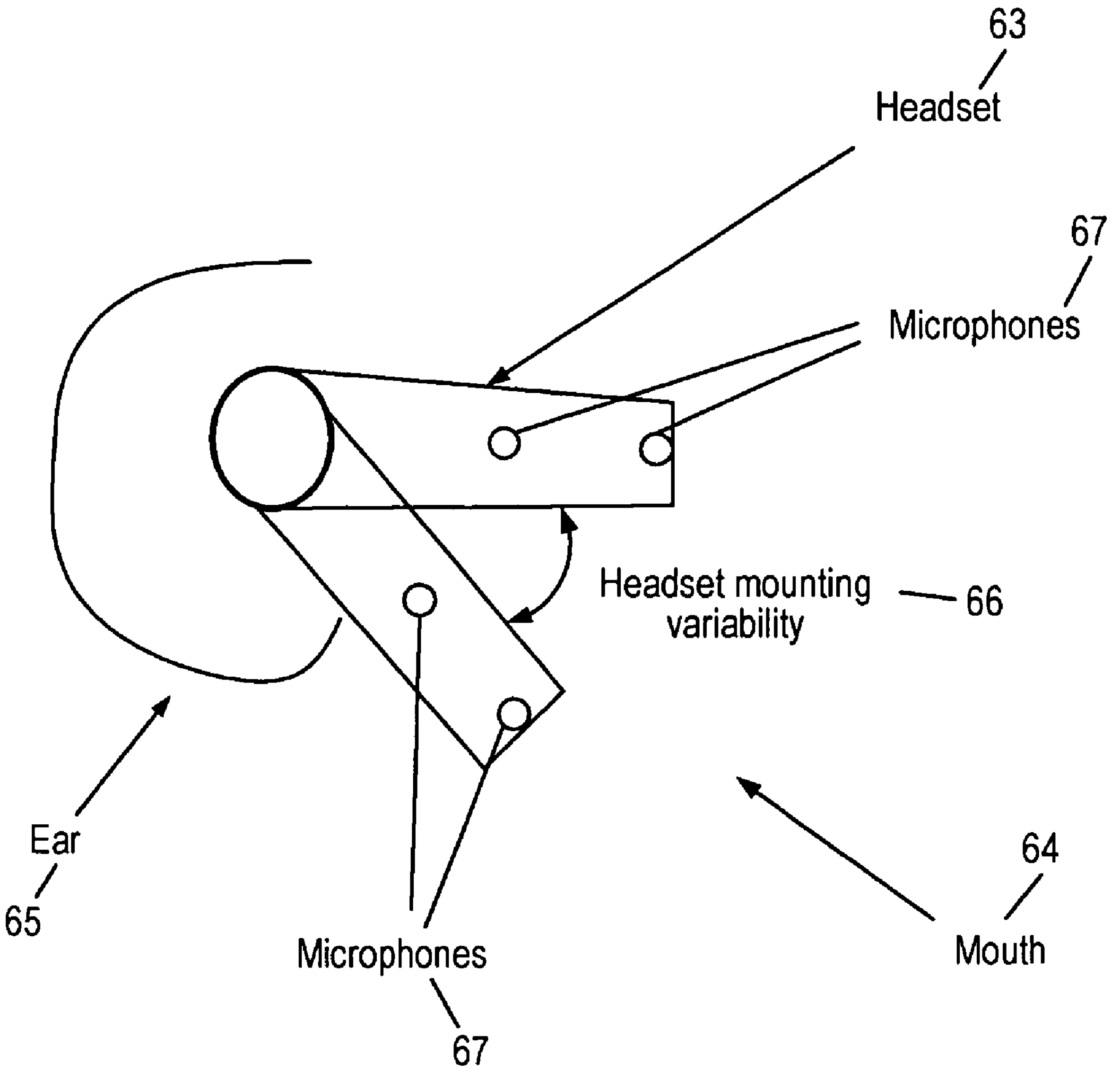
FIG. 6 shows an example of a headset 63.

In another particular set of applications, the M transducers are microphones of a wired or wireless earpiece or other headset. For example, such a device may be configured to support half- or full-duplex telephony via communication with a telephone device such as cellular telephone handset (e.g., using a version of the Bluetooth™ protocol as promulgated by the Bluetooth Special Interest Group, Inc., Bellevue, Wash.). FIG. 6 shows one example 63 of such a headset that is configured to be worn on a user's ear 65. Headset 63 has two microphones 67 that are arranged in an endfire configuration with respect to the user's mouth 64.

The training scenarios for such a headset may include any combination of the information and/or interference sources as described with reference to the handset applications above. Another difference that may be modeled by different ones of the P training scenarios is the varying angle of the transducer axis with respect to the ear, as indicated in FIG. 6 by headset mounting variability 66. Such variation may occur in practice from one user to another. Such variation may even with respect to the same user over a single period of wearing the device. It will be understood that such variation may adversely affect signal separation performance by changing the direction and distance from the transducer array to the user's mouth. In such case, it may be desirable for one of the plurality of M-channel training signals to be based on a scenario in which the headset is mounted in the ear 65 at an angle at or near one extreme of the expected range of mounting angles, and for another of the M-channel training signals to be based on a scenario in which the headset is mounted in the ear 65 at an angle at or near the other extreme of the expected range of mounting angles. Others of the P scenarios may include one or more orientations corresponding to angles that are intermediate between these extremes.

Figure 7:
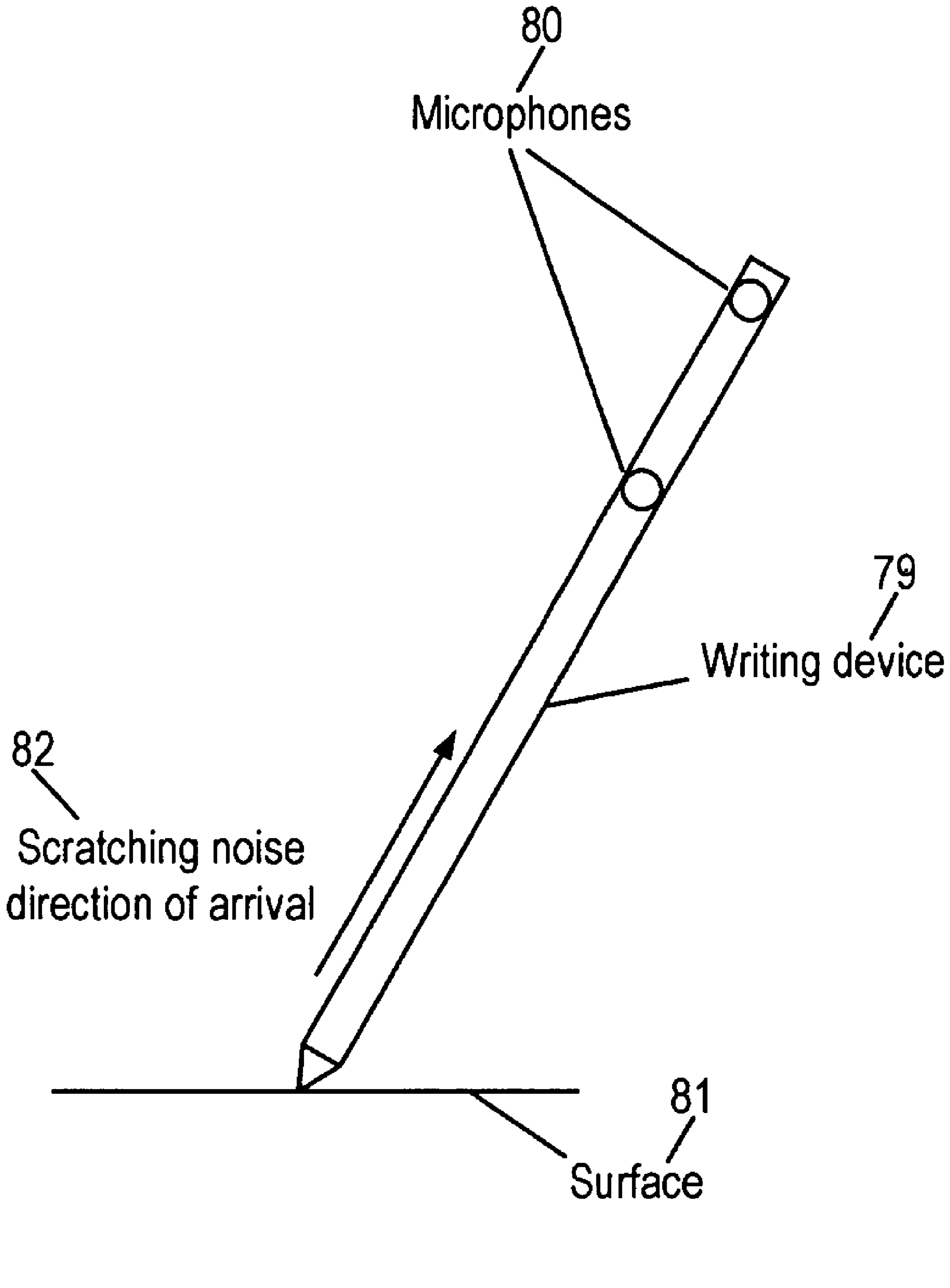
FIG. 7 shows an example of a writing instrument (e.g., a pen) or stylus 79 having a linear array of microphones.

In a further set of applications, the M transducers are microphones provided within a pen, stylus, or other drawing device. FIG. 7 shows one example of such a device 79 in which the microphones 80 are disposed in a endfire configuration with respect to scratching noise 82 that arrives from the tip and is caused by contact between the tip and a drawing surface 81. The training scenarios for such a device may include any combination of the information and/or interference sources as described with reference to the handset applications above. Additionally or in the alternative, different scenarios may include drawing the tip of the device 79 across different surfaces to elicit differing instances of scratching noise 82 (e.g., having different signatures in time and/or frequency). As compared to the handset and headset applications discussed above, it may be desirable in such an application for method M100 to train a plurality of coefficient values to separate an interference source (i.e., the scratching noise) rather than an information source (i.e., the user's voice). In such case, the separated interference may be removed from a desired signal in a later processing stage as described below.

Figure 8:
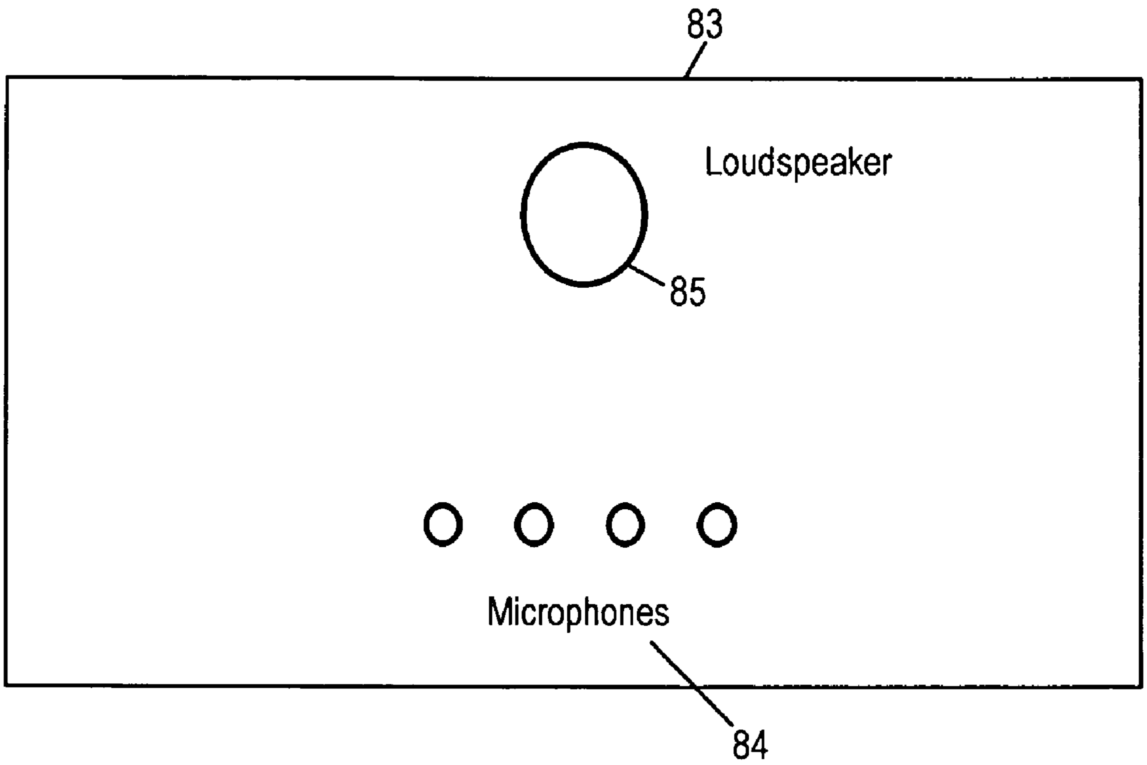
FIG. 8 shows an example of a hands-free car kit 83.
Figure 9:
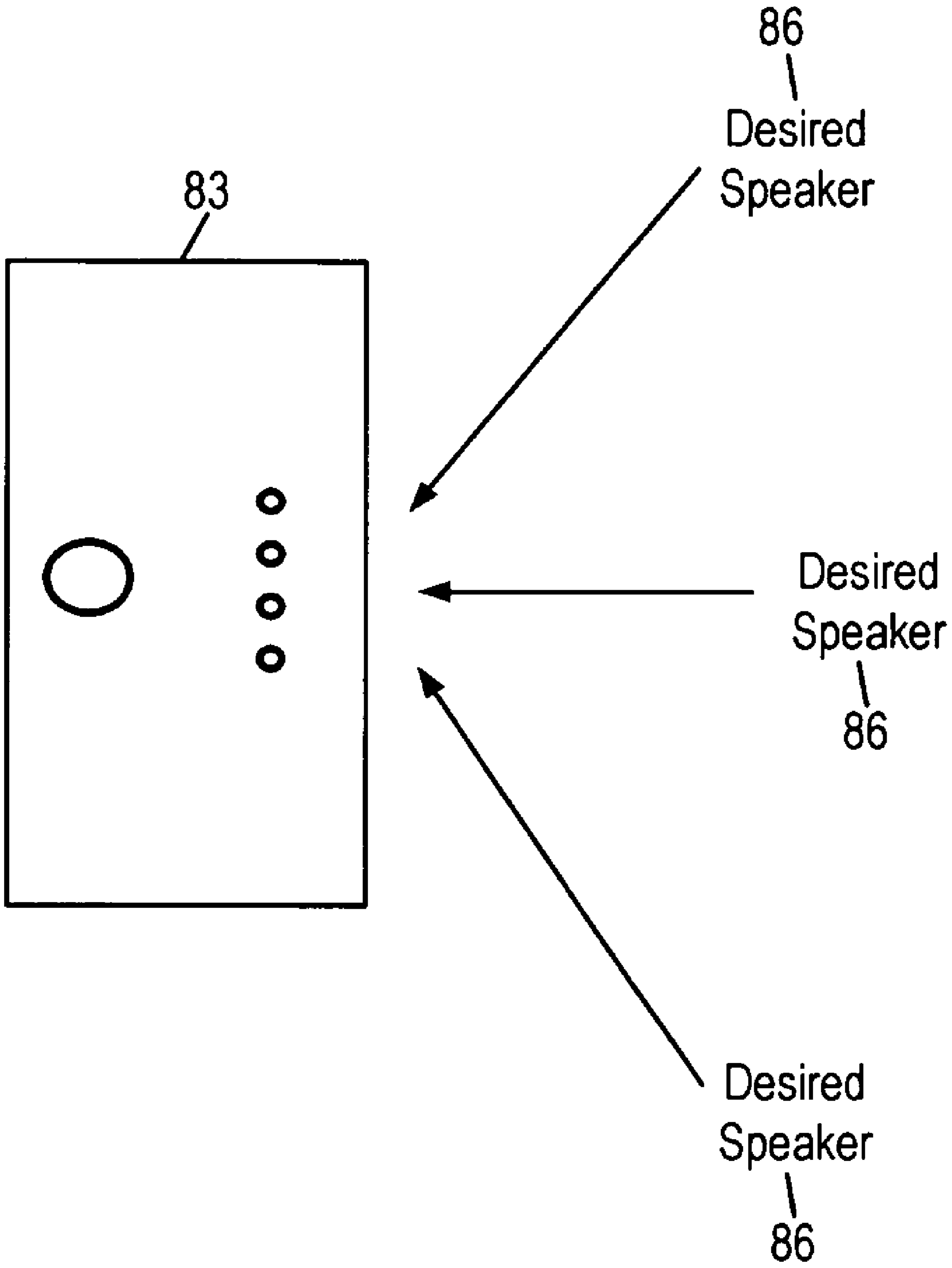
FIG. 9 shows an example of an application of the car kit of FIG. 8.

In a further set of applications, the M transducers are microphones provided in a hands-free car kit. FIG. 8 shows one example of such a device 83 in which the loudspeaker 85 is disposed broadside to the transducer array 84. The training scenarios for such a device may include any combination of the information and/or interference sources as described with reference to the handset applications above. In a particular example, two instances of method M100 are performed to generate two different trained pluralities of coefficient values. The first instance includes training scenarios that differ in the placement of the desired speaker with respect to the microphone array, as shown in FIG. 9. The scenarios for this instance may also include interference such as a diffuse or directional noise field as described above.

Figure 18A:
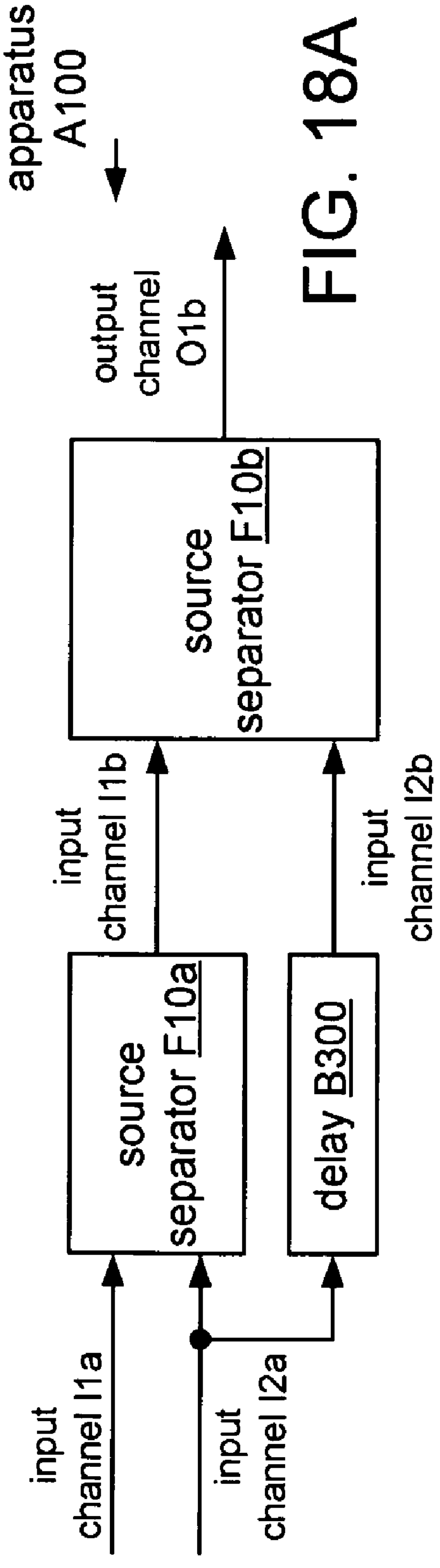
FIG. 18A shows a block diagram of an apparatus A100 that includes two instances F10*a* and F10*b* of source separator F10 arranged in a cascade configuration.

The second instance includes training scenarios in which an interfering signal is reproduced from the loudspeaker 85. Different scenarios may include interfering signals reproduced from loudspeaker 85, such as music and/or voices having different signatures in time and/or frequency (e.g., substantially different pitch frequencies). The scenarios for this instance may also include interference such as a diffuse or directional noise field as described above. It may be desirable for this instance of method M100 to train the corresponding plurality of coefficient values to separate the interfering signal from the interference source (i.e., loudspeaker 85). As illustrated in FIG. 18A, the two trained pluralities of coefficient values may be used to configure respective instances F10*a*, F10*b* of a source separator F10 as described below that are arranged in a cascade configuration, where delay B300 is provided to compensate for processing delay of the source separator F10*a*. In this and similar input arrangements described below, primary input channel I1*a* (e.g., from a primary microphone of a handset or a boom-end microphone of a headset) is assumed to be likely to carry most of the desired information signal, and secondary input channel I2*a* is assumed to be likely to carry an interference signal. Input channel I1*b* carries an information or combination signal outputted by source separator F10*a*, and input channel I2*b* carries a delayed version of input channel I2*a*.

While HATS is being described as the test device of choice in all these design steps, any other humanoid simulation (simulator) or human speaker can be substituted for a desired speech generating source. It is advantageous to use at least some amount of background noise to better condition the separation matrices over all frequencies. Alternatively, the testing may be performed by the user prior to use or during use. For example, the testing can be personalized based on the features of the user, such as distance of transducers to the mouth, or based on the environment. A series of preset "questions" can be designed for the user, e.g., the end user, to condition the system to particular features, traits, environments, uses, etc.

A procedure as described above may be combined into one testing and learning stage by playing the desired speaker signal back from HATS along with the interfering source signals to simultaneously design fixed beam and null beamformers for a particular application.

The trained converged filter solutions (to be implemented, e.g., as real time fixed filter designs) should, in preferred embodiments, trade off self noise against frequency and spatial selectivity. For speech applications as described above, the variety of desired speaker directions may lead to a rather broad null corresponding to one output channel and a broad beam corresponding to the other output channel. The beampatterns and white noise gain of the obtained filters can be adapted to the microphone gain and phase characteristics as well as the spatial variability of the desired speaker direction and noise frequency content. If required, the microphone frequency responses can be equalized before the training data is recorded. In one example, by recording data with a particular playback loudness in quiet and noisy backgrounds for a particular environment, the converged filter solutions will have modeled the particular microphone gain and phase characteristics and adapted to a range of spatial and spectral properties of the device. The device may have specific noise characteristics and resonance modes that are modeled in this manner. Since the learned filter is typically adapted to the particular data, it is data dependent and the resulting beam pattern and white noise gain have to be analyzed and shaped in an iterative manner by changing learning rates, the variety of training data and the number of sensors. Alternatively, a wide beampattern can be obtained from a standard data-independent and possibly frequency-invariant beamformer design (superdirective beamformers, least-squares beamformers, statistically optimal beamformer, etc.). Any combination of these data dependent or data independent designs may be appropriate for a particular application. In the case of data independent beamformers, beampatterns can be shaped by tuning the noise correlation matrix for example.

Although some of the pre-processing designs make use of offline designed learned filters, the microphone characteristics may drift over time. Alternatively or additionally, the array configuration may change mechanically over time. Consequently, it may be desirable to use an online calibration routine to match one or more microphone frequency properties and/or sensitivities (e.g., a ratio between the microphone gains) on a periodic basis. For example, it may be desirable to recalibrate the gains of the microphones to match the levels of the M-channel training signals.

Task T110 is configured to serially update a plurality of filter coefficient values of a source separation filter structure according to a source separation algorithm. Various examples of such a filter structure are described below. A typical source separation algorithm is configured to process a set of mixed signals to produce a set of separated channels that include a combination channel having both signal and noise and at least one noise-dominant channel. The combination channel may also have an increased signal-to-noise ratio (SNR) as compared to the input channel. It may be desirable for task T110 to produce a converged filter structure that is configured to filter an input signal that has a directional component and to obtain a corresponding output signal in which the energy of the directional component is concentrated into one of the output channels.

Task T120 decides whether the converged filter structure sufficiently separates information from interference for each of the plurality of M-channel signals. Such an operation may be performed automatically or by human supervision. One example of such a decision operation uses a metric based on correlating a known signal from an information source with the result produced by filtering a corresponding M-channel training signal with the trained plurality of filter coefficient values. The known signal may have a word or series of segments that when filtered produces an output that is substantially correlated with the word or series of segments in one of the M channels, and has little correlation in all other channels. In such case, sufficient separation may be decided according to a relation between the correlation result and a threshold value.

Another example of such a decision operation calculates at least one metric produced by filtering an M-channel training signal with the trained plurality of filter coefficient values and comparing each such result with a corresponding threshold value. Such metrics may include statistical properties such as variance, Gaussianity, and/or higher-order statistical moments such as kurtosis. For speech signals, such properties may also include zero crossing rate and/or burstiness over time (also known as time sparsity). In general, speech signals exhibit a lower zero crossing rate and a lower time sparsity than noise signals.

It is possible that task T110 will converge to a local minimum such that task T120 fails for one or more (possibly all) of the training signals. If task T120 fails, task T110 may be repeated using different training parameters as described below (e.g., learning rate, geometric constraints). It is possible that task T120 will fail for only some of the M-channel training signals, and in such case it may be desirable to keep the converged solution (i.e., the trained plurality of filter coefficient values) as being suitable for the plurality of training signals for which task T120 passed. In such case, it may be desirable to repeat method M100 to obtain a solution for the other training signals or, alternatively, the signals for which task T120 failed may be ignored as special cases.

Method M100 may be performed on a reference instance of a device (e.g., a portable communications device, such as a handset or headset) in order to obtain a converged filter solution that may then be loaded into other instances of the same device during production. In such case, it may be desirable to calibrate the gains of the M transducers of the reference device relative to one another before using the device to record the M-channel training signals. Once the training signals have been recorded, a converged filter solution based on the training signals may be calculated within the reference device and/or within another processing unit such as a computer. It may be desirable to verify that the reference device (including the converged filter solution) complies with performance criteria such as a send response nominal loudness curve as specified in the standards document TIA-810-B (Telecommunications Industry Association, November 2006). The converged filter solution may then be loaded into other similar devices during production (e.g., into flash memory of each such device). It may be desirable during and/or after production to calibrate the gains of the M transducers of each production device relative to one another. As described below with reference to FIG. 25, the converged filter solution may also be used to filter another set of training signals, recorded using the reference device, in order to calculate initial conditions for an adaptive filter. Such conditions may also be loaded into other instances of the same device during production.

The term "source separation algorithms" includes blind source separation algorithms, such as independent component analysis (ICA) and related methods such as independent vector analysis (IVA). Blind source separation (BSS) algorithms are methods of separating individual source signals (which may include signals from one or more information sources and one or more interference sources) based only on mixtures of the source signals. The term "blind" refers to the fact that the reference signal or signal of interest is not available, and such methods commonly include assumptions regarding the statistics of one or more of the information and/or interference signals. In speech applications, for example, the speech signal of interest is commonly assumed to have a supergaussian distribution (e.g., a high kurtosis).

The class of BSS algorithms includes multivariate blind deconvolution algorithms. Source separation algorithms also include variants of blind source separation algorithms, such as ICA and IVA, that are constrained according to other a priori information, such as a known direction of each of one or more of the source signals with respect to, e.g., an axis of the array of recording transducers. Such algorithms may be distinguished from beamformers that apply fixed, non-adaptive solutions based only on directional information and not on observed signals.

Once method M100 has produced a trained plurality of coefficient values, the coefficient values may be used in a runtime filter (e.g., source separator F100 as described herein) where they may be fixed or may remain adaptable. Method M100 may be used to converge to a solution that is desirable, in an environment that may include lots of variability.

Calculation of the trained plurality of filter coefficient values may be performed in the time domain or in the frequency domain. The filter coefficient values may also be calculated in the frequency domain and transformed to time-domain coefficients for application to time-domain signals.

Updating of the filter coefficient values in response to the series of M-channel input signals may continue until a converged solution to the source separator is obtained. During this operation, at least some of the series of M-channel input signals may be repeated, possibly in a different order. For example, the series of M-channel input signals may be repeated in a loop until a converged solution is obtained. Convergence may be determined based on the coefficient values of the component filters. For example, it may be decided that the filter has converged when the filter coefficient values no longer change, or when the total change in the filter coefficient values over some time interval is less than (alternatively, not greater than) a threshold value. Convergence may be determined independently for each cross filter, such that the updating operation for one cross filter may terminate while the updating operation for another cross filter continues. Alternatively, updating of each cross filter may continue until all of the cross filters have converged.

Each filter of source separator F100 has a set of one or more coefficient values. For example, a filter may have one, several, tens, hundreds, or thousands of filter coefficients. For example, it may be desirable to implement cross filters having sparsely distributed coefficients over time to capture a long period of time delays. At least one of the sets of coefficient values is based on the input data.

Method M100 is configured to update the filter coefficient values according to a learning rule of a source separation algorithm. This learning rule may be designed to maximize information between the output channels. Such a criterion may also be restated as maximizing the statistical independence of the output channels, or minimizing mutual information among the output channels, or maximizing entropy at the output. Particular examples of the different learning rules that may be used include maximum information (also known as infomax), maximum likelihood, and maximum nongaussianity (e.g., maximum kurtosis). It is common for a source separation learning rule to be based on a stochastic gradient ascent rule. Examples of known ICA algorithms include Infomax, FastICA (www.cis.hut.fi/projects/ica/fastica/fp.shtml), and JADE (a joint approximate diagonalization algorithm described at www.tsi.enst.fr/~cardoso/guidesepsou.html).

Figure 10A:
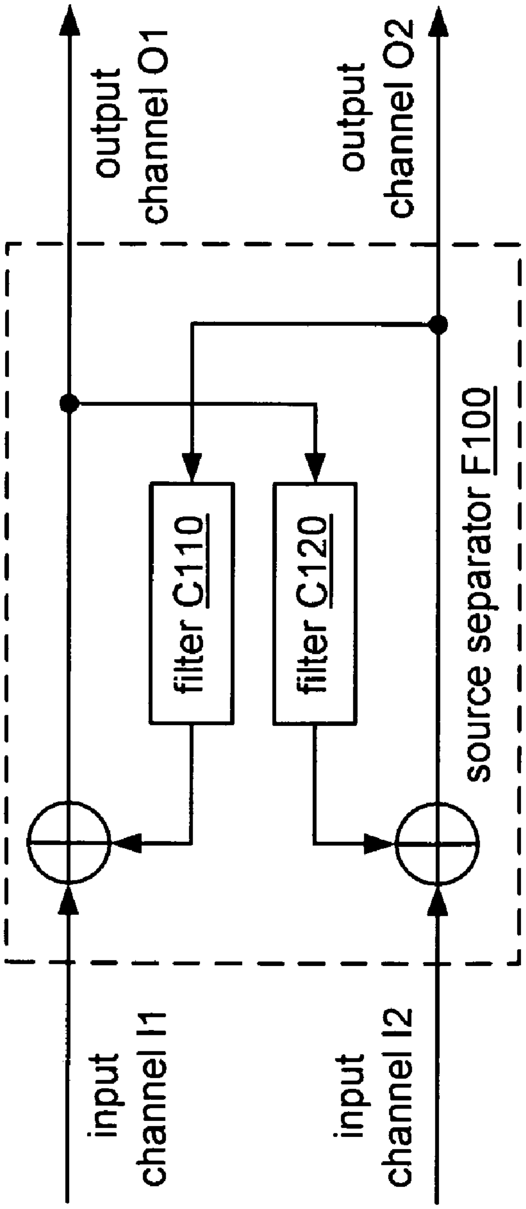
FIG. 10A shows a block diagram of an implementation F100 of source separator F10 that includes a feedback filter structure.

Filter structures that may be used for the source separation filter structure include feedback structures; feedforward structures; FIR structures; IIR structures; and direct, cascade, parallel, or lattice forms of the above. FIG. 10A shows a block diagram of a feedback filter structure that may be used to implement such a filter in a two-channel application. This structure, which includes two cross filters C110 and C120, is also an example of an infinite impulse response (IIR) filter. FIG. 9B shows a block diagram of a variation of this structure that includes direct filters D110 and D120. Adaptive operation of a feedback filter structure having two input channels $x_1$, $x_2$ and two output channels $y_1$, $y_2$ as shown in FIG. 9A may be described using the following expressions:

$$y_1(t)=x_1(t)+(h_{12}(t)\oplus y_2(t)) \quad (1)$$

$$y_2(t)=x_2(t)+(h_{21}(t)\oplus y_1(t)) \quad (2)$$

$$\Delta h_{12}k=-f(y_1(t))\times y_2(t-k) \quad (3)$$

$$\Delta h_{21}k=-f(y_2(t))\times y_1(t-k) \quad (4)$$

where t denotes a time sample index, $h_{12}(t)$ denotes the coefficient values of filter C110 at time t, $h_{21}(t)$ denotes the coefficient values of filter C120 at time t, the symbol $\oplus$ denotes the time-domain convolution operation, $\Delta h_{12k}$ denotes a change in the k-th coefficient value of filter C110 subsequent to the calculation of output values $y_1(t)$ and $y_2(t)$, and $\Delta h_{21k}$ denotes a change in the k-th coefficient value of filter C120 subsequent to the calculation of output values $y_1(t)$ and $y_2(t)$.

It may be desirable to implement the activation function $f$ as a nonlinear bounded function that approximates the cumulative density function of the desired signal. One example of a nonlinear bounded function that satisfies this feature, especially for positively kurtotic signals such as speech signals, is the hyperbolic tangent function (commonly indicated as tanh). It may be desirable to use a function $f(x)$ that quickly approaches the maximum or minimum value depending on the sign of x. Other examples of nonlinear bounded functions that may be used for activation function $f$ include the sigmoid function, the sign function, and the simple function. These example functions may be expressed as follows:

$$\tanh(x) = \frac{e^x - e^{-x}}{e^x + e^{-x}}$$

$$\mathrm{sigmoid}(x) = \frac{1}{1 + e^{-x}}$$

$$\mathrm{sign}(x) = \begin{cases} 1, & x > 0 \\ -1, & \text{otherwise} \end{cases}$$

$$\mathrm{simple}(\varepsilon, x) = \begin{cases} 1, & x \geq \varepsilon \\ x/\varepsilon, & -\varepsilon > x > \varepsilon \\ -1, & \text{otherwise} \end{cases}$$

The coefficient values of filters C110 and C120 may be updated at every sample or at another time interval, and the coefficient values of filters C110 and C120 may be updated at the same rate or at different rates. It may be desirable to update different coefficient values at different rates. For example, it may be desirable to update the lower-order coefficient values more frequently than the higher-order coefficient values. Another structure that may be used for training (especially online training) includes learning and output stages as described, e.g., in U.S. Publ. Pat. Appl. No. 2007/0021958 (Visser et al.) at FIG. 12 and paragraphs [0087]-[0091].

Figure 12A:
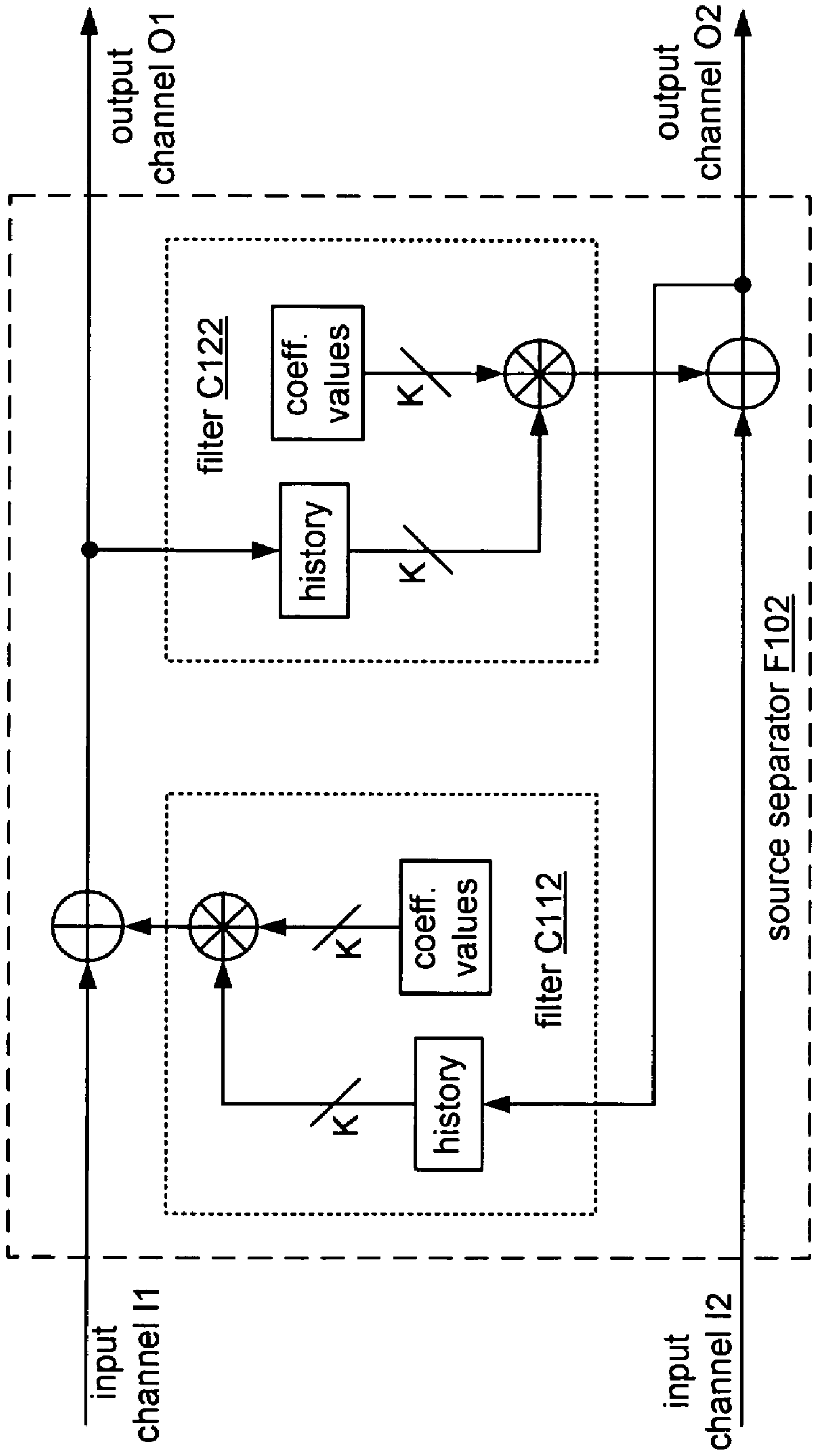
FIG. 12A shows a block diagram of an implementation F102 of source separator F100 that includes implementations C112 and C122 of cross filters C110 and C120, respectively.
Figure 12B:
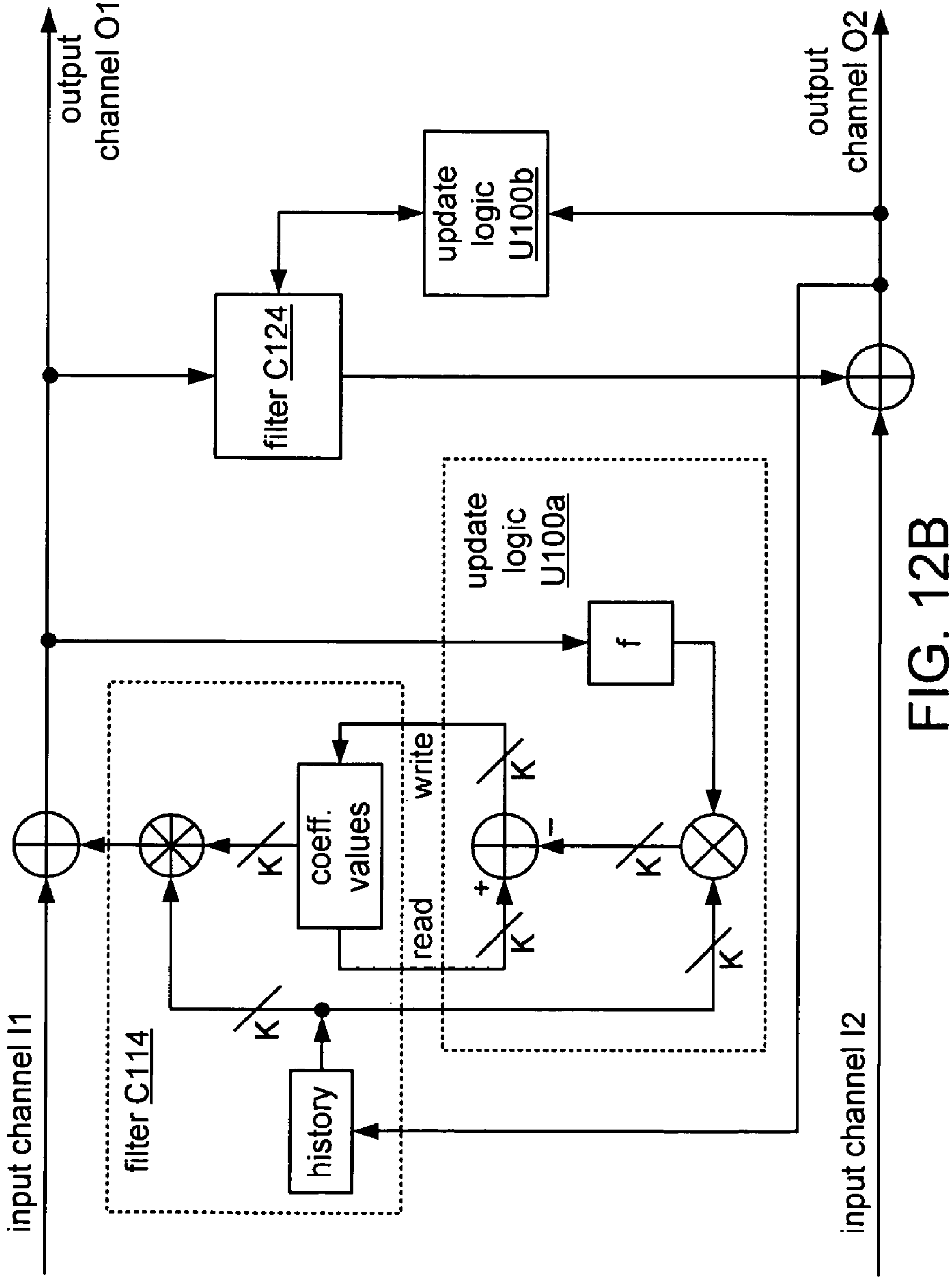
FIG. 12B shows a block diagram of an implementation F104 of source separator F100.
Figure 12C:
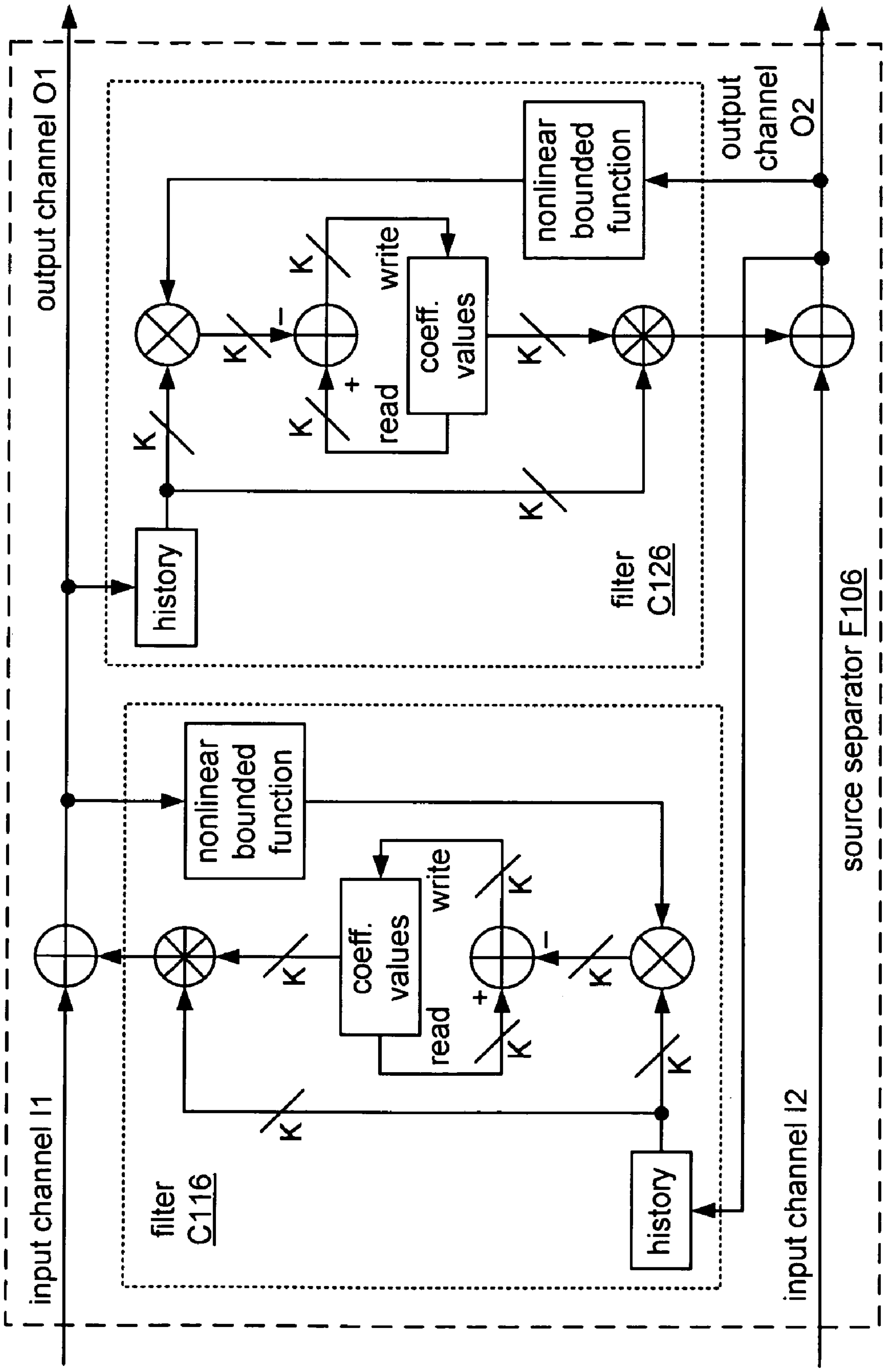
FIG. 12C shows a block diagram of an implementation F106 of source separator F100.

FIG. 12A shows a block diagram of an implementation F102 of source separator F100 that includes logical implementations C112, C122 of cross filters C110, C120. FIG. 12B shows another implementation F104 of source separator F100 that includes update logic blocks U110*a*, U100*b*. This example also includes implementations C14 and C124 of filters C112 and C122, respectively, that are configured to communicate with the respective update logic blocks. FIG. 12C shows a block diagram of another implementation F106 of source separator F100 that includes update logic. This example includes implementations C116 and C126 of filters C110 and C120, respectively, that are provided with read and write ports. It is noted that such update logic may be implemented in many different ways to achieve an equivalent result. The implementations shown in FIGS. 12B and 12C may be used to obtain the trained plurality of coefficient values (e.g., during a design stage), and may also be used in a subsequent real-time application is desired. In contrast, the implementation F102 shown in FIG. 12A may be loaded with a trained plurality of coefficient values (e.g., a plurality of coefficient values as obtained using separator F104 or F106) for real-time use. Such loading may be performed during manufacturing, during a subsequent update, etc.

Figure 10B:
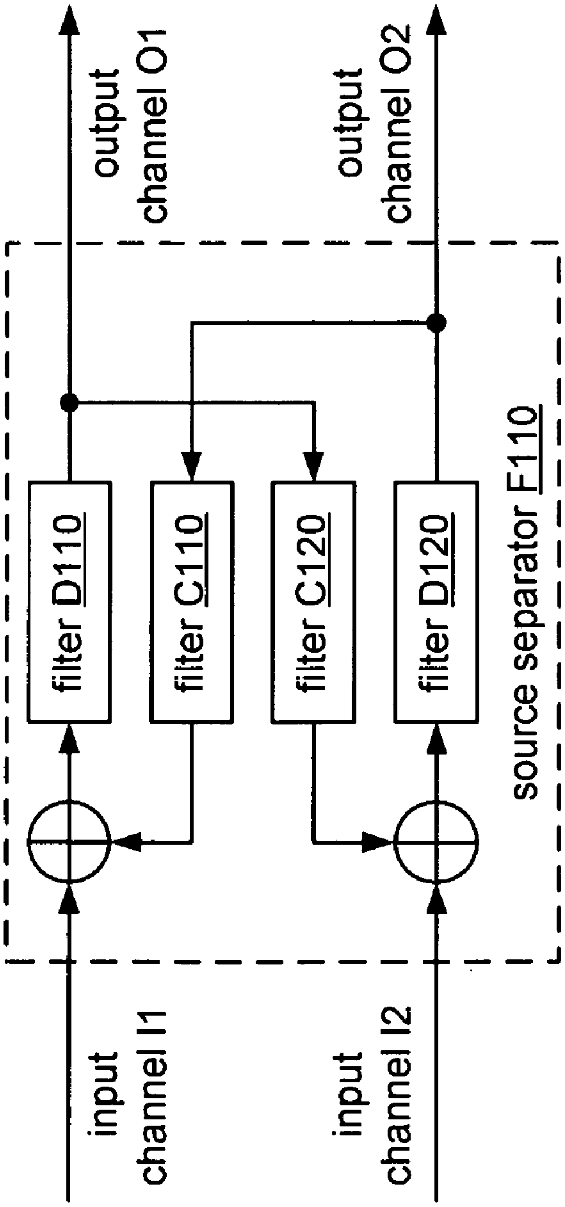
FIG. 10B shows a block diagram of an implementation F110 of source separator F100.
Figure 11:
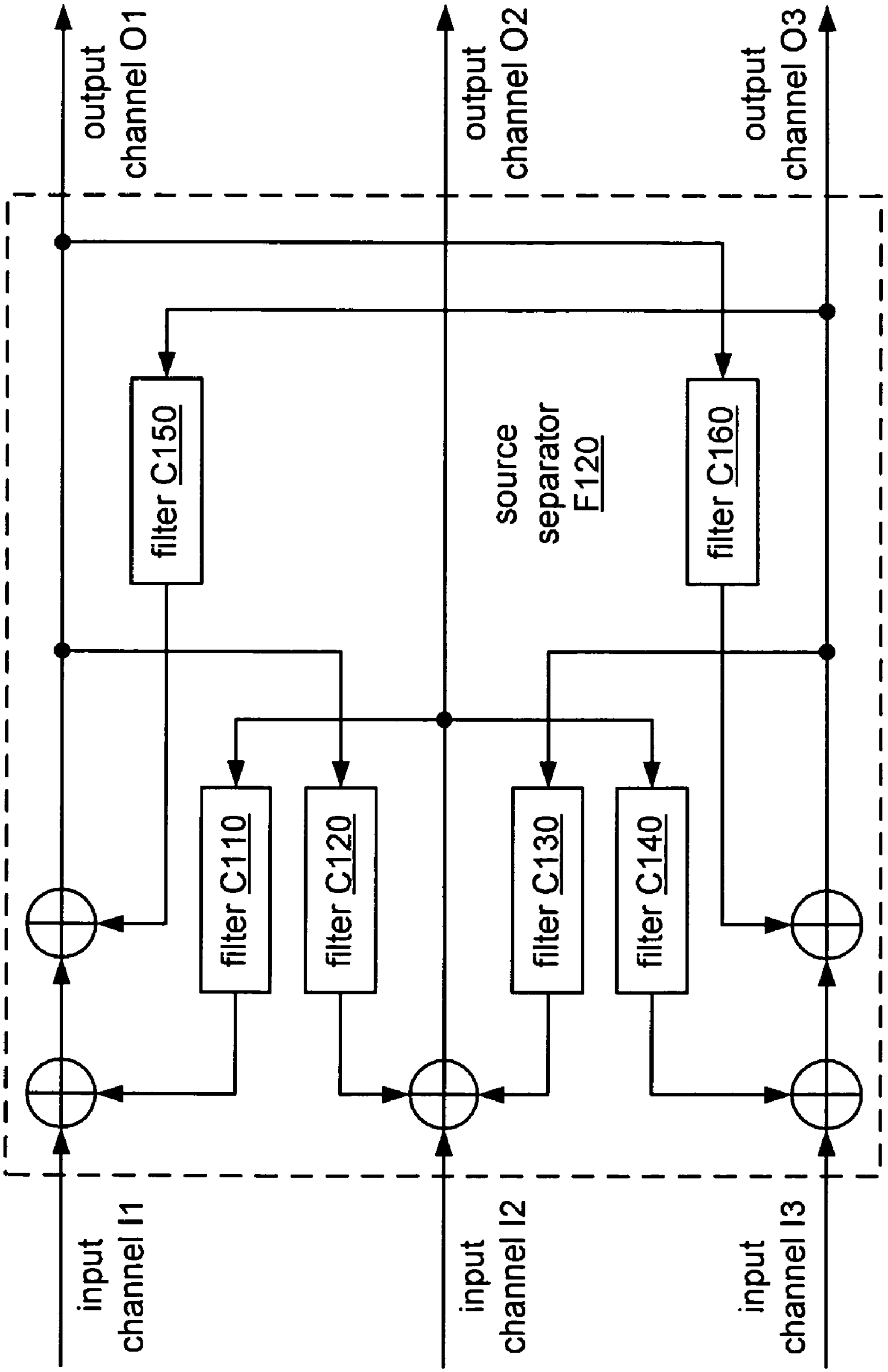
FIG. 11 shows a block diagram of an implementation F120 of source separator F100 that is configured to process a three-channel input signal.

The feedback structures shown in FIGS. 10A and 10B may be extended to more than two channels. For example, FIG. 11 shows an extension of the structure of FIG. 10A to three channels. In general, a full M-channel feedback structure will include M*(M−1) cross filters, and it will be understood that the expressions (1)-(4) may be similarly generalized in terms of $h_{jm}(t)$ and $\Delta h_{jmk}$ for each input channel $x_m$ and output channel $y_j$.

Although IIR designs are typically computationally cheaper than corresponding FIR designs, it is possible for an IIR filter to become unstable in practice (e.g., to produce an unbounded output in response to a bounded input). An increase in input gain, such as may be encountered with nonstationary speech signals, can lead to an exponential increase of filter coefficient values and cause instability. Because speech signals generally exhibit a sparse distribution with zero mean, the output of the activation function $f$ may oscillate frequently in time and contribute to instability. Additionally, while a large learning parameter value may be desired to support rapid convergence, an inherent trade-off may exist between stability and convergence rate, as a large input gain may tend to make the system more unstable.

Figure 13:
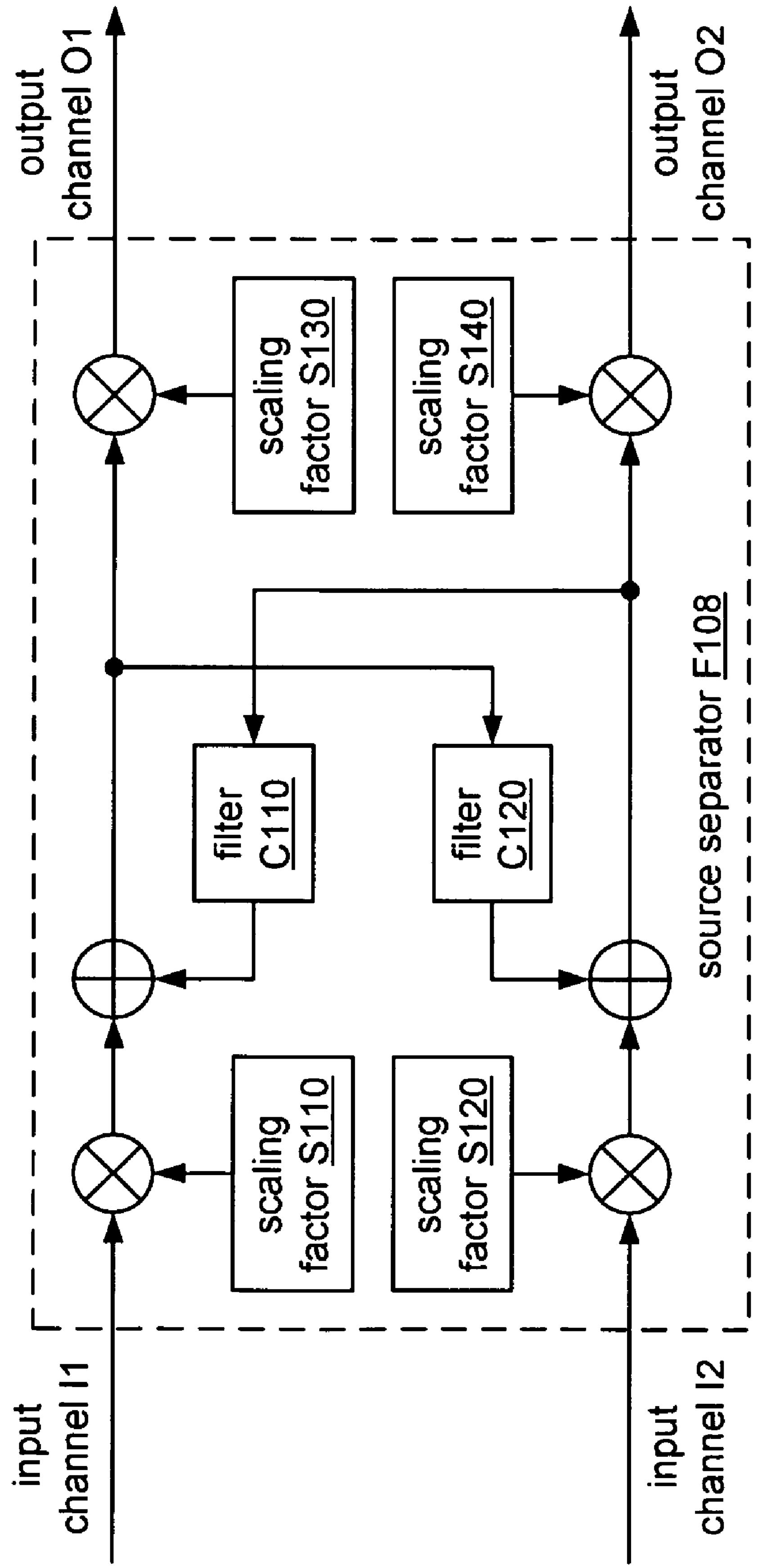
FIG. 13 shows a block diagram of an implementation F108 of source separator F100 that includes scaling factors.

It is desirable to ensure the stability of an IIR filter implementation. One such approach, as illustrated in FIG. 13, is to scale the input channels appropriately by adapting the scaling factors S110 and S120 based on one or more characteristics of the incoming input signal. For example, it may be desirable to perform attenuation according to the level of the input signal, such that if the level of the input signal is too high, scaling factors S110 and S120 may be reduced to lower the input amplitude. Reducing the input levels may also reduce the SNR, however, which may in turn lead to diminished separation performance, and it may be desirable to attenuate the input channels only to a degree necessary to ensure stability.

In a typical implementation, scaling factors S110 and S120 are equal to each other and have values not greater than one. It is also typical for scaling factor S130 to be the reciprocal of scaling factor S110, and for scaling factor S140 to be the reciprocal of scaling factor S120, although exceptions to any one or more of these criteria are possible. For example, it may be desirable to use different values for scaling factors S110 and S120 to account for different gain characteristics of the corresponding transducers. In such case, each of the scaling factors may be a combination (e.g., a sum) of an adaptive portion that relates to the current channel level and a fixed portion that relates to the transducer characteristics (e.g., as determined during a calibration operation) and may be updated occasionally during the lifetime of the device.

Another approach to stabilizing the cross filters of a feedback structure is to implement the update logic to account for short-term fluctuation in filter coefficient values (e.g., at every sample), thereby avoiding associated reverberation. Such an approach, which may be used with or instead of the scaling approach described above, may be viewed as time-domain smoothing. Additionally or in the alternative, filter smoothing may be performed in the frequency domain to enforce coherence of the converged separating filter over neighboring frequency bins. Such an operation may be implemented conveniently by zero-padding the K-tap filter to a longer length L, transforming this filter with increased time support into the frequency domain (e.g., via a Fourier transform), and then performing an inverse transform to return the filter to the time domain. Since the filter has effectively been windowed with a rectangular time-domain window, it is correspondingly smoothed by a sinc function in the frequency domain. Such frequency-domain smoothing may be accomplished at regular time intervals to periodically reinitialize the adapted filter coefficients to a coherent solution. Other stability features may include using multiple filter stages to implement cross-filters and/or limiting filter adaptation range and/or rate.

It may be desirable to verify that the converged solution satisfies one or more performance criteria. One performance criterion that may be used is white noise gain, which characterizes the robustness of the converged solution. White noise gain (or WNG(ω)) may be defined as (A) the output power in response to normalized white noise on the transducers or, equivalently, (B) the ratio of signal gain to transducer noise sensitivity.

Another performance criterion that may be used is the degree to which a beam pattern (or null beam pattern) for each of one or more of the sources in the series of M-channel signals agrees with a corresponding beam pattern as calculated from the M-channel output signal as produced by the converged filter. This criterion may not apply for cases in which the actual beam patterns are unknown and/or the series of M-channel input signals has been pre-separated. Once the converged filter solutions $h_{12}(t)$ and $h_{21}(t)$ (e.g., $h_{mj}(t)$) have been obtained, the spatial and spectral beam patterns corresponding to outputs $y_1(t)$ and $y_2(t)$ (e.g., $y_j(t)$) may be calculated. A test may be performed to evaluate agreement of the converged solutions with other information, such as one or more known beam patterns. If the performance test fails, it may be desirable to repeat the adaptation using different training data, different learning rates, etc.

To determine the beam pattern associated with a feedback structure, time-domain impulse-response functions $w_{11}(t)$ from $x_1$ to $y_1$, $w_{21}(t)$ from $x_1$ to $y_2$, $w_{12}(t)$ from $x_2$ to $y_1$, and $w_{22}(t)$ from $x_2$ to $y_2$ may be simulated by computing the iterative response to expressions (1) and (2) of a system subject to an impulse input at t=0 in $x_1$ and subsequently at t=0 in $x_2$. Alternatively, explicit analytical transfer function expressions may be formulated for $w_{11}(t)$, $w_{12}(t)$, $w_{21}(t)$, and $w_{22}(t)$ by substituting expression (1) into expression (2). It may be desirable to perform polynomial division on the IIR form A(z)/B(z) of the resulting expressions to obtain an FIR form $A(z)/B(z)=V(z)=v_0+v_1\times z^{-1}+v_2\times z^{-2}+v_3\times z^{-3}+\ldots$.

Once the time-domain impulse transfer functions $w_{jm}(t)$ from each input channel m to each output channel j are obtained by either method, they may be transformed to the frequency domain to produce a frequency-domain transfer function $W_{jm}(i^*\omega)$. The beam pattern for each output channel j may then be obtained from the frequency-domain transfer function $W_{jm}(i^*\omega)$ by computing the magnitude plot of the expression $$W_{j1}(i\times\omega))D(\omega)_{1j}+W_{j2}(i\times\omega)D(\omega)_{2j}+\ldots+W_{jM}(i\times\omega)D(\omega)_{Mj}.$$

In this expression, D(ω) indicates the directivity matrix for frequency ω such that $$D(\omega)_{ij}=\exp(-i\times\cos(\theta_j)\times\mathrm{pos}(i)\times\omega/c), \quad (5)$$

where pos(i) denotes the spatial coordinates of the i-th transducer in an array of M transducers, c is the propagation velocity of sound in the medium (e.g., 340 m/s in air), and $\theta_j$ denotes the incident angle of arrival of the j-th source with respect to the axis of the transducer array. (For a case in which the values $\theta_j$ are not known a priori, they may be estimated using, for example, the procedure that is described below.)

Figure 14:
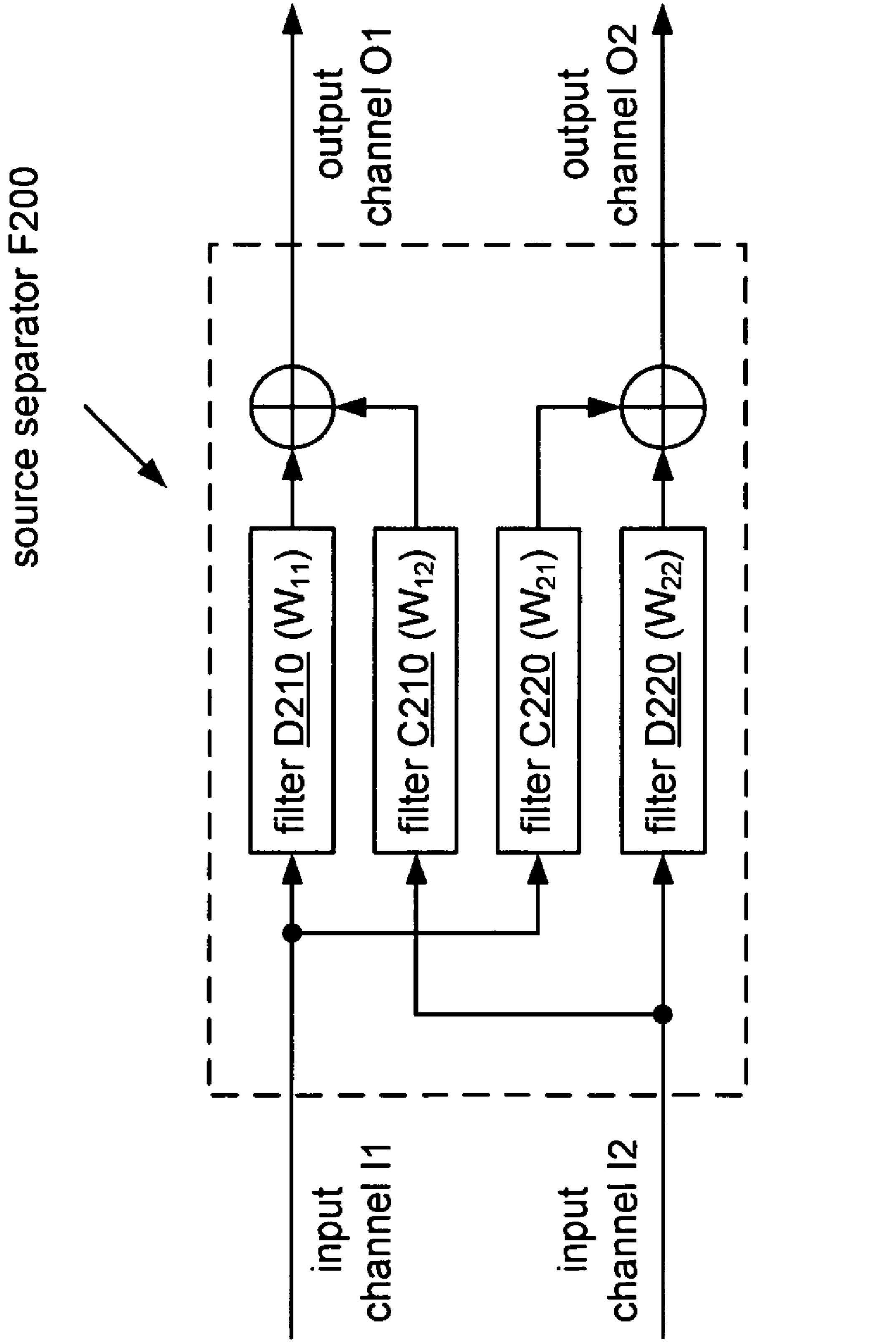
FIG. 14 shows a block diagram of an implementation F200 of source separator F10 that includes a feedforward filter structure.
Figure 15A:
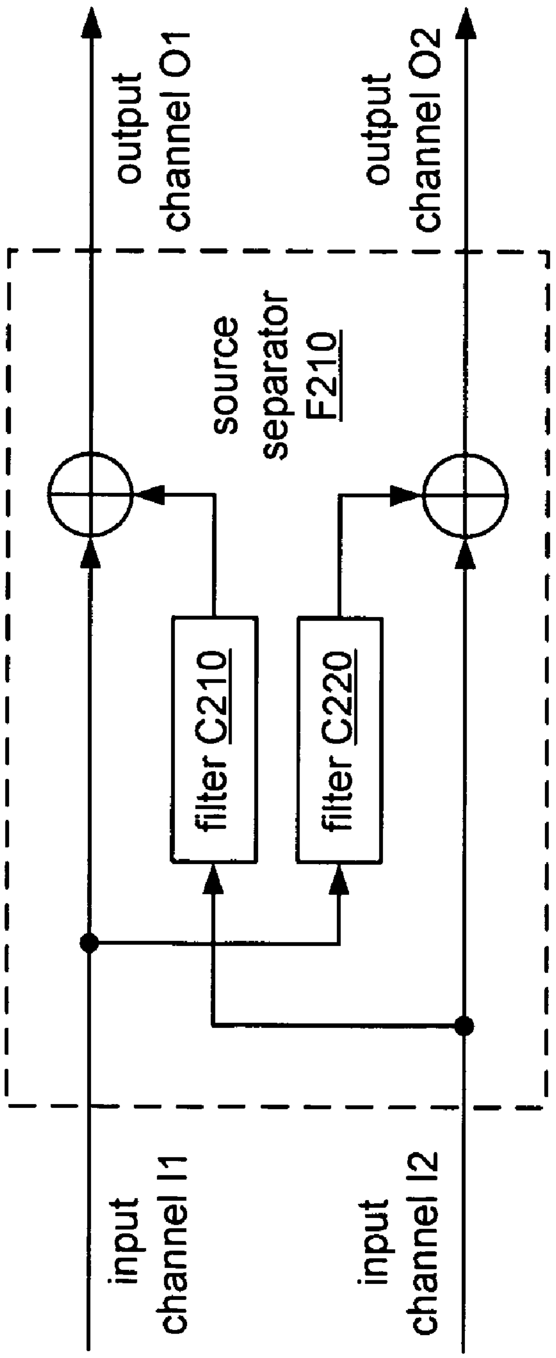
FIG. 15A shows a block diagram of an implementation F210 of source separator F200.
Figure 15B:
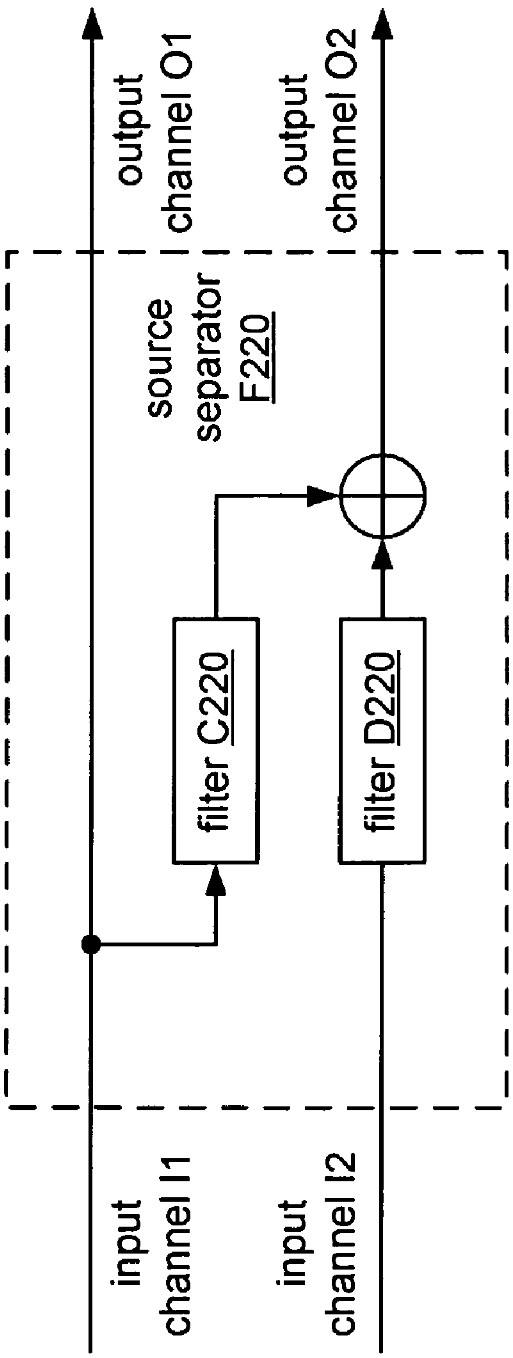
FIG. 15B shows a block diagram of an implementation F220 of source separator F200.
Figure 16:
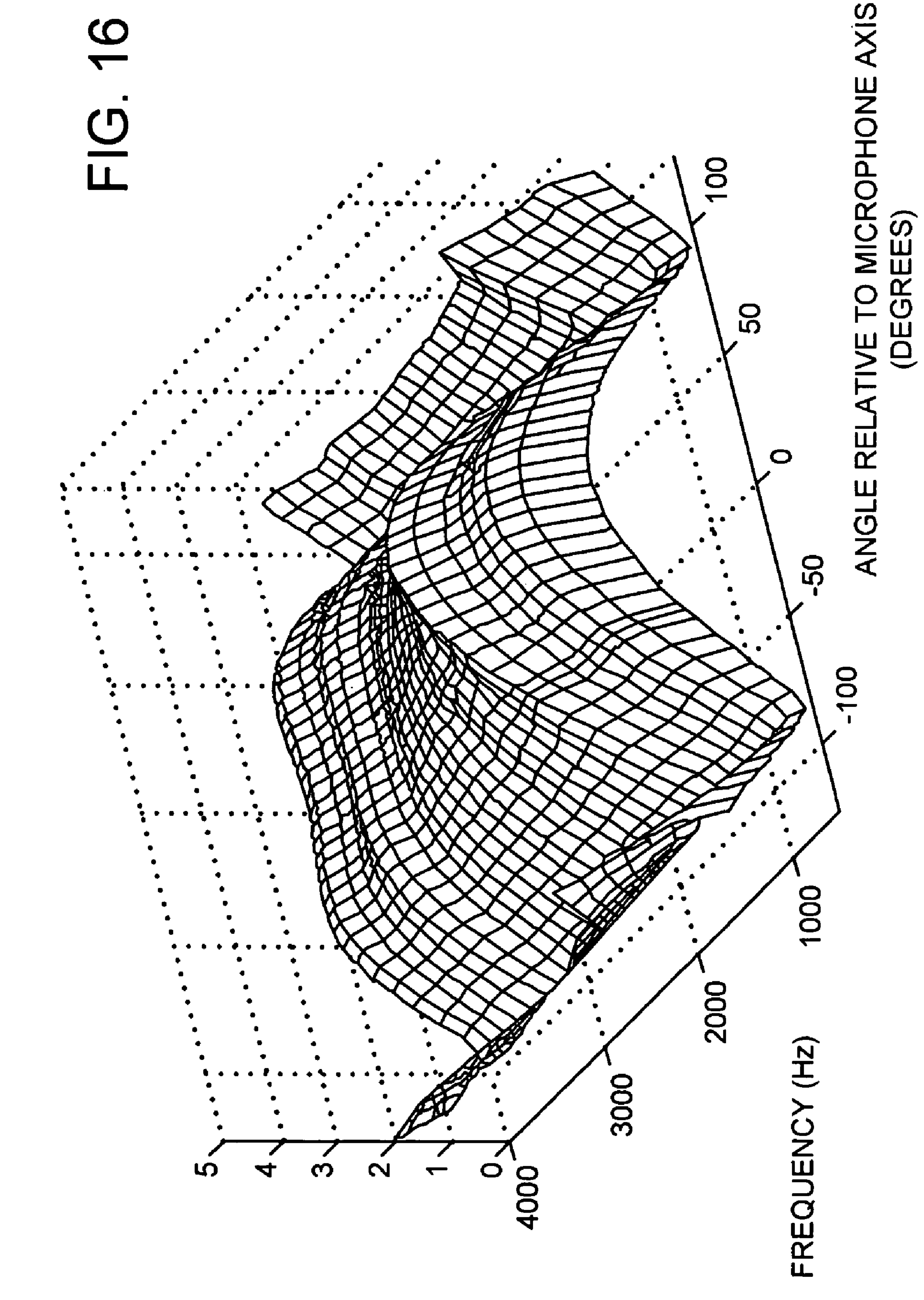
FIG. 16 shows an example of a plot of a converged solution for a headset application.
Figure 17:
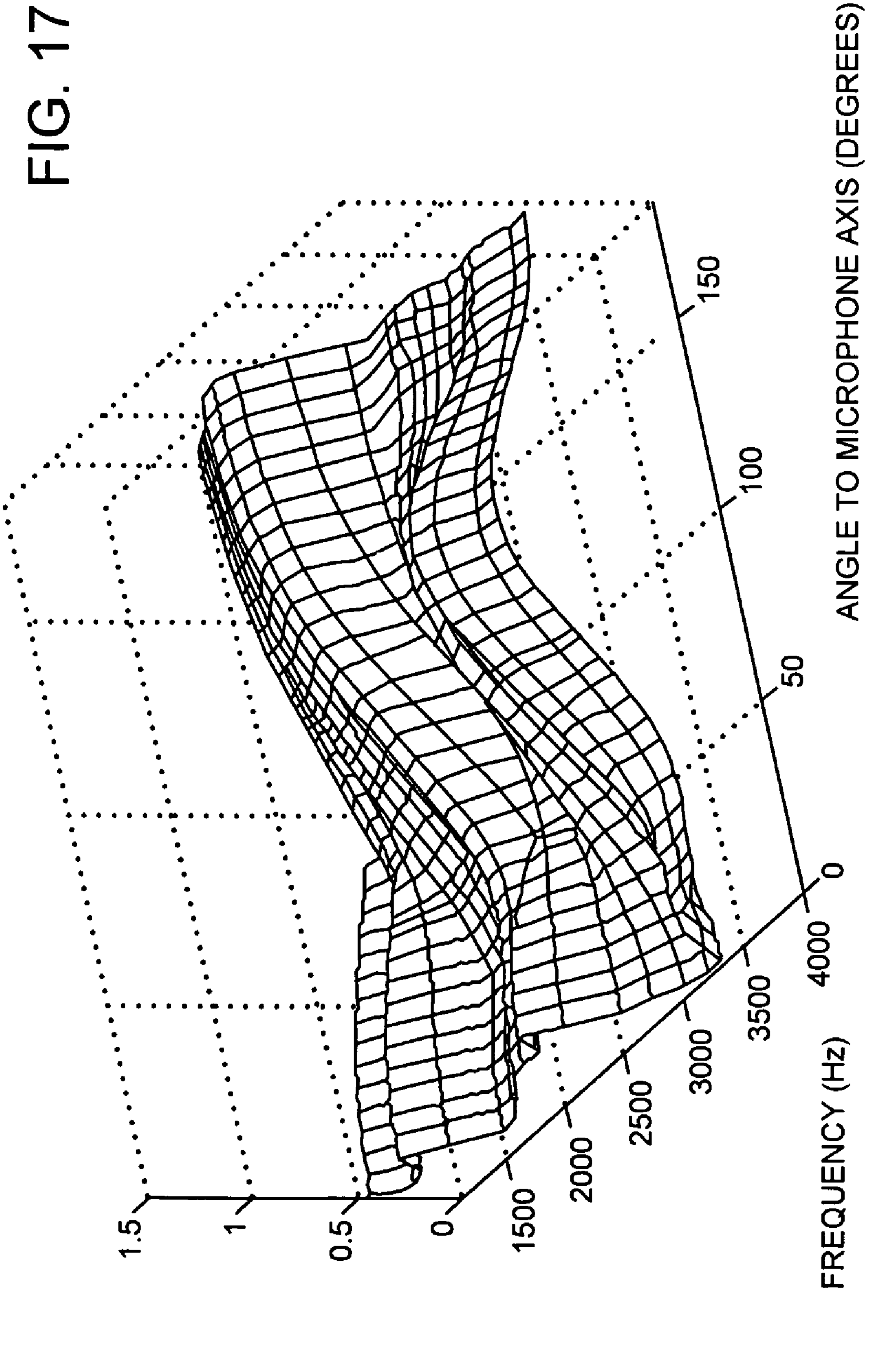
FIG. 17 shows an example of a plot of a converged solution for a writing device application.

Another approach may be implemented using a feedforward filter structure as shown in FIGS. 14, 15A, and 15B. FIG. 14 shows a block diagram of a feedforward filter structure that includes direct filters D210 and D220.

A feedforward structure may be used to implement another approach, called frequency-domain ICA or complex ICA, in which the filter coefficient values are computed directly in the frequency domain. Such an approach may include performing an FFT or other transform on the input channels. This ICA technique is designed to calculate an M×M unmixing matrix W(ω) for each frequency bin ω such that the demixed output vectors Y(ω,l)=W(ω)X(ω,l) are mutually independent. The unmixing matrices W(ω) are updated according to a rule that may be expressed as follows:

$$W_{l+r}(\omega)=W_l(\omega)+\mu[I-\langle\Phi(Y(\omega,l))Y(\omega,l)^H\rangle]W_l(\omega) \quad (6)$$

where $W_l(\omega)$ denotes the unmixing matrix for frequency bin ω and window l, Y(ω,l) denotes the filter output for frequency bin ω and window l, $W_{l+r}(\omega)$ denotes the unmixing matrix for frequency bin ω and window (l+r), r is an update rate parameter having an integer value not less than one, μ is a learning rate parameter, I is the identity matrix, Φ denotes an activation function, the superscript H denotes the conjugate transpose operation, and the brackets < > denote the averaging operation in time l=1, . . . , L. In one example, the activation function $\Phi(y_j(\omega,l))$ is equal to $y_j(\omega,l)/|y_j(\omega,l)|$.

Complex ICA solutions typically suffer from a scaling ambiguity. If the sources are stationary and the variances of the sources are known in all frequency bins, the scaling problem may be solved by adjusting the variances to the known values. However, natural signal sources are dynamic, generally non-stationary, and have unknown variances. Instead of adjusting the source variances, the scaling problem may be solved by adjusting the learned separating filter matrix. One well-known solution, which is obtained by the minimal distortion principle, scales the learned unmixing matrix according to an expression such as the following.

$$W_{l+r}(\omega)\leftarrow\mathrm{diag}(W_{l+r}^{-1}(\omega))W_{l+r}(\omega)$$

Another problem with some complex ICA implementations is a loss of coherence among frequency bins that relate to the same source. This loss may lead to a frequency permutation problem in which frequency bins that primarily contain energy from the information source are misassigned to the interference output channel and/or vice versa. Several solutions to this problem may be used.

One response to the permutation problem that may be used is independent vector analysis (IVA), a variation of complex ICA that uses a source prior which models expected dependencies among frequency bins. In this method, the activation function Φ is a multivariate activation function such as the following:

$$\Phi(Y_j(\omega,l))=\frac{Y_j(\omega,l)}{\left(\sum_{\omega}|Y_j(\omega,l)|^p\right)^{1/p}}$$

where p has an integer value greater than or equal to one (e.g., 1, 2, or 3). In this function, the term in the denominator relates to the separated source spectra over all frequency bins.

The use of a multivariate activation function may help to avoid the permutation problem by introducing into the filter learning process an explicit dependency between individual frequency bin filter weights. In practical applications, however, such a connected adaptation of filter weights may cause the convergence rate to become more dependent on the initial filter conditions (similar to what has been observed in time-domain algorithms). It may be desirable to include constraints such as geometric constraints.

One approach to including a geometric constraint is to add a regularization term J(ω) based on the directivity matrix D(ω) (as in expression (5) above):

$$J(\omega)=\alpha(\omega)\|W(\omega)D(\omega)-C(\omega)\|^2 \quad (7)$$

where α(ω) is a tuning parameter for frequency ω and C(ω) is an M×M diagonal matrix equal to diag(W(ω)*D(ω)) that sets the choice of the desired beam pattern and places nulls at interfering directions for each output channel j. The parameter $\alpha(\omega)$ may include different values for different frequencies to allow the constraint to be applied more or less strongly for different frequencies.

Regularization term (7) may be expressed as a constraint on the unmixing matrix update equation with an expression such as the following:

$$\mathrm{constr}(\omega)=(dJ/dW)(\omega)=\mu*\alpha(\omega)*2*(W(\omega)*D(\omega)-C(\omega))D(\omega)^H. \tag{8}$$

Such a constraint may be implemented by adding such a term to the filter learning rule (e.g., expression (6)), as in the following expression:

$$W_{constr.l+p}(\omega))=W_l(\omega)+\mu[I-\langle\Phi(Y(\omega,l))Y(\omega,l)^H\rangle]W_l(\omega)+2\mu\alpha(\omega)(W_l(\omega)D(\omega)-C(\omega)D(\omega)^H \tag{9}$$

It may also be desirable to update one or both of the matrices $C(\omega)$ and $D(\omega)$ periodically and/or upon some event (e.g., detection of a movement of at least one of the sources or transducers relative to the other sources and transducers).

The source direction of arrival (DOA) values $\theta_j$ may be estimated in the following manner. It is known that by using the inverse of the unmixing matrix W, the DOA of the sources can be estimated as $$\theta_{j,mn}(\omega)=\arccos\frac{c\times arg([W^{-1}]_{nj}(\omega)/[W^{-1}]_{mj}(\omega))}{\omega\times\|p_m-p_n\|} \tag{10}$$

where $\theta_{j,mn}(\omega)$ is the DOA of source j relative to transducer pair m and n, $p_m$ and $p_n$ being the positions of transducers m and n, respectively, and c is the propagation velocity of sound in the medium. When several transducer pairs are used, the DOA $\theta_{est,j}$ for a particular source j can be computed by plotting a histogram of the $\theta_{est,j}(\omega)$ the above expression over all transducer pairs and frequencies in selected subbands (see, for example, International Patent Publication WO 2007/103037 (Chan et al.), entitled "SYSTEM AND METHOD FOR GENERATING A SEPARATED SIGNAL", at FIGS. 6-9 and pages 16-20). The average $\theta_{est,j}$ is then the maximum or center of gravity $$\frac{\sum_{\theta_j=0\ldots180}(N(\theta_j)\times\theta_j)}{\sum_{\theta_j=0\ldots180}N(\theta_j)}$$

of the resulting histogram $(\theta_j, N(\theta_j))$, where $N(\theta_j)$ is the number of DOA estimates at angle $\theta_j$. Reliable DOA estimates from such histograms may only become available in later learning stages when average source directions emerge after a number of iterations.

The above may be used for cases in which the number of sources R is not greater than M. Dimension reduction may be performed in a case where R>M. As described, for example, on pp. 17-18 of WO 2007/103037, a principal component analysis (PCA) operation may be performed to obtain a reduced dimension subspace for the IVA operation. In such case, expression (8) may be revised to include an R×M PCA dimension reduction matrix.

Since beamforming techniques may be employed and speech is generally a broadband signal, it may be ensured that good performance is obtained for critical frequency ranges. The estimates in equation (10) are based on a far-field model that is generally valid for source distances from the transducer array beyond about two to four times $D^2/\lambda$, with D being the largest array dimension and $\lambda$ the shortest wavelength considered. If the far-field model underlying equation (10) is invalid, it may be desirable to make near-field corrections to the beam pattern. Also the distance between two or more transducers may be chosen to be small enough (e.g., less than half the wavelength of the highest frequency) so that spatial aliasing is avoided. In such case, it may not be possible to enforce sharp beams in the very low frequencies of a broadband input signal.

Another class of solutions to the frequency permutation problem uses permutation tables. Such a solution may include reassigning frequency bins among the output channels (e.g., according to a linear, bottom-up, or top-down reordering operation) according to a global correlation cost function. Several such solutions are described in International Patent Publication WO 2007/103037 (Chan et al.) cited above. Such reassigning may also include detection of inter-bin phase discontinuities, which may be taken to indicate probable frequency misassignments (e.g., as described in WO 2007/103037, Chan et al.).

Figure 18B:
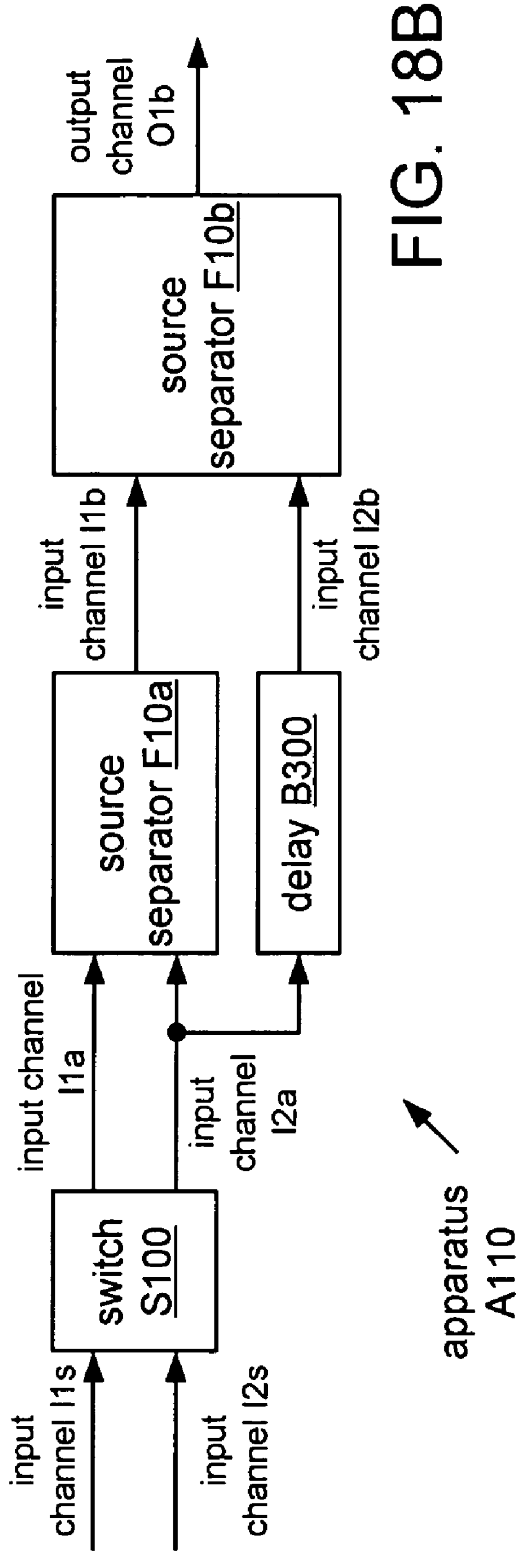
FIG. 18B shows a block diagram of an implementation A110 of apparatus A100 that includes a switch S100.
Figure 20A:
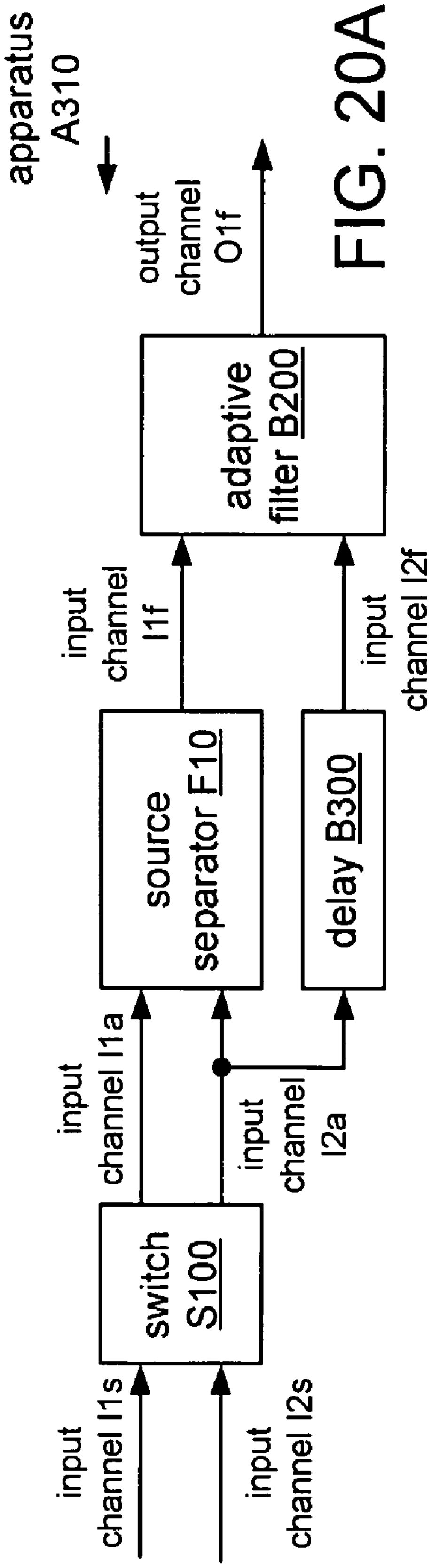
FIG. 20A shows a block diagram of an implementation A310 of apparatus A300 that includes a switch S100.
Figure 20B:
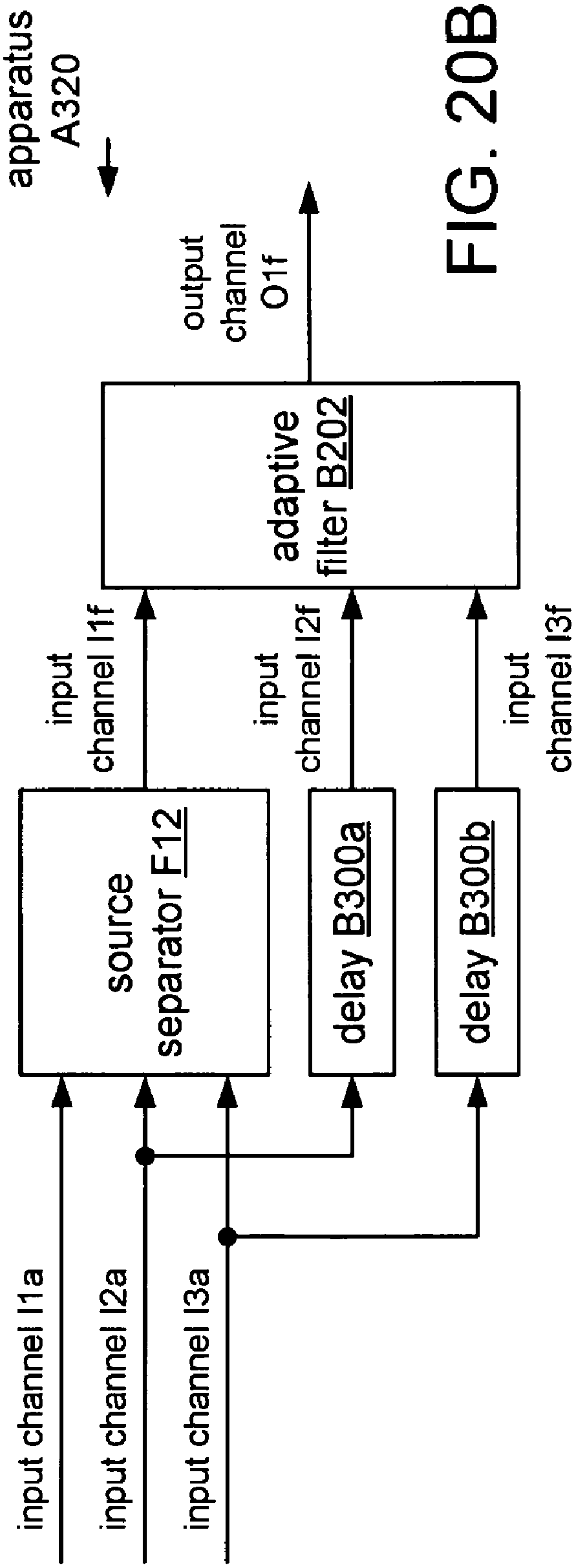
FIG. 20B shows a block diagram of an implementation A320 of apparatus A300.

In a signal processing system that is configured to receive an M-channel input (e.g., a speech processing system configured to process inputs from M microphones), an instance of source separator F10 may be configured to provide an output that replaces a primary one of the input channels. In FIG. 18A, for example, the output of source separator F10*a* replaces primary input channel I1*a* to source separator F10*b*. The identity of the primary input channel may change as the direction of a desired information source relative to the transducer array varies over time. The input channel to be replaced may be selected heuristically (e.g., the channel having the highest SNR, least delay, highest VAD result, and/or best speech recognition result; the channel of the transducer assumed to be closest to an information source such as a primary speaker; etc.). In such case, the other channels may be bypassed to a later processing stage such as an adaptive filter. FIG. 18B shows a block diagram of an implementation A110 of apparatus A100 that includes a switch S100 (e.g., a crossbar switch) configured to perform such a selection according to such a heuristic. Such a switch may also be added to any of the other configurations that include subsequent processing stages as described herein (e.g., as shown in the example of FIG. 20A).

It may be desirable to combine one or more implementations of source separator F10 (e.g., feedback structure F100 and/or feedforward structure F200) with an adaptive filter B200 that is configured according to any of the M-channel adaptive filter structures described herein. For example, it may be desirable to perform additional processing to improve separation in feedback ICA, as the nonlinear bounded function is only an approximation. Adaptive filter B200 may be configured, for example, according to any of the ICA, IVA, constrained ICA or constrained IVA methods described herein. In such cases, adaptive filter B200 may be arranged to precede source separator F10 (e.g., to pre-process the M-channel input signal) or to follow source separator F10 (e.g., to perform further separation on the output of source separator F10). Adaptive filter B200 may be implemented to include learning and output stages that converge at different rates, as described, e.g., in U.S. Publ. Pat. Appl. No. 2007/0021958 (Visser et al.) at FIG. 12 and paragraphs [0087]-[0091], which figure and paragraphs are hereby incorporated by reference as an example of a technique that may be used to implement adaptive filter B200. Adaptive filter B200 may also include scaling factors as described above with reference to FIG. 13.

For a configuration that includes implementations of source separator F10 and adaptive filter B200, such as apparatus A200 or A300, it may be desirable for the initial conditions of adaptive filter B200 (e.g., filter coefficient values and/or filter history at the start of runtime) to be based on the converged solution of source separator F10. Such initial conditions may be calculated, for example, by obtaining a converged solution for source separator F10, using the converged structure F10 to filter the M-channel training data, providing the filtered signal to adaptive filter B200, allowing adaptive filter B200 to converge to a solution, and storing this solution to be used as the initial conditions. Such initial conditions may provide a soft constraint for the adaptation of adaptive filter B200. It will be understood that the initial conditions may be calculated using one instance of adaptive filter B200 (e.g., during a design phase) and then loaded as the initial conditions into one or more other instances of adaptive filter B200 (e.g., during a manufacturing phase).

Figure 25:
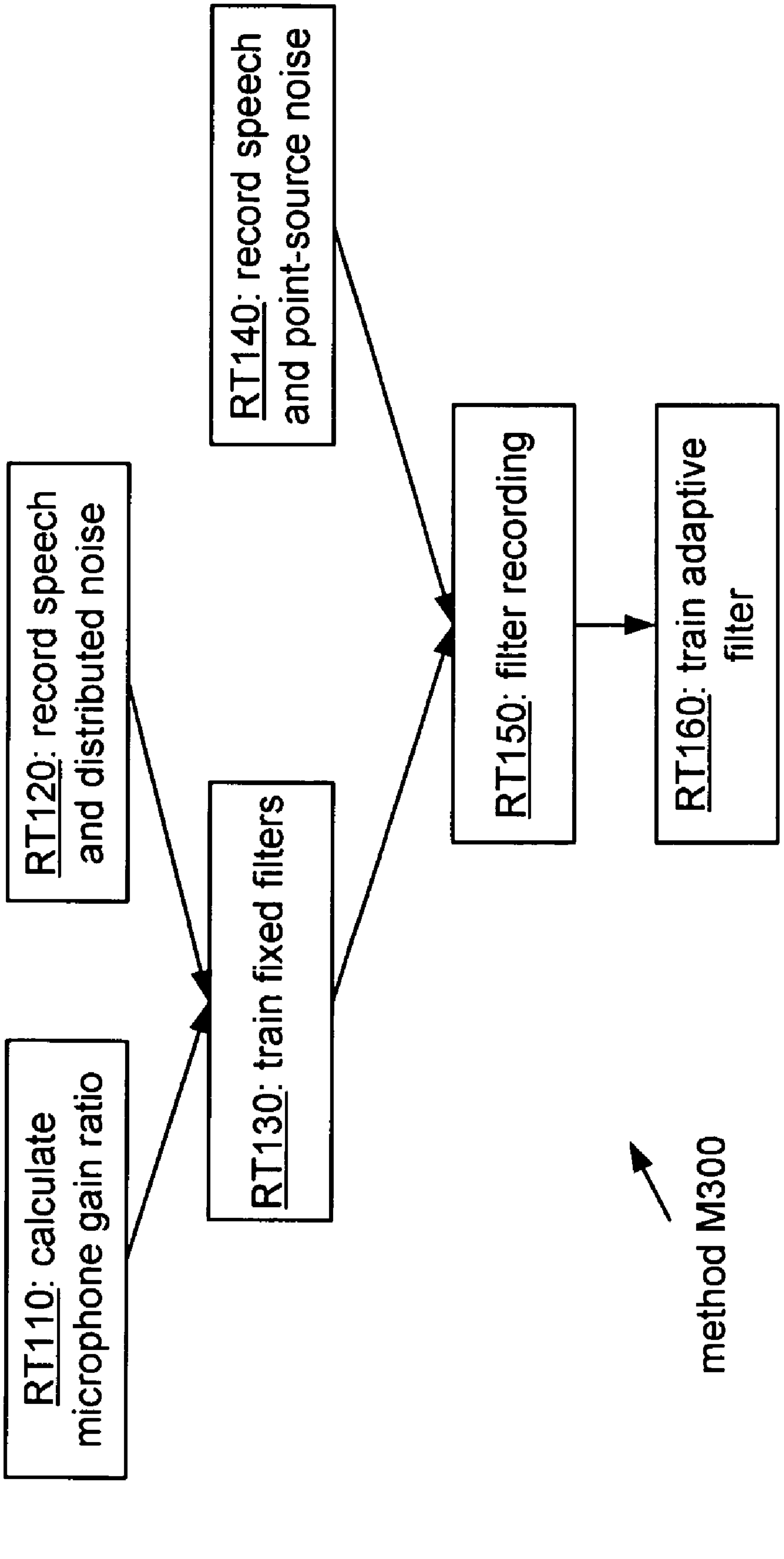
FIG. 25 shows a flowchart of a method M300 according to a general configuration.

FIG. 25 shows a flowchart of a method M300 that includes training an adaptive filter. Such a method may be performed to generate initial conditions for adaptive filter B200. Task RT100 calculates a gain ratio of the microphones of a device (e.g., a portable communications device, such as a headset or handset). In one example, the device is placed on a HATS in a test configuration as shown in FIG. 2, and a calibration signal (e.g., white or pink noise) is played back from the surrounding speakers in the chamber (e.g., at a sound pressure level (SPL) of from 75 to 78 dB at the HATS ear reference point (ERP) or mouth reference point (MRP)) while M-channel (e.g., stereo) recordings are acquired from the device microphones. In this case, it may be desirable to drive the surrounding speakers to create a diffuse noise field at the device. Alternatively, it may be desirable for the calibration signal to include one or more tones at frequencies of interest (e.g., tones in the range of about 200 Hz to about 2 kHz, such as at 1 kHz). This recorded data is then used to match the gain and frequency response characteristics of the M microphones of the reference device.

Task RT120 records speech and distributed noise. In one example, the device is placed on the HATS as shown in FIG. 2, and noise (e.g., white or pink noise) is played back from the surrounding speakers (e.g., at from 65 to 75 dB SPL at HATS MRP) while test speech (e.g., P.50 artificial speech and/or Harvard sentences) is uttered by the HATS (e.g., at 89.3 dB SPL at HATS MRP). In this case, it may be desirable to drive the surrounding speakers to create a diffuse noise field at the device. Meanwhile, the resulting signals produced by the calibrated microphones of the device are recorded as a plurality of M-channel training signals. Task RT130 uses these training signals to train a plurality of filter coefficient values of a source separation filter structure as described herein. For example, task RT130 may be implemented as an instance of task T110.

Task RT140 records speech and directed (e.g., point-source) noise. In one example, the device is placed on the HATS, and noise (e.g., white or pink noise) is played back from one of the speakers (e.g., generating 65-75 dB SPL noise at HATS MRP) while test speech is uttered from the HATS mouth. Meanwhile, the resulting signals produced by the calibrated microphones of the device are recorded. It may be desirable in this case to play back the noise using only the speaker as shown in the lower left-hand corner of FIG. 2, assuming that that the reference device is positioned on the right side of the HATS (i.e., the bottom side in FIG. 2). It may be desirable to choose this speaker because the speakers in front of the HATS (i.e., on the right side of FIG. 2) may be expected to compete with the uttered speech, while the HATS may be expected to effectively block sound from the speaker as shown in the upper left-hand corner of FIG. 2.

Task RT150 filters this recorded data using the trained source separation filter structure (e.g., as produced by method M100). Task RT160 processes this filtered signal (e.g., by training the adaptive filter to a converged solution) to determine initial conditions for the adaptive filter. These initial conditions may include one or more sets of tap weights (e.g., for each of a set of cross filters of adaptive filter B200) and/or a filter history. During online operation (e.g., task T130), the adaptive filter may adapt the filter coefficients further in response to the signal being filtered. Adaptive filter B200 may be configured to include a reset mechanism (e.g., as described in the portion of U.S. Publ. Pat. Appl. No. 2007/0021958 incorporated by reference above) that is configured to reload the initial conditions in case of saturation during online operation.

Figure 19A:
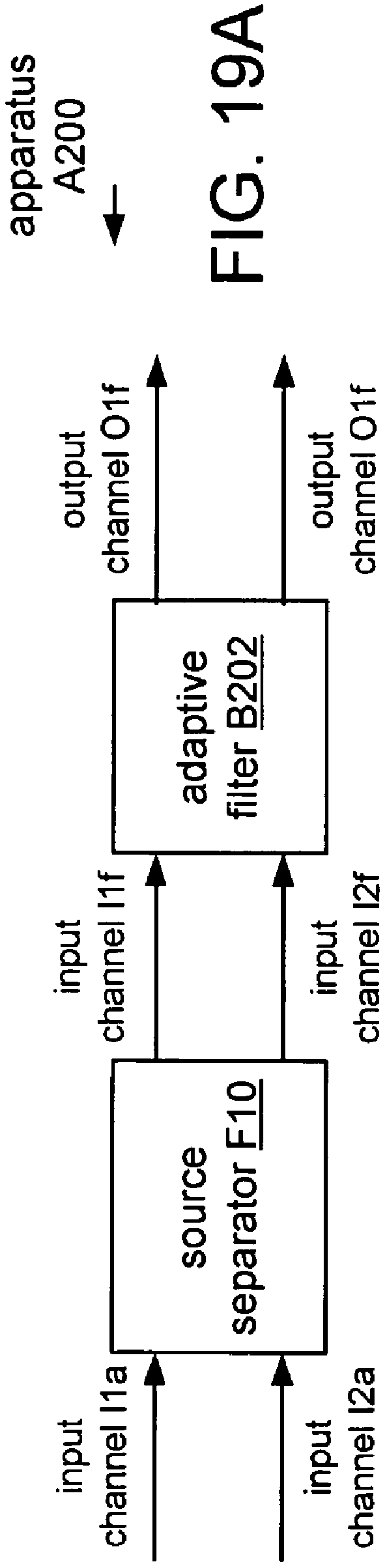
FIG. 19A shows a block diagram of an apparatus A200 according to a general configuration.

FIG. 19A shows a block diagram of an apparatus A200 that includes an implementation B202 of adaptive filter B200 which is configured to output an information signal O1*f* and at least one interference reference O2*f*. (In a general configuration, adaptive filter B200 may be implemented to output only the information signal O1*f*.) FIGS. 19B, 20A, 20B, and 21A show additional configurations that include instances of source separator F10 and adaptive filter B200. In these examples, input channel I1*f* represents a primary signal (e.g., an information or combination signal) and input channels I2*f*, I3*f* represent secondary channels (e.g., interference references). In these examples, delay elements B300, B300*a*, and B300*b* are provided to compensate for processing delay of the corresponding source separator (e.g., to synchronize the input channels of the subsequent stage). Such structures differ from generalized sidelobe cancellation because, for example, adaptive filter B200 may be configured to perform signal blocking and interference cancellation in parallel.

Figure 19B:
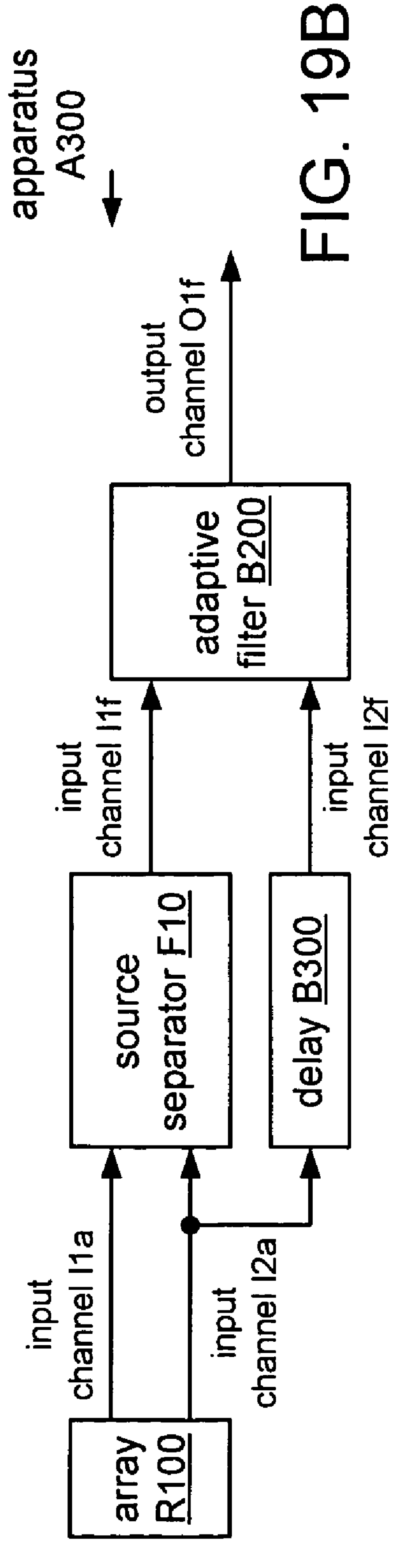
FIG. 19B shows a block diagram of an apparatus A300 according to a general configuration.

Apparatus A300 as shown in FIG. 19B also includes an array R100 of M transducers (e.g., microphones). It is expressly noted that any of the other apparatus described herein may also include such an array. Array R100 may also include associated sampling structure, analog processing structure, and/or digital processing structure as known in the art to produce a digital M-channel signal suitable for the particular application, or such structure may be otherwise included within the apparatus. FIG. 19B also shows an input arrangement in which primary input channel I1*a* is assumed to be likely to carry most of the desired information signal (e.g., as noted above with reference to FIG. 18A).

Figure 21A:
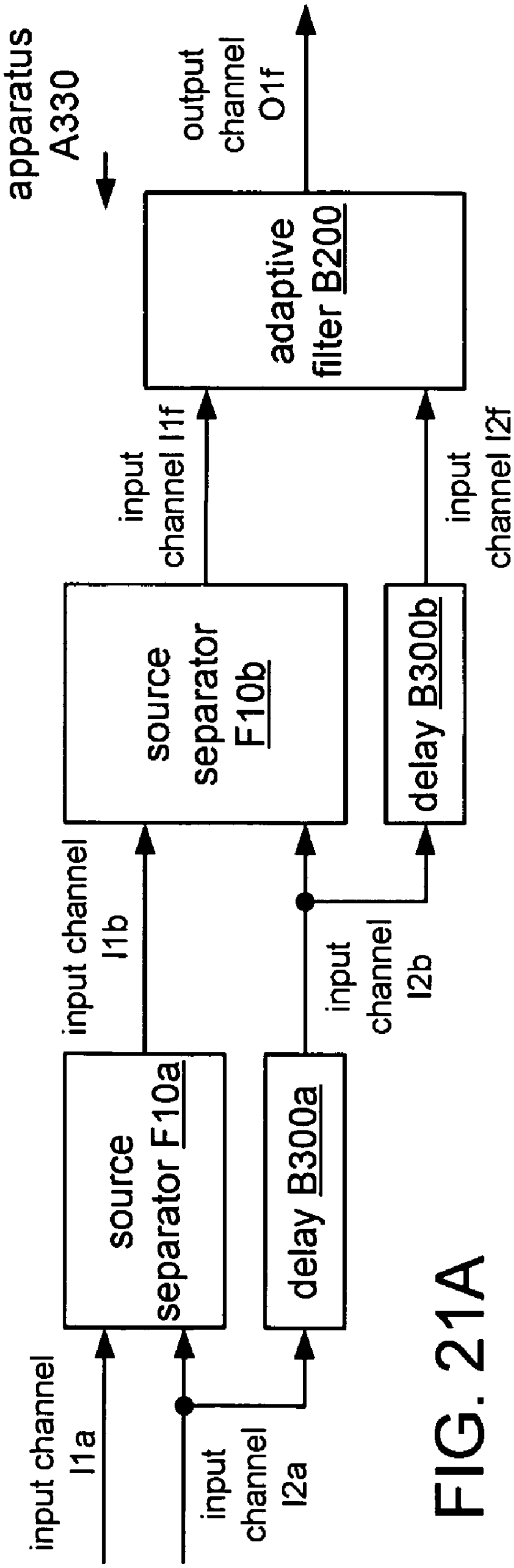
FIG. 21A shows a block diagram of an implementation A330 of apparatus A300 and apparatus A100.
Figure 21B:
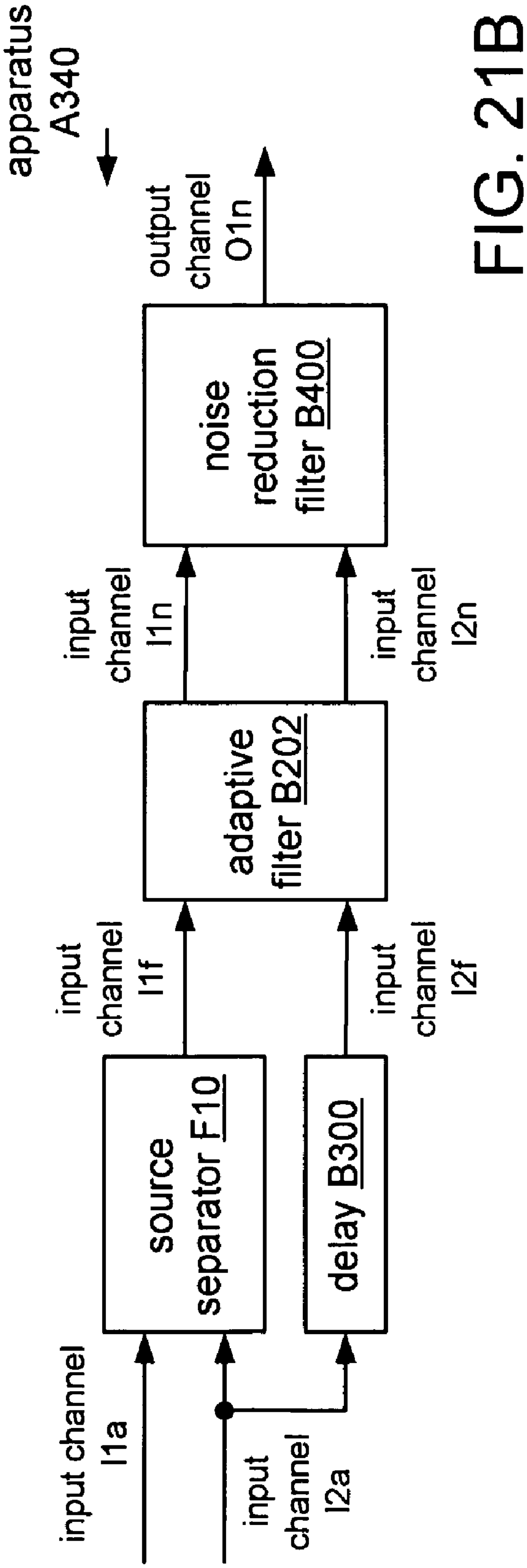
FIG. 21B shows a block diagram of an implementation A340 of apparatus A300.

FIG. 21B shows a block diagram of an implementation A340 of apparatus A300. Apparatus A340 includes an implementation B202 of adaptive filter B200 configured to produce an information output signal I1*n* and an interference reference I2*n*, and a noise reduction filter B400 configured to produce an output O1*n* having a reduced noise level. In such a configuration, one or more of the interference-dominant output channels of adaptive filter B200 (e.g., signal I2*n*) may be used by noise reduction filter B400 as an interference reference. Noise reduction filter B400 may be implemented as a Wiener filter, having coefficients that may be based on signal and noise power information from the separated channels. In such case, noise reduction filter B400 may be configured to estimate the noise spectrum based on the one or more interference references. Alternatively, noise reduction filter B400 may be implemented to perform a spectral subtraction operation on the information signal, based on a spectrum from the one or more interference references. Alternatively, noise reduction filter B400 may be implemented as a Kalman filter, with noise covariance being based on the one or more interference references. In any of these cases, noise reduction filter B400 may be configured to include a voice activity detection (VAD) operation, or to use a result of such an operation otherwise performed within the apparatus, to estimate noise characteristics such as spectrum and or covariance during non-speech intervals only. Such an operation may be configured to classify a frame as speech or non-speech based on one or more factors such as frame energy, energy in two or more different frequency bands, signal-to-noise ratio, periodicity, autocorrelation of speech and/or residual, zero-crossing rate, and/or first reflection coefficient.

It is expressly noted that implementation B202 of adaptive filter B200 and noise reduction filter B400 may be included in implementations of other configurations described herein, such as apparatus A200, A410, and A510. In any of these implementations, it may be desirable to feed back the output of noise reduction filter B400 to adaptive filter B202, as described, for example, in U.S. Pat. No. 7,099,821 (Visser et al.) at FIG. 7 and the top of column 20. For a case in which adaptive filter B202 has a feedback structure (e.g., as shown in FIG. 10A), the output of noise reduction filter B400 may be fed back to the input of a cross filter that receives the primary channel. For a case in which adaptive filter B202 includes scaling factors as shown in FIG. 13, noise reduction filter B400 may be located upstream of the output scaling factors.

Figure 22A:
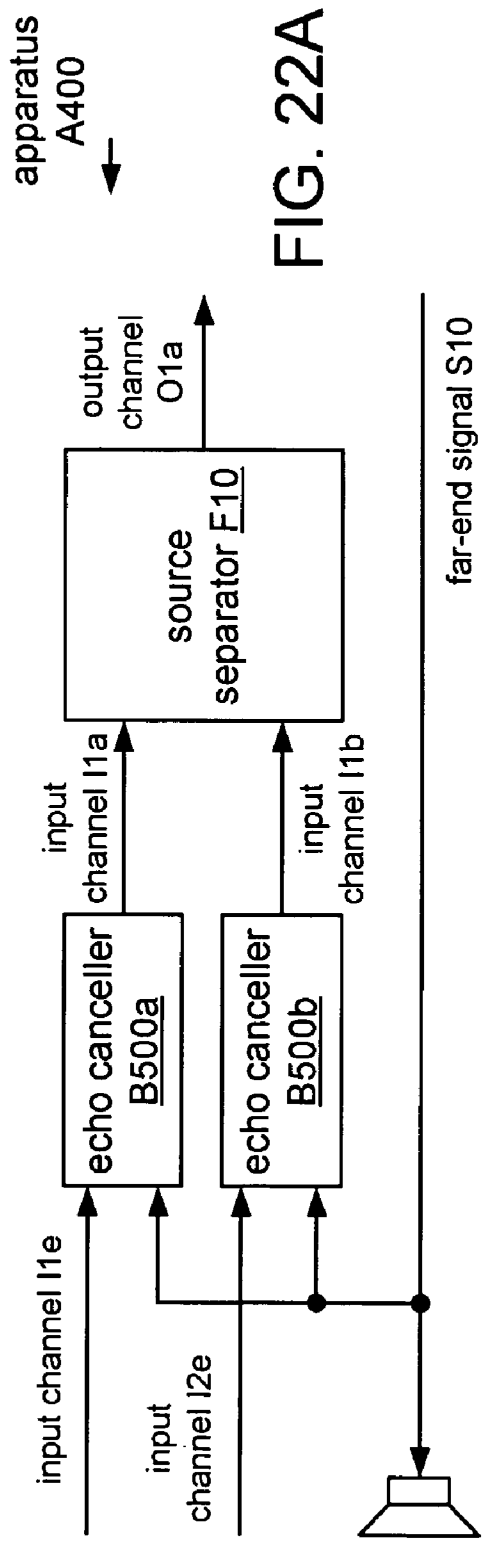
FIG. 22A shows a block diagram of an apparatus A400 according to a general configuration.
Figure 22B:
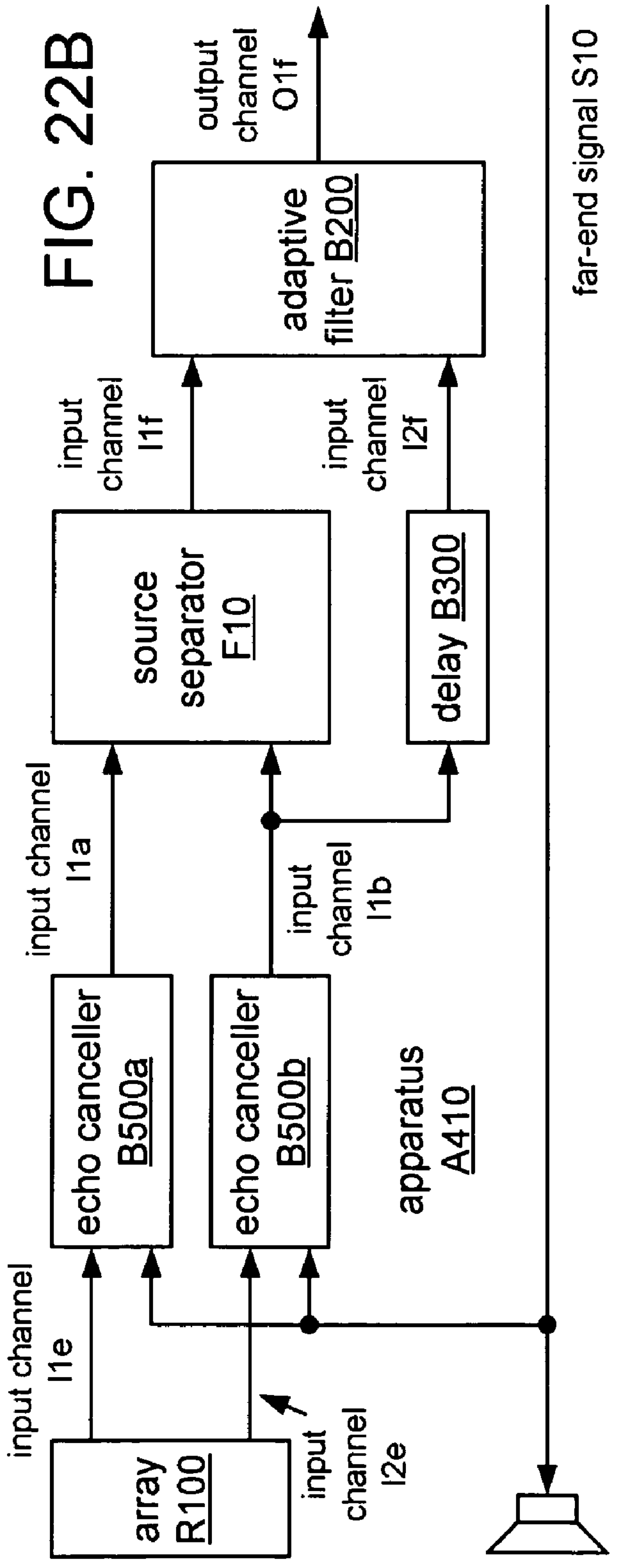
FIG. 22B shows a block diagram of an implementation A410 of apparatus A400.

An apparatus as disclosed herein may also be extended to include an echo cancellation operation. FIG. 22A shows an example of an apparatus A400 that includes an instance of source separator F10 and two instances B500*a*, B500*b* of an echo canceller B500. In this example, echo cancellers B500*a,b* are configured to receive far-end signal S10 (which may include more than one channel) and to remove this signal from each channel of the inputs to source separator F10. FIG. 22B shows an implementation A410 of apparatus A400 that includes an instance of apparatus A300.

Figure 23A:
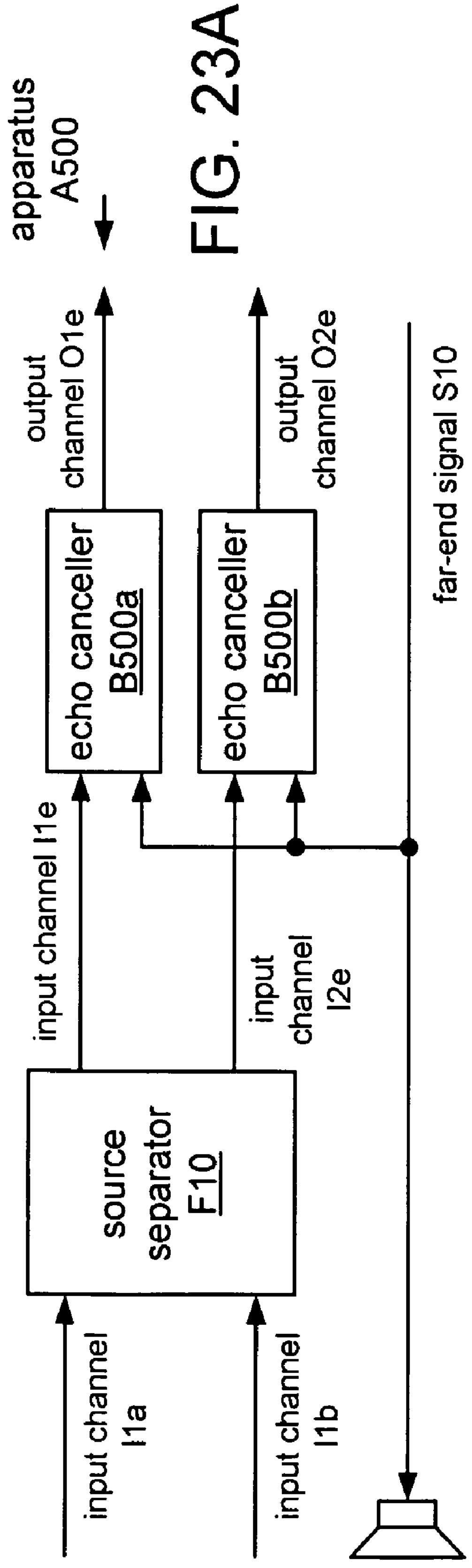
FIG. 23A shows a block diagram of an apparatus A500 according to a general configuration.
Figure 23B:
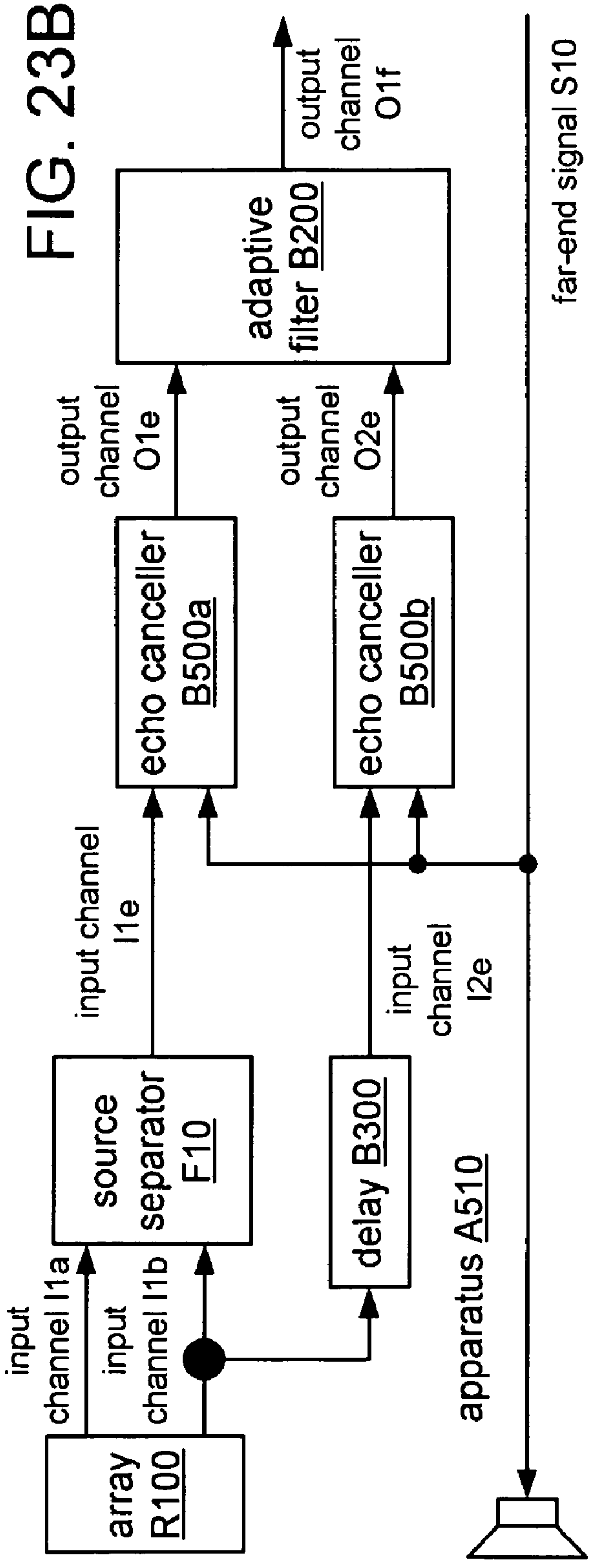
FIG. 23B shows a block diagram of an implementation A510 of apparatus A500.

FIG. 23A shows an example of an apparatus A500 in which echo cancellers B500*a,b* are configured to remove far-end signal S10 from each channel of the outputs of source separator F10. FIG. 23B shows an implementation A510 of apparatus A500 that includes an instance of apparatus A300.

Figure 24A:
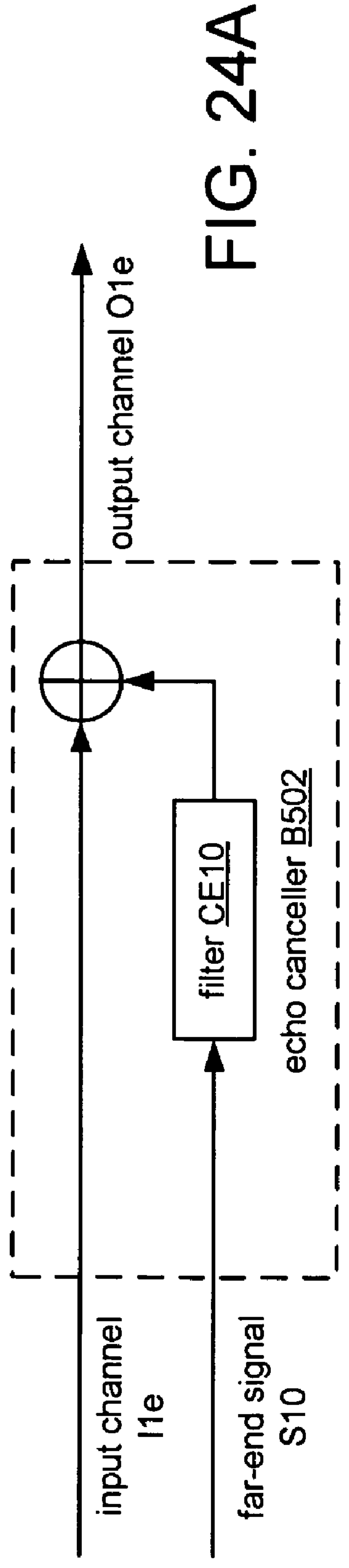
FIG. 24A shows a block diagram of echo canceller B502.
Figure 24B:
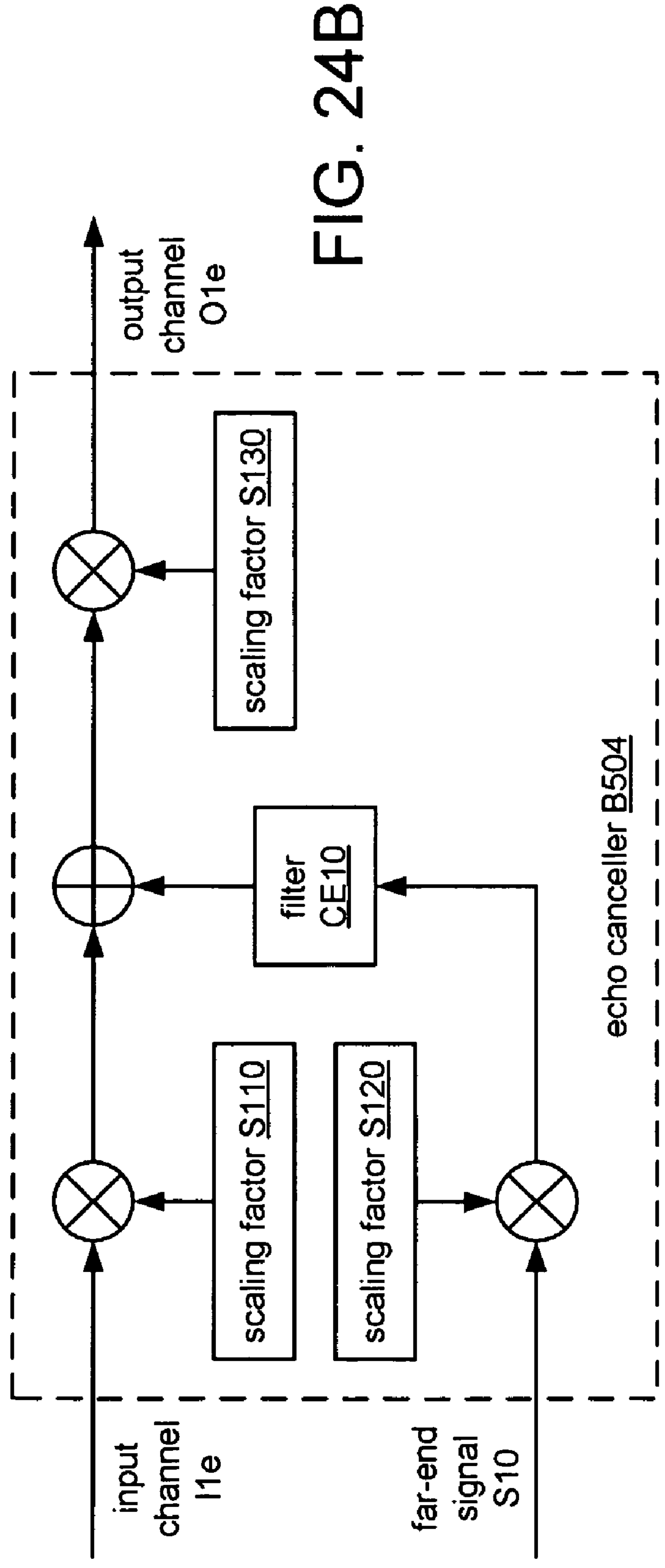
FIG. 24B shows a block diagram of an implementation B504 of echo canceller B502.

Echo canceller B500 may be based on LMS (least mean squared) techniques in which a filter is adapted based on the error between the desired signal and filtered signal. Alternatively, echo canceller B500 may be based not on LMS but on a technique for minimizing mutual information as described herein (e.g., ICA). In such case, the derived adaptation rule for changing the value of the coefficients of echo canceller B500 may be different. Echo canceller B500 may be implemented according to the following criteria: (1) the system assumes that at least one echo reference signal (e.g., far-end signal S10) is known; (2) the mathematical model for filtering and adaptation are similar to the equations in 1 to 4 except that the function $f$ is applied to the output of the separation module and not to the echo reference signal; (3) the function form of f can range from linear to nonlinear; and (4) prior knowledge on the specific knowledge of the application can be incorporated into a parametric form of the function $f$. It will be appreciated that known methods and algorithms may then be used to complete the echo cancellation process. FIG. 24A shows a block diagram of such an implementation B502 of echo canceller B500 that includes an instance CE10 of cross filter C110 whose coefficients may be calculated according to the above criteria. Filter CE10 typically has a longer filter length (i.e., more coefficients) than the cross filters of source separator F100. As shown in FIG. 24B, one or more scaling factors as described above with reference to FIG. 13 may also be used to increase stability of an adaptive implementation of echo canceller B500. Other echo cancellation implementation methods that may be used include cepstral processing and the use of transform domain adaptive filtering (TDAF) techniques (e.g., in which an input signal vector is preprocessed by decomposing it into orthogonal components which are then inputted to a parallel bank of simpler adaptive sub-filters) to improve technical properties of echo canceller B500.

The foregoing presentation of the described configurations is provided to enable any person skilled in the art to make or use the methods and other structures disclosed herein. The flowcharts, block diagrams, state diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

The various elements of an implementation of an apparatus as described herein may be embodied in any combination of hardware, software, and/or firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of an apparatus as described herein may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of apparatus A100 may also be embodied as one or more computers (e.g., machines including one or more arrays programmed to execute one or more sets or sequences of instructions, also called "processors"), and any two or more, or even all, of these elements may be implemented within the same such computer or computers.

Those of skill will appreciate that the various illustrative logical blocks, modules, circuits, and operations described in connection with the configurations disclosed herein may be implemented as electronic hardware, computer software, or combinations of both. Such logical blocks, modules, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is noted that the various methods described herein may be performed by a array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The program or code segments can be stored in a processor readable medium or transmitted by a computer data signal embodied in a carrier wave over a transmission medium or communication link. The term "processor readable medium" may include any medium that can store or transfer information, including volatile, nonvolatile, removable and non-removable media. Examples of a processor readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

In a typical application of an implementation of a method as described herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as described herein may also be performed by more than one such array or machine. In these or other implementations, at least some of the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive encoded frames.

It is expressly disclosed that the various methods described herein may be performed at least in part by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the functions described may be implemented in hardware, software, firmware, or any combination thereof. If implemented in software, the functions may be stored on or transmitted over a computer-readable medium as one or more instructions or code. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.) where disks usually reproduce data magnetically, while discs reproduce data optically with lasers. Combinations of the above should also be included within the scope of computer-readable media.

A speech separation system as described herein may be incorporated into an electronic device that accepts speech input in order to control certain functions, or otherwise requires separation of desired noises from background noises, such as communication devices. Many applications require enhancing or separating clear desired sound from background sounds originating from multiple directions. Such applications may include human-machine interfaces in electronic or computational devices which incorporate capabilities such as voice recognition and detection, speech enhancement and separation, voice-activated control, and the like. It may be desirable to implement such a speech separation system to be suitable in devices that only provide limited processing capabilities.

What is claimed is:

1. A method of signal processing, said method comprising:

based on a plurality of M-channel training signals, training a plurality of coefficient values of a source separation filter structure to obtain a converged source separation filter structure, where M is an integer greater than one; and deciding whether the converged source separation filter structure sufficiently separates each of the plurality of M-channel training signals into at least an information output signal and an interference output signal, wherein at least one of the plurality of M-channel training signals is based on signals produced by M microphones in response to at least one information source and at least one interference source while the microphones and sources are arranged in a first spatial configuration, and wherein another of the plurality of M-channel training signals is based on signals produced by M microphones in response to at least one information source and at least one interference source while the microphones and sources are arranged in a second spatial configuration different than the first spatial configuration.

2. The method of signal processing according to claim 1, wherein said training a plurality of coefficient values comprises updating the plurality of coefficient values of the source separation filter structure based on each of the plurality of M-channel training signals.

3. The method of signal processing according to claim 1, wherein said deciding comprises comparing information from said at least one information source with an output of the converged source separation filter structure.

4. The method of signal processing according to claim 1, wherein at least one of the plurality of M-channel training signals includes interference from an interference source having a first spectral signature, and wherein another of the plurality of M-channel training signals includes interference from an interference source having a second spectral signature different than the first spectral signature.

5. The method of signal processing according to claim 1, wherein at least one of the plurality of M-channel training signals includes information from an information source having a first spectral signature, and wherein another of the plurality of M-channel training signals includes information from an information source having a second spectral signature different than the first spectral signature.

6. The method of signal processing according to claim 1, wherein, within the first spatial configuration, the M microphones are disposed in an array that is oriented in a first spatial orientation relative to the at least one information source, and wherein, within the second spatial configuration, the M microphones are disposed in an array that is oriented in a second spatial orientation relative to the at least one information source, and wherein the second spatial orientation is different than the first spatial orientation.

7. The method of signal processing according to claim 1, wherein said training a plurality of coefficient values of a source separation filter structure includes calculating an update to the plurality of coefficient values based on a nonlinear bounded function.

8. The method of signal processing according to claim 1, wherein said deciding comprises:

based on a trained plurality of coefficient values of the converged source separation filter structure, calculating a corresponding beam pattern; and comparing the calculated beam pattern to information relating to the relative dispositions of microphones and sources in at least one among the first and second spatial configurations.

9. The method of signal processing according to claim 1, wherein said method comprises, based on a trained plurality of coefficient values of the converged source separation filter structure, filtering an M-channel signal in real time to obtain a real-time information output signal.

10. The method of signal processing according to claim 9, wherein, within the first spatial configuration, the M microphones are arranged relative to one another in a third spatial configuration, and wherein the M-channel signal is based on signals produced by an array of M microphones that are arranged relative to one another in the third spatial configuration.

11. The method of signal processing according to claim 9, wherein said filtering an M-channel signal includes reassigning a frequency bin of one among (A) an information output channel and (B) an interference output channel to the other among the two channels.

12. The method of signal processing according to claim 9, said method comprising performing an echo cancellation operation on at least one among (A) the M-channel signal and (B) a signal that is based on the real-time information output signal.

13. The method of signal processing according to claim 9, said method comprising:

based on a trained plurality of coefficient values of the converged source separation filter structure, generating initial conditions for an adaptive filter;

initializing the adaptive filter according to the initial conditions; and subsequent to said initializing, using the adaptive filter to filter a signal that is based on the real-time information output signal, wherein said initial conditions include at least one among (A) an initial plurality of tap weights of the adaptive filter and (B) an initial history of the adaptive filter.

14. The method of signal processing according to claim 13, wherein said using an adaptive filter includes, based on a characteristic of the real-time information output signal, attenuating the signal that is based on the real-time information output signal.

15. The method of signal processing according to claim 13, wherein said using the adaptive filter to filter a signal that is based on the information output signal includes using the adaptive filter to produce a interference reference signal, and wherein said method comprises, based on the interference reference signal, performing a noise reduction operation on a signal that is based on the real-time information output signal.

16. The method of signal processing according to claim 13, wherein said generating initial conditions comprises:

subsequent to said deciding, and based on a trained plurality of coefficient values of the converged source separation filter structure, filtering a second plurality of M-channel training signals to obtain a filtered training signal; and based on the filtered training signal, training a second plurality of coefficient values of a second source separation filter structure to obtain said initial conditions.

17. The method of signal processing according to claim 16, wherein said method comprises, based on information from the real-time information output signal, updating the trained second plurality of coefficient values.

18. The method of signal processing according to claim 9, said method comprising:

using a plurality of microphones to capture an M-channel captured signal, wherein the M-channel signal is based on the M-channel captured signal; and subsequent to said filtering an M-channel signal in real time, recalibrating a gain of at least one of the plurality of microphones.

19. The method of signal processing according to claim 9, said method comprising, subsequent to said filtering an M-channel signal in real time, and based on a plurality of M-channel training signals, training a plurality of coefficient values of a source separation filter structure to obtain a second converged source separation filter structure.

20. The method of signal processing according to claim 1, wherein said deciding comprises deciding whether the converged source separation filter structure sufficiently concentrates a directional component of each of the plurality of M-channel training signals.

21. An apparatus for signal processing, said apparatus comprising:

an array of M microphones, where M is an integer greater than one; and a source separation filter structure having a trained plurality of coefficient values, wherein said source separation filter structure is configured to receive an M-channel signal that is based on signals produced by the array of M microphones and to filter the M-channel signal in real time to obtain a real-time information output signal, and wherein the trained plurality of coefficient values is based on a plurality of M-channel training signals, and wherein one of the plurality of M-channel training signals is based on signals produced by M microphones in response to at least one information source and at least one interference source while the microphones and sources are arranged in a first spatial configuration, and wherein another of the plurality of M-channel training signals is based on signals produced by M microphones in response to at least one information source and at least one interference source while the microphones and sources are arranged in a second spatial configuration different than the first spatial configuration.

22. The apparatus for signal processing according to claim 21, wherein said apparatus comprises a mobile user terminal that includes said array and said source separation filter structure.

23. The apparatus for signal processing according to claim 21, wherein said apparatus comprises a wireless headset that includes said array and said source separation filter structure.

24. The apparatus for signal processing according to claim 21, wherein the M microphones of the array are arranged relative to one another in a third spatial configuration, and wherein, within the first spatial configuration, the M microphones are arranged relative to one another in the third spatial configuration.

25. The apparatus for signal processing according to claim 21, wherein, within the first spatial configuration, the array is oriented in a first direction relative to the at least one information source, and wherein, within the second spatial configuration, the array is oriented in a second direction relative to the at least one information source, and wherein the second direction is different than the first direction.

26. The apparatus for signal processing according to claim 21, wherein the trained plurality of coefficient values is calculated, based on a nonlinear bounded function, from a plurality of coefficient values.

27. The apparatus for signal processing according to claim 21, wherein said source separator filter structure is configured to filter the M-channel signal by reassigning a frequency bin of one among (A) an information output channel and (B) an interference output channel to the other among the two channels.

28. The apparatus for signal processing according to claim 21, said apparatus comprising an adaptive filter arranged to filter a signal that is based on the real-time information output signal, wherein said adaptive filter is initialized according to initial conditions that are based on a trained plurality of coefficient values of the converged source separation filter structure, said initial conditions including at least one among (A) an initial plurality of tap weights of the adaptive filter and (B) an initial history of the adaptive filter.

29. The apparatus for signal processing according to claim 28, wherein said adaptive filter is configured to perform a scaling operation, based on a characteristic of the information output signal, on the signal that is based on the real-time information output signal.

30. The apparatus for signal processing according to claim 28, wherein said adaptive filter is configured to produce an interference reference signal, and wherein said apparatus includes a noise reduction filter configured to perform a noise reduction operation, based on the interference reference signal, on a signal that is based on the real-time information output signal.

31. The apparatus for signal processing according to claim 28, wherein said initial conditions are based on a filtered training signal, and wherein said filtered training signal is based on a second plurality of M-channel training signals as filtered using a trained plurality of coefficient values of the source separation filter structure.

32. The apparatus for signal processing according to claim 31, wherein said adaptive filter is configured to adapt the trained second plurality of coefficient values based on information from the real-time information output signal.

33. The apparatus for signal processing according to claim 21, wherein said source separation filter structure is configured to concentrate a directional component of the M-channel signal.

34. The apparatus for signal processing according to claim 21, said apparatus comprising an echo canceller configured to perform an echo cancellation operation on at least one among (A) the M-channel signal and (B) a signal that is based on the real-time information output signal.

35. A computer-readable medium comprising instructions which when executed by a processor cause the processor to:

train a plurality of coefficient values of a source separation filter structure, based on a plurality of M-channel training signals, to obtain a converged source separation filter structure, where M is an integer greater than one; and decide whether the converged source separation filter structure sufficiently separates each of the plurality of M-channel training signals into at least an information output signal and an interference output signal, wherein at least one of the plurality of M-channel training signals is based on signals produced by M microphones in response to at least one information source and at least one interference source while the microphones and sources are arranged in a first spatial configuration, and wherein another of the plurality of M-channel training signals is based on signals produced by M microphones in response to at least one information source and at least one interference source while the microphones and sources are arranged in a second spatial configuration different than the first spatial configuration.

36. The computer-readable medium according to claim 35, wherein said instructions which when executed by a processor cause the processor to train a plurality of coefficient values comprise instructions which when executed by a processor cause the processor to update the plurality of coefficient values of the source separation filter structure based on each of the plurality of M-channel training signals.

37. The computer-readable medium according to claim 35, wherein said instructions which when executed by a processor cause the processor to decide comprise instructions which when executed by a processor cause the processor to compare information from said at least one information source with an output of the converged source separation filter structure.

38. The computer-readable medium according to claim 35, wherein at least one of the plurality of M-channel training signals includes interference from an interference source having a first spectral signature, and wherein another of the plurality of M-channel training signals includes interference from an interference source having a second spectral signature different than the first spectral signature.

39. The computer-readable medium according to claim 35, wherein at least one of the plurality of M-channel training signals includes information from an information source having a first spectral signature, and wherein another of the plurality of M-channel training signals includes information from an information source having a second spectral signature different than the first spectral signature.

40. The computer-readable medium according to claim 35, wherein, within the first spatial configuration, the M microphones are disposed in an array that is oriented in a first spatial orientation relative to the at least one information source, and wherein, within the second spatial configuration, the M microphones are disposed in an array that is oriented in a second spatial orientation relative to the at least one information source, and wherein the second spatial orientation is different than the first spatial orientation.

41. The computer-readable medium according to claim 35, wherein said instructions which when executed by a processor cause the processor to train a plurality of coefficient values of a source separation filter structure include instructions which when executed by a processor cause the processor to calculate an update to the plurality of coefficient values based on a nonlinear bounded function.

42. The computer-readable medium according to claim 35, wherein said instructions which when executed by a processor cause the processor to decide include instructions which when executed by a processor cause the processor to:

calculate, based on a trained plurality of coefficient values of the converged source separation filter structure, a corresponding beam pattern; and compare the calculated beam pattern to information relating to the relative dispositions of microphones and sources in at least one among the first and second spatial configurations.

43. The computer-readable medium according to claim 35, wherein said medium comprises instructions which when executed by a processor cause the processor to filter an M-channel signal in real time, based on a trained plurality of coefficient values of the converged source separation filter structure, to obtain a real-time information output signal.

44. The computer-readable medium according to claim 43, wherein, within the first spatial configuration, the M microphones are arranged relative to one another in a third spatial configuration, and wherein the M-channel signal is based on signals produced by an array of M microphones that are arranged relative to one another in the third spatial configuration.

45. The method of signal processing according to claim 43, wherein said instructions which when executed by a processor cause the processor to filter an M-channel signal include instructions which when executed by a processor cause the processor to reassign a frequency bin of one among (A) an information output channel and (B) an interference output channel to the other among the two channels.

46. The computer-readable medium according to claim 43, said medium comprising instructions which when executed by a processor cause the processor to perform an echo cancellation operation on at least one among (A) the M-channel signal and (B) a signal that is based on the real-time information output signal.

47. The computer-readable medium according to claim 43, said medium comprising instructions which when executed by a processor cause the processor to:

generate initial conditions, based on a trained plurality of coefficient values of the converged source separation filter structure, for an adaptive filter;

initialize the adaptive filter according to the initial conditions; and subsequent to said initializing, use the adaptive filter to filter a signal that is based on the real-time information output signal, wherein said initial conditions include at least one among (A) an initial plurality of tap weights of the adaptive filter and (B) an initial history of the adaptive filter.

48. The computer-readable medium according to claim 47, wherein said instructions which when executed by a processor cause the processor to use an adaptive filter include instructions which when executed by a processor cause the processor to, attenuate, based on a characteristic of the real-time information output signal, the signal that is based on the real-time information output signal.

49. The computer-readable medium according to claim 47, wherein said instructions which when executed by a processor cause the processor to use the adaptive filter to filter a signal that is based on the real-time information output signal include instructions which when executed by a processor cause the processor to use the adaptive filter to produce a interference reference signal, and wherein said medium comprises instructions which when executed by a processor cause the processor to perform a noise reduction operation, based on the interference reference signal, on a signal that is based on the real-time information output signal.

50. The computer-readable medium according to claim 47, wherein said instructions which cause the processor to generate initial conditions comprise instructions which when executed by a processor cause the processor to:

filter a second plurality of M-channel training signals, subsequent to said deciding and based on a trained plurality of coefficient values of the converged source separation filter structure, to obtain a filtered training signal; and train a second plurality of coefficient values of a second source separation filter structure, based on the filtered training signal, to obtain said initial conditions.

51. The computer-readable medium according to claim 50, wherein said medium comprises instructions which when executed by a processor cause the processor to update the trained second plurality of coefficient values based on information from the real-time information output signal.

52. The computer-readable medium according to claim 35, wherein said instructions which when executed by a processor cause the processor to decide comprise instructions which when executed by a processor cause the processor to decide whether the converged source separation filter structure sufficiently concentrates a directional component of each of the plurality of M-channel training signals.

53. An apparatus for signal processing, said apparatus comprising:

an array of M microphones, where M is an integer greater than one; and means for performing a source separation filtering operation according to a trained plurality of coefficient values, wherein said means for performing a source separation filtering operation is configured to receive an M-channel signal that is based on signals produced by the array of M microphones and to filter the M-channel signal in real time to obtain a real-time information output signal, and wherein the trained plurality of coefficient values is based on a plurality of M-channel training signals, and wherein one of the plurality of M-channel training signals is based on signals produced by M microphones in response to at least one information source and at least one interference source while the microphones and sources are arranged in a first spatial configuration, and wherein another of the plurality of M-channel training signals is based on signals produced by M microphones in response to at least one information source and at least one interference source while the microphones and sources are arranged in a second spatial configuration different than the first spatial configuration.

54. The apparatus for signal processing according to claim 53, wherein said apparatus comprises a mobile user terminal that includes said array and said means for performing a source separation filtering operation.

55. The apparatus for signal processing according to claim 53, wherein said apparatus comprises a wireless headset that includes said array and said means for performing a source separation filtering operation.

56. The apparatus for signal processing according to claim 53, wherein the M microphones of the array are arranged relative to one another in a third spatial configuration, and wherein, within the first spatial configuration, the M microphones are arranged relative to one another in the third spatial configuration.

57. The apparatus for signal processing according to claim 53, wherein, within the first spatial configuration, the array is oriented in a first direction relative to the at least one information source, and wherein, within the second spatial configuration, the array is oriented in a second direction relative to the at least one information source, and wherein the second direction is different than the first direction.

58. The apparatus for signal processing according to claim 53, wherein the trained plurality of coefficient values is calculated, based on a nonlinear bounded function, from a plurality of coefficient values.

59. The apparatus for signal processing according to claim 53, wherein said means for performing a source separation filtering operation is configured to filter the M-channel signal by reassigning a frequency bin of one among (A) an information output channel and (B) an interference output channel to the other among the two channels.

60. The apparatus for signal processing according to claim 53, said apparatus comprising means for adaptively filtering arranged to filter a signal that is based on the real-time information output signal, wherein said means for adaptively filtering is initialized according to initial conditions that are based on a trained plurality of coefficient values of the converged source separation filter structure, said initial conditions including at least one among (A) an initial plurality of tap weights of the adaptive filter and (B) an initial history of the adaptive filter.

61. The apparatus for signal processing according to claim 60, wherein said means for adaptively filtering is configured to perform a scaling operation, based on a characteristic of the real-time information output signal, on the signal that is based on the real-time information output signal.

62. The apparatus for signal processing according to claim 60, wherein said means for adaptively filtering is configured to produce an interference reference signal, and wherein said apparatus includes means for reducing noise configured to perform a noise reduction operation, based on the interference reference signal, on a signal that is based on the real-time information output signal.

63. The apparatus for signal processing according to claim 60, wherein said initial conditions are based on a filtered training signal, and wherein said filtered training signal is based on a second plurality of M-channel training signals as filtered using a trained plurality of coefficient values of the source separation filter structure.

64. The apparatus for signal processing according to claim 63, wherein said means for adaptively filtering is configured to adapt the trained second plurality of coefficient values based on information from the real-time information output signal.

65. The apparatus for signal processing according to claim 53, wherein said means for performing a source separation filtering operation is configured to concentrate a directional component of the M-channel signal.

66. The apparatus for signal processing according to claim 53, said apparatus comprising means for echo cancellation configured to perform an echo cancellation operation on at least one among (A) the M-channel signal and (B) a signal that is based on the real-time information output signal.

67. A method of signal processing, said method comprising:

based on a plurality of M-channel training signals, training a plurality of coefficient values of a source separation filter structure to obtain a converged source separation filter structure, where M is an integer greater than one; and deciding whether the converged source separation filter structure sufficiently separates each of the plurality of M-channel training signals into at least an information output signal and an interference output signal, wherein each of the plurality of M-channel training signals is based on signals produced by M microphones in response to at least one information source and at least one interference source, and wherein at least two of the plurality of M-channel training signals differ with respect to at least one of (A) a spatial feature of the at least one information source, (B) a spatial feature of the at least one interference source, (C) a spectral feature of the at least one information source, and (D) a spectral feature of the at least one interference source, and wherein said training a plurality of coefficient values of a source separation filter structure includes updating the plurality of coefficient values according to at least one among an independent vector analysis algorithm and a constrained independent vector analysis algorithm.

68. The method of signal processing according to claim 67, wherein said method comprises, based on a trained plurality of coefficient values of the converged source separation filter structure, filtering an M-channel signal in real time to obtain a real-time information output signal.

69. The method of signal processing according to claim 68, said method comprising:

based on a trained plurality of coefficient values of the converged source separation filter structure, generating initial conditions for an adaptive filter;

initializing the adaptive filter according to the initial conditions; and subsequent to said initializing, using the adaptive filter to filter a signal that is based on the real-time information output signal, wherein said initial conditions include at least one among (A) an initial plurality of tap weights of the adaptive filter and (B) an initial history of the adaptive filter.

70. The method of signal processing according to claim 68, wherein said deciding comprises deciding whether the converged source separation filter structure sufficiently concentrates a directional component of each of the plurality of M-channel training signals.

71. An apparatus for signal processing, said apparatus comprising:

an array of M microphones, where M is an integer greater than one; and a source separation filter structure having a trained plurality of coefficient values, wherein said source separation filter structure is configured to receive an M-channel signal that is based on signals produced by the array of M microphones and to filter the M-channel signal in real time to obtain a real-time information output signal, and wherein the trained plurality of coefficient values is based on a plurality of M-channel training signals, and wherein each of the plurality of M-channel training signals is based on signals produced by M microphones in response to at least one information source and at least one interference source, and wherein at least two of the plurality of M-channel training signals differ with respect to at least one of (A) a spatial feature of the at least one information source, (B) a spatial feature of the at least one interference source, (C) a spectral feature of the at least one information source, and (D) a spectral feature of the at least one interference source, and wherein the trained plurality of coefficient values is based on updating a plurality of coefficient values according to at least one among an independent vector analysis algorithm and a constrained independent vector analysis algorithm.

* * * * *